US012312806B2

(12) United States Patent
Yeo et al.

(10) Patent No.: US 12,312,806 B2
(45) Date of Patent: *May 27, 2025

(54) CEILING GRID LIGHTING ASSEMBLY WITH TWO LINEAR LIGHTING MODULES AND A CONFIGURABLE, FUNCTIONAL GAP

(71) Applicant: Fusion Optix, Inc., Woburn, MA (US)

(72) Inventors: Terence Yeo, Boston, MA (US); Michael Demas, Charlestown, MA (US); Timothy Kelly, Brookline, MA (US)

(73) Assignee: Fusion Optix, Inc., Woburn, MA (US)

( * ) Notice: Subject to any disclaimer, the term of this patent is extended or adjusted under 35 U.S.C. 154(b) by 376 days.

This patent is subject to a terminal disclaimer.

(21) Appl. No.: 17/591,579

(22) Filed: Feb. 2, 2022

(65) Prior Publication Data

US 2022/0290432 A1 Sep. 15, 2022

Related U.S. Application Data

(63) Continuation-in-part of application No. 16/877,482, filed on May 18, 2020, now Pat. No. 11,396,751, (Continued)

(51) Int. Cl.
*F21S 8/02* (2006.01)
*E04B 9/02* (2006.01)
(Continued)

(52) U.S. Cl.
CPC ................ *E04B 9/345* (2013.01); *E04B 9/02* (2013.01); *F21S 8/026* (2013.01); *F21V 5/00* (2013.01);
(Continued)

(58) Field of Classification Search
CPC .. E04B 9/02; E04B 9/345; F21S 8/026; F21V 33/0088; F21Y 2115/10
(Continued)

(56) References Cited

U.S. PATENT DOCUMENTS 3,329,387 A * 7/1967 Fischer ..................... E04B 9/16 248/342
3,343,310 A * 9/1967 Netz ....................... F21V 21/04 52/28
(Continued)

*Primary Examiner* — James J Buckle, Jr.

(57) ABSTRACT

A lighting assembly for use in suspended T-Bar ceiling grid systems is provided comprising two linear lighting modules in a novel parallel arrangement. End plates are used to connect, support, and enclose longitudinal ends of the elongate body of each linear lighting modules at a predetermined and configurable spacing apart while simultaneously functioning as reflective faces for internal and external optical cavities. The configured gap spacing between individual linear lighting modules can be used to house and support components such as additional light sources, acoustic or decorative ceiling panels, HVAC components, or power systems, controls or sensors. Additional end plate embodiments can be configured to allow a T-bar to be placed in the configured gap spacing thereby enabling the mounting of the assembly in-line upon the longitudinal axis of a ceiling grid T-bar. Embodiments of linear lighting modules are presented comprising LED light sources, transmissive optical elements, light shaping lenses, reflectors and other functional components supported and housed within the elongate body. The transmissive optical elements may be backlit or edgelit from one or two sides and aligned horizontally or tilted relative to the ceiling grid plane. The linear lighting modules can provide a range of useful symmetric, asymmetric and tilted non-lambertian lighting distributions.

47 Claims, 36 Drawing Sheets

Related U.S. Application Data which is a continuation-in-part of application No. 16/239,804, filed on Jan. 4, 2019, now abandoned.

(60) Provisional application No. 63/225,590, filed on Jul. 26, 2021, provisional application No. 63/000,649, filed on Mar. 27, 2020, provisional application No. 63/000,718, filed on Mar. 27, 2020, provisional application No. 62/849,199, filed on May 17, 2019.

(51) Int. Cl.
*E04B 9/34* (2006.01)
*F21V 5/00* (2018.01)
*F21V 33/00* (2006.01)
*F21Y 115/10* (2016.01)

(52) U.S. Cl.
CPC ....... *F21V 33/0088* (2013.01); *F21Y 2115/10* (2016.08)

(58) Field of Classification Search
USPC ........................................................ 52/506.06
See application file for complete search history.

(56) References Cited

U.S. PATENT DOCUMENTS

| | | | | | |
|---|---|---|---|---|---|
| 3,426,188 | A * | 2/1969 | Eugene | F21V 21/00 | 52/28 |
| 3,512,313 | A * | 5/1970 | Harz | E04B 9/12 | 52/28 |
| 4,027,454 | A * | 6/1977 | Schuplin | E04B 9/242 | 52/506.07 |
| 4,047,336 | A * | 9/1977 | Stahlhut | F21S 8/02 | 52/28 |
| 4,363,082 | A * | 12/1982 | Roland | F21V 21/04 | 362/225 |
| 4,479,341 | A * | 10/1984 | Schuplin | E04B 9/127 | 52/712 |
| 5,161,878 | A * | 11/1992 | Degelmann | F21V 19/02 | 362/366 |
| 5,428,930 | A * | 7/1995 | Bagley | E04B 9/003 | 52/489.1 |
| 5,777,857 | A * | 7/1998 | Degelmann | F21S 2/00 | 362/225 |
| 5,941,029 | A * | 8/1999 | MacLeod | E04B 9/006 | 24/336 |
| 6,029,414 | A * | 2/2000 | MacLeod | E04B 9/006 | 52/39 |
| 6,079,851 | A * | 6/2000 | Altman | F21V 19/008 | 362/217.05 |
| 6,341,466 | B1 * | 1/2002 | Kehoe | F16B 2/241 | 52/39 |
| 7,770,349 | B2 * | 8/2010 | Tedesco | E04B 9/122 | 52/506.07 |
| 8,453,407 | B2 * | 6/2013 | Tedesco | E04B 9/127 | 52/506.07 |
| 8,596,009 | B2 * | 12/2013 | Baxter | E04B 9/34 | 52/489.1 |
| 8,615,948 | B2 * | 12/2013 | Underkofler | E04B 9/067 | 52/506.07 |
| 8,667,756 | B1 * | 3/2014 | Sareyka | E04B 9/18 | 52/506.07 |
| 9,453,339 | B2 * | 9/2016 | Baxter | E04B 9/34 | |
| 2012/0047836 | A1 * | 3/2012 | Sareyka | E04B 9/30 | 52/506.06 |
| 2012/0102865 | A1 * | 5/2012 | Baxter | E04B 9/34 | 52/745.05 |
| 2013/0318905 | A1 * | 12/2013 | Underkofler | E04B 9/122 | 52/506.06 |
| 2015/0040494 | A1 * | 2/2015 | Lehane, Jr. | E04B 9/122 | 52/506.07 |
| 2017/0082252 | A1 * | 3/2017 | Casement | G02B 6/0051 | |
| 2021/0048169 | A1 * | 2/2021 | Dahlen | F21V 21/04 | |

* cited by examiner (i) Lighting Assembly Only (ii) Lighting Assembly in Grid Ceiling (i)

(ii)

(i) (ii)

(i) (ii)

(i) Diffuse Planar (No surface features)

(ii) Diffuse laser etched (iii) Diffuse lenticular (iv) Diffuse sawtooth (v) Diffuse layer
(laminated)

(vi) Diffuse surface
(coated)

(vii) Diffuse patterned

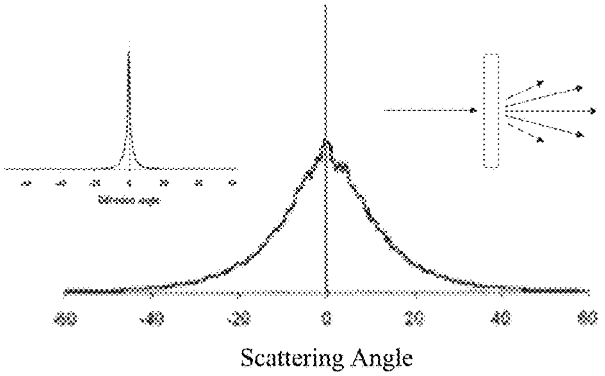

| Sample | Type | Height | ASTM D1003 | | | Scattering (FWHM) | | Gloss (60%) | |
|---|---|---|---|---|---|---|---|---|---|
| | | | T% | H% | C% | TD | MD | Side A | Side B |
| Clear Etched Light Guide | | 4.5mm | 89.4 | 12.5 | 98.6 | 1° | 1° | 129.9 | 110.2 |
| Edge-lit Signage Acrylic | | 4.0mm | 92.6 | 4.1 | 99.8 | 1° | 1° | 139.7 | 140.5 |
| (i) | Diffuse planar | 4.7mm | 90.6 | 97.1 | 9.1 | 10° | 16° | 62.4 | 63.5 |
| (ii) | Diffuse laser etched | 4.5mm | 92.8 | 94.5 | 3.7 | 20° | 18° | 85.7 | 64.3 |
| (iii) | Diffuse lenticular | 4.6mm | 86.9 | 92.3 | 23.6 | 25° | 2° | 86.5 | 11.9 |
| (iv-a) | Diffuse sawtooth | 4.4mm | 82.6 | 97.6 | 4.3 | 5° | 17° | 74.7 | 5.9 |
| (iv-b) | Diffuse sawtooth | 3.8mm | 91.7 | 84.9 | 13.0 | 5° | 17° | 78.5 | 5.9 |
| (iv-c) | Diffuse sawtooth | 4.8mm | 91.6 | 80.2 | 17.8 | 5° | 17° | 74.7 | 5.9 |
| (v-a) | Diffuse layer (laminated) | 4.6mm | 91.5 | 86.3 | 15.2 | 11° | 10° | 88.4 | 55.6 |
| (v-b) | Diffuse layer (laminated) | 4.6mm | 90.2 | 90.6 | 7.3 | 15° | 14° | 90.2 | 45.2 |
| (v-c) | Diffuse layer (laminated) | 4.6mm | 92.0 | 94.1 | 3.9 | 30° | 30° | 87.6 | 34.5 |
| (v-d) | Diffuse layer (laminated) | 4.6mm | 86.8 | 94.9 | 5.6 | 40° | 30° | 85.7 | 86.1 |
| (vi-a) | Diffuse surface (coated) | 4.5mm | 93.0 | 95.1 | 3.6 | 20° | 18° | 91.1 | 6.3 |
| (vi-b) | Diffuse surface (coated) | 4.5mm | 89.8 | 100 | 2.3 | 40° | 40° | 92.4 | 4.3 |

FIG. 2C (i) Medium (ii) Batwing (60deg)

(iii) Narrow / Low Glare (iv) Medium Asymmetric (v) Linear Spot (vi) Narrow Asymmetric

CEILING GRID LIGHTING ASSEMBLY WITH TWO LINEAR LIGHTING MODULES AND A CONFIGURABLE, FUNCTIONAL GAP

RELATED APPLICATIONS

This application is a continuation in part of non-provisional U.S. application Ser. No. 16/877,482 titled "MODULAR CEILING SYSTEM WITH SUPPORT ELEMENTS FOR MOUNTING OF FUNCTIONAL MODULES" filed May 18, 2020 which is itself a continuation in part of and claims the benefit of non-provisional U.S. application Ser. No. 16/239,804 titled "SUPPORT ELEMENT FOR GRID CEILING SYSTEMS" filed Jan. 4, 2019. Furthermore, U.S. application Ser. No. 16/877,482 claims the benefit of provisional patent application Ser. No. 62/849,199 titled "MODULAR CEILING SYSTEM AND METHOD" filed May 17, 2019, Ser. No. 63/000,649 titled "MODULAR FUNCTIONAL FIXTURE FOR USE WITH SUSPENDED CEILING GRID ARRANGEMENT AND METHOD FOR INSTALLATION" filed Mar. 27, 2020, and Ser. No. 63/000,718 "LIGHTING ARRANGEMENT FOR USE WITH SUSPENDED CEILING" filed Mar. 27, 2020. Furthermore, the present application claims the benefit of U.S. provisional application 63/225,590 titled "LIGHT ASSEMBLY WITH INTEGRATED T-BAR FUNCTIONALITY AND APPEARANCE FOR USE IN SUSPENDED CEILING SYSTEMS" filed Jul. 26, 2021.

BACKGROUND

Technical Field

The present disclosure relates generally to ceiling grid lighting assemblies, for example those used in suspended ceiling grid systems, wherein the ceiling grid lighting assemblies utilizes modular elements including linear support elements, LED boards, optical elements including light guides, edgelit diffusers, reflectors and light management components, and end plates that are suitable to being supported, aligned and coupled together conveniently in various configurations, thereby making ceiling arrangements easier to install, to reconfigure, and also to maintain. Moreover, the present disclosure relates to methods of installing and reconfiguring aforesaid ceiling grid lighting assemblies. Furthermore, the present disclosure relates to various types of modular elements that are suitable to being employed in aforesaid ceiling grid lighting assemblies. The aforementioned suspended ceiling arrangements are conventionally implemented to utilize "T"-bars, with ceiling panels supported by the "T"-bars, wherein the "T"-bars are hung from corresponding structural ceilings. Moreover, the present disclosure also relates to methods for mounting aforesaid modular elements onto the "T"-bars to support ceiling panels and electronic devices provided therein.

Background

Contemporary buildings, for example houses or offices, are implemented to have a structural ceiling from which is supported a suspended ceiling arrangement. Typically, the suspended ceiling arrangement includes a plurality of ceiling tiles or panels hanging at a distance of approximately 30 to 50 centimeters below the structural ceiling. The suspended ceiling arrangement further includes a plurality of T-bars that are configured to support the plurality of ceiling tiles or panels in position; the plurality of T-bars are suspended from the structural ceiling, for example via an arrangement of wires. Specifically, such an arrangement of the plurality of T-bars provides cells to accommodate the plurality of ceiling tiles or panels therein. Additionally, a flush-finish of lower surfaces of the plurality of T-bars, and the plurality of ceiling tiles or panels are such that they appear as a continuous mono-planar lower ceiling surface. Conventionally, suspended ceiling arrangements are found to be practical because wiring looms required for lighting devices, optionally other devices such as fans, loudspeakers and such like, can be aesthetically hidden from view above the ceiling tiles or panels. However, depending upon a configuration of suspended ceiling arrangement employed, the aforementioned wiring loom can become very scattered and chaotic, especially when it is modified after installation by various people to retrofit additional functional devices at a height of the suspended ceilings.

A further issue that is encountered with contemporary suspending ceiling arrangements is that replacing the suspended ceiling arrangements, for example when generally refurbishing a given building in which a suspended ceiling arrangement is installed, generates a lot of waste material that is potentially not straightforward to recycle or reuse; the waste material can be environmentally disadvantageous. Moreover, hazards of harmful dust falling over time from a structural ceiling onto an upper surface of the suspended ceiling arrangement, the structural ceiling often having a rough bare concrete surface, can make replacing ceiling arrangements hazardous to health for personnel handling aged suspended ceiling arrangement elements. Concrete used in older buildings can potentially sometimes include trace asbestos, radioactive hot particles (for example in regions near nuclear power plants), as well as other types of irritant materials.

SUMMARY

The present disclosure seeks to provide improved ceiling grid lighting assemblies that allow for the configuration of novel assemblies with improved appearance and performance as well as systems that easier initially to install, easier to reconfigure after initial installation (for example to achieve a modified functionality), and easier to recycle or reuse when a building incorporating the modular ceiling system is being dismantled or generally refurbished.

Furthermore, the present disclosure seeks to provide improved modular elements that are couplable together and to "T"-bars of suspended ceilings for implementing advanced implementations of suspended ceiling arrangements.

According to a first aspect, the present disclosure provides a modular ceiling system for use with a suspended ceiling arrangement, wherein the suspended ceiling arrangement includes a grid arrangement of "T"-bars suspended from a structural ceiling, wherein the "T"-bars define a general ceiling plane of the suspended ceiling arrangement having a plurality of ceiling panels, Novel supporting elements are used as separate or integrated components to enable multiple alternative configurations of ceiling grid lighting assemblies comprising functional modules, ceiling elements such as ceiling tiles, and T-Bar grids. Embodiments provide for configurations with multiple height levels and orientations, particularly with light fixtures as functional modules. Alternative embodiment integrate power systems and other useful elements such as acoustic or decorative panels, HVAC components or power systems, controls or sensors. Additionally, different embodiments are disclosed for mounting lighting assemblies in an interconnected line, array or pattern either on opposing sides of one or more T-bar elements or at or close to the intersection of T-bar main beam and cross beams. The novel lighting assemblies disclosed provide a variety of direct and indirect lighting functions and are typically based on LED light sources.

Additional aspects, advantages, features and objects of the present disclosure would be made apparent from the drawings and the detailed description of the illustrative embodiments construed in conjunction with the appended claims that follow.

It will be appreciated that features of the present disclosure are suitable to being combined in various combinations without departing from the scope of the present disclosure as defined by the appended claims.

BRIEF DESCRIPTION OF FIGURES

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein:

FIG. 2C is a table of optical properties of various edgelit transmissive optical element embodiments.

FIG. 10D shows the lighting assembly embodiment of FIG. 10C mounted within and spanning a single T-bar cell within a ceiling grid system. FIG. 10E shows the lighting assembly embodiment of FIG. 10C substituting for a T-bar within a ceiling grid system.

Figure 1A:
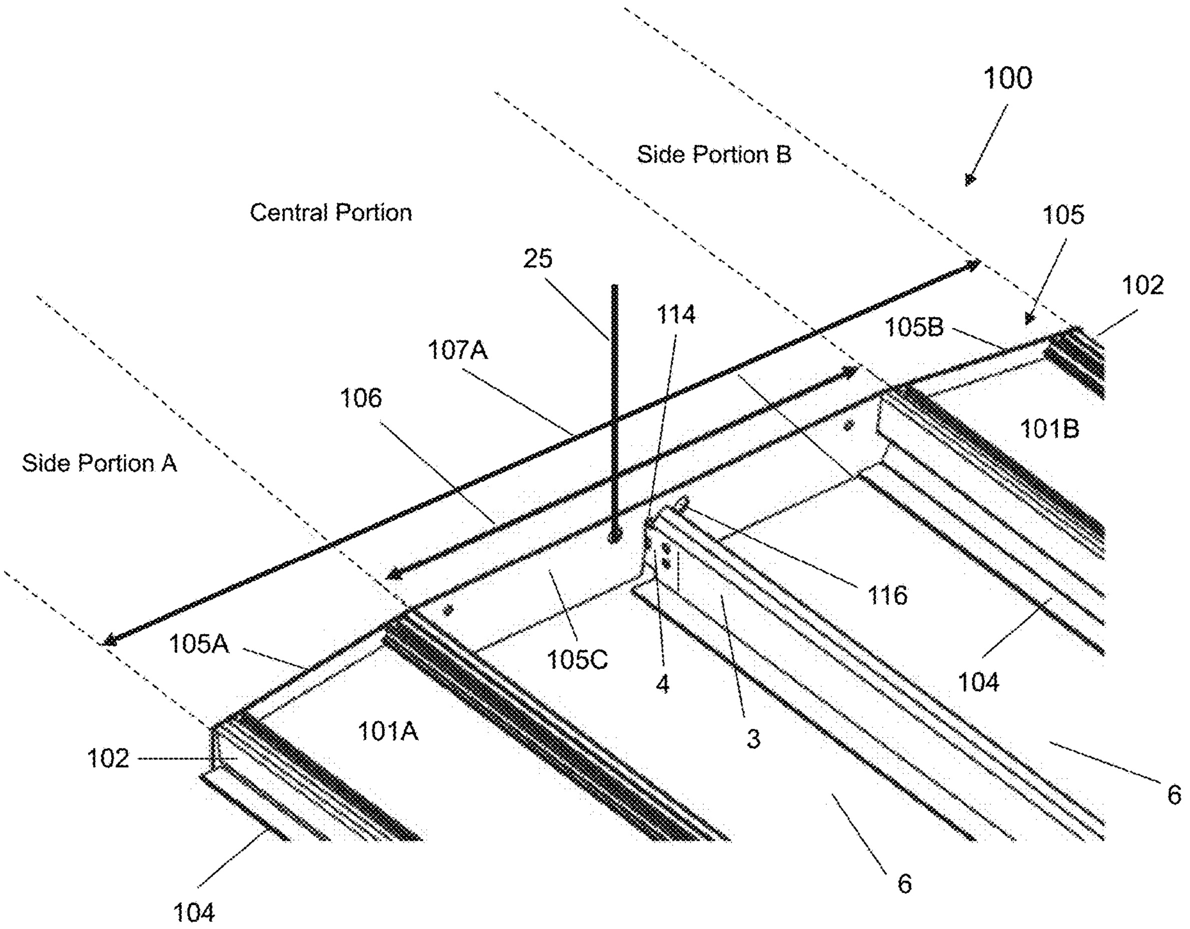
FIG. 1A is an isometric above view of an embodiment lighting assembly showing two linear support elements supported at a configured gap width apart.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION

In the following detailed description, embodiments of the present disclosure will be described with reference to accompanying illustrations, and ways in which the embodiments can be implemented. Although some modes of carrying out the present disclosure have been disclosed, those skilled in the art would recognize that other embodiments for carrying out or practicing the present disclosure are also possible.

In overview, the present disclosure is concerned with ceiling grid lighting assemblies that include modular components that are employable to implement suspended ceilings, also referred to herein as "suspended ceiling arrangements". Contemporarily, suspended ceilings are popular because they avoid having to beautify aesthetics of structural ceilings of buildings, and also provides working spaces between upper surfaces of the suspended ceilings and structural ceilings in which functional items can be accommodated. The working spaces are suitable to being populated by fixtures that provide enhanced functionality to given rooms. The modular components of the ceiling grid lighting assemblies of the present disclosure employ modular support elements. An example support element pursuant to the present disclosure has a slot that fits over one or more "T" bars that are employed to implement a given suspended ceiling, and includes at least one supporting portion that is provided with an arrangement of one or more supporting features for supporting at least one ceiling panel and at least one functional module therewith, for example light fixtures but not limited thereto. Moreover, such support elements can be fabricated from materials such as extruded Aluminum, molded plastics materials, sintered pressed powdered metal and so forth. It will be appreciated that using metal for fabricating the support elements is advantageous for providing a high mechanical strength as well as enhancing heat conduction from the at least one functional module mounted to the support elements; for example, when the at least one functional module include electronics modules such as switch-mode power supplies, driver units, audio power amplifiers, computing devices and the like, heat energy dissipated therefrom is beneficially conducted via the support elements to associated "T"-bars for heatsinking purposes. It will be appreciated that the aforementioned at least one functional module potentially includes at least one of: wiring looms, lighting modules, electronic assemblies such as driver units, sensors, sensor amplifiers, wireless multiplexers, computing devices and such like. Optionally, the support elements are supported at junctions whereas a plurality of "T"-bars mutually meet, at a mid-point along a given "T"-bar, or along a width of a given suspended ceiling panel. More optionally, the support elements are two opposing support elements mounted on a given "T"-bar at two respective longitudinal ends thereof. Beneficially, the at least one functional module, for power supply purposes and signal coupling purposes, are connected in a "daisy-chain" manner across a given suspended ceiling arrangement, thereby keeping an associated wiring loom very simple with short wire links between mutually adjacent support elements, and avoiding long and complex cable runs; such avoidance of long cable runs potentially results in less weight needing to be supported by a given suspended ceiling, as well as potentially providing a reduced risk of electrical fires due to electrical faults, and also potentially a reduced degree of electromagnetic interference. Optionally, the at least one functional module include therewith a spatially local data communication network that is either wire-based or near-field wireless or a combination of both, thereby allowing user-adjustable items such as light switch controls, temperature controls, light intensity controls, light color controls, anti-sound dampening degree controls, ventilation effect controls to be implemented wirelessly, whereby these controls are beneficially installed at various convenient locations in a given room equipped with a module ceiling arrangement; such controls thus beneficially communicate wirelessly directly to their fixtures of the suspended ceiling, also referred as "suspended ceiling arrangement", as aforementioned.

In such a manner, the ceiling grid lighting assembly can be provided with mutually different color outputs, or with color outputs that can be temporally varied, for example to provide a dynamically-changing room environment that mimics a natural outdoor environment, for example for reducing a feeling of claustrophobia or depression within the given room, for example for providing simulated white cloud effects on a light blue background, wherein the white cloud effects slowly spatially migrate over a period of minutes within the suspended ceiling arrangement. The ceiling grid lighting assembly thus employs an arrangement of two linear lighting modules comprising linear support elements that can be used in a given suspended ceiling arrangement that supports a plurality of ceiling panels and/or various types of functional modules. The two linear lighting modules are supported and retained in alignment by configured end plates mounted on each elongate end of the linear support element of the linear lighting modules. The end plate, which may be permanently fixed or removable and interchangeable, is typically affixed to the end of the linear lighting module by the use of one or more of screws, nuts, bolts, adhesives, rivets, tie-wraps.

The linear support element comprises both interior and exterior support features. The interior support features support and align the internal components such as LED boards, transmissive optical elements, reflectors, outer lenses and potentially internal driver, sensors or other electrical devices. The exterior support features maybe placed anywhere on the external surface of the linear support element and may provide various functions. For example exterior support feature extending from a side of the linear support element into the configured gap spacing can be configured to support ceiling panels or gear trays in the configured gap spacing. In addition, exterior support feature extending from a side of the linear support element opposite to the configured gap spacing side can support ceiling panels on the outer sides of the ceiling grid lighting assembly. Either inner or outer exterior support features of the linear support elements can be shaped like a TBar such as a 15⁄16" or 9⁄16" flat or a 9⁄16" slot style.

Furthermore, the linear lighting modules and the linear support elements thereof are capable of being configured by changing the position of the exterior support features to provide configured functional gap spacing at varying heights and to support ceiling panels at varying heights, for example at least one of:

(i) lower than the general ceiling plane;

(ii) higher than the general ceiling plane;

(iii) substantially at the general ceiling plane, (iv) at a tilted angle relative to the general ceiling plane.

The aforementioned linear support elements incorporate interior support features that are also capable of supporting one or more LED boards and a transmissive optical element in alignment; i) horizontally or parallel with ceiling grid plane, ii) vertically or perpendicular to ceiling grid plane, or (iii) tilted or obliquely angled relative to ceiling grid plane.

The aforementioned linear support elements are also capable of coupling heat energy generated therein via thermal conduction throughout their elongated body to associated "T"-bars arrangement, whereat the heat energy can be effectively and safely dissipated; for such purpose, the linear support elements are beneficially fabricated from a metal, for example from extruded Aluminum or from sintered metallic powder materials. Moreover, the linear support elements may be optionally mounted part-way, for example mid-way, along "T"-bars, or at junctions whereat a plurality of "T"-bars mutually couple or meet, wherein the linear support elements might beneficially support one or more ceiling grid lighting assemblies. Linear support elements may also be configured to include and support various functional devices such as down-lights, sensors, ventilation fans, loudspeakers, anti-sound ports, wireless repeaters or hubs for "wifi", and such like.

A key component in each assembly embodiment is the incorporation of a transmissive optical element situated proximate to the LED light sources and the use of reflectors and outer lenses. The input face of the transmissive optical element may be either its planar surface which is backlit or in the case of an edgelit system could be a side or edge. In the case of a backlit system the transmissive optical element could be a diffuser or a light shaping optic. It could also be a linear concave, convex or Fresnel lens. In the case of an edgelit system the transmissive optical element could be a high clarity light guide with laser etched dots, printed or engraved patterns or it could be a material similar to an edgelit signage panel, in either cases the clarity is typically greater than 95% and the haze less than 5%, Low clarity edgelit diffusers based on volumetric and surface light scattering where the clarity is typically less than 25% and the haze greater than 95% may also be suitable in cases where the required width of the optical element is less than a few inches or in cases where the uniformity of the light emitting surface of the linear lighting module is less critical. Edgelit diffusers generally tend to provide higher efficiency and better color mixing in such applications. In the case of reflectors, the embodiments detailed herein are typically based upon highly reflective white surfaces with a large specular component. Typically the reflector could be a white reflective film, or sheet, or a metal sheet such as aluminum with a specular coating applied. The outer lenses are typically a light redirecting or diffuser material. In the case of diffusers; the higher the level of haze and diffusion the more rounded the lighting distribution. Conversely if outer lens materials with lower haze and higher clarity are chosen it is possible to achieve more directional, asymmetric or tilted lighting distributions. In practice, a minimal level of light scattering in the transmissive optical element or the outer lens has been found to be desirable Features and component parts of the ceiling grid lighting assembly and it associated linear support elements, LED light sources and end plates will be described in greater detail below. For the benefit of brevity and clarity features and components of ceiling grid lighting assembly embodiments are labelled numerically. Those elements that are standard are listed sequentially whereas those elements that change in design or characteristics depending upon the ceiling grid lighting assembly embodiment are based upon "XX" first representing the primary number of the figure.

LIST OF NUMERICAL REFERENCES

1 LED light source
2 LED board/Printed circuit board (PCB)
3 T-Bar
3A T-Bar horizontal portion
3B T-Bar vertical portion
4 T-Bar anchor
5 Electrical device (e.g. driver, sensor)
6 Air or air gap
7 Screw or fastener
8 LED board surface
9 Reflector or reflective surface
17 Surface of PCB
18 Channel or strings of LEDs
19 LED board electrical connector
20 LED driver or power supply
21 Sensor
22 Ceiling grid plane
24 Ceiling panel
25 Suspension cable or wire
30 Longitudinal T-bar
32 Transverse T-bar
122 Alignment bracket
124 Lighting assembly electrical connector
126 Electrical wiring
XX00 Ceiling grid lighting assembly
XX01 Linear lighting module
XX02 Linear support element
XX03 Interior support feature of linear support element
XX04 Exterior support feature of linear support element
XX05 End plate
XX06 Configured gap spacing
XX07A Configured assembly width
XX07B Configured assembly length
XX08 Transmissive optical element
XX09 Reflector or reflective surface
XX10 Outer lens or outer surface
XX11 LED Board XX12 Optical cavity
XX13 Cover plate or gear tray
XX14 End plate slot
XX16 End plate hole FIG. 1A is an illustration of an embodiment of the ceiling grid lighting assembly 100 of a configured width 107A showing two linear lighting modules, designated as Module A 101A and Module B 101B supported by an end plate 105 in a parallel and horizontal alignment at a configured gap spacing 106 apart with nothing in the configured gap spacing other than air 6 and a T-bar 3. The end plate 105 comprises two side portions 105A and 105B to connect, support, and enclose a longitudinal end of each of the two linear lighting modules and are contiguous with a central portion 105C to collectively retain the two linear lighting modules in a parallel and horizontal alignment with a configured gap spacing 106. The end plate can be fashioned from thin gauge sheet metal and is configured to support the two lighting modules in parallel alignment. In this embodiment the end plate is configured so as to create a configured gap spacing 106 and the end plate includes a slot 114 to mount over the T-Bar anchor 4. The ceiling grid lighting assembly, including the end plate 105, has a maximum height less than the height of the vertical portion of the T-Bar 3 shown. This is important for applications where there is little or no plenum space. As shown, the end plate 105 comprises three distinct sections or portions, namely a central portion and two side support portions. In the embodiment shown there is a slot 114 on the central portion 105C that is detachably mountable in operation on a given "T"-bar, and two side supporting portions 105A and 105B that are integral with the central portion 105C. Herein, the base of the central portion 105C also defines the configured gap spacing 106 of approximately ½". The end plate further comprises holes 116 or other feature to enable the attachment of a suspension cable or wire 25 to fix it to the structural ceiling above. ceiling grid lighting assembly 100. Exterior support features 104 incorporated into the inner and outer edges of the linear lighting modules are further configured to support items positioned in the configured gap spacing or to support ceiling panels adjacent to the ceiling grid lighting assembly or alternatively rest on T-bars in certain embodiments. Holes 116 in the end plate can also be used to position fasteners for attachment to a T-bar during installation. Examples of fasteners include but are not limited to screws, rivets, anchors, clips, and ties.

Figure 1B:
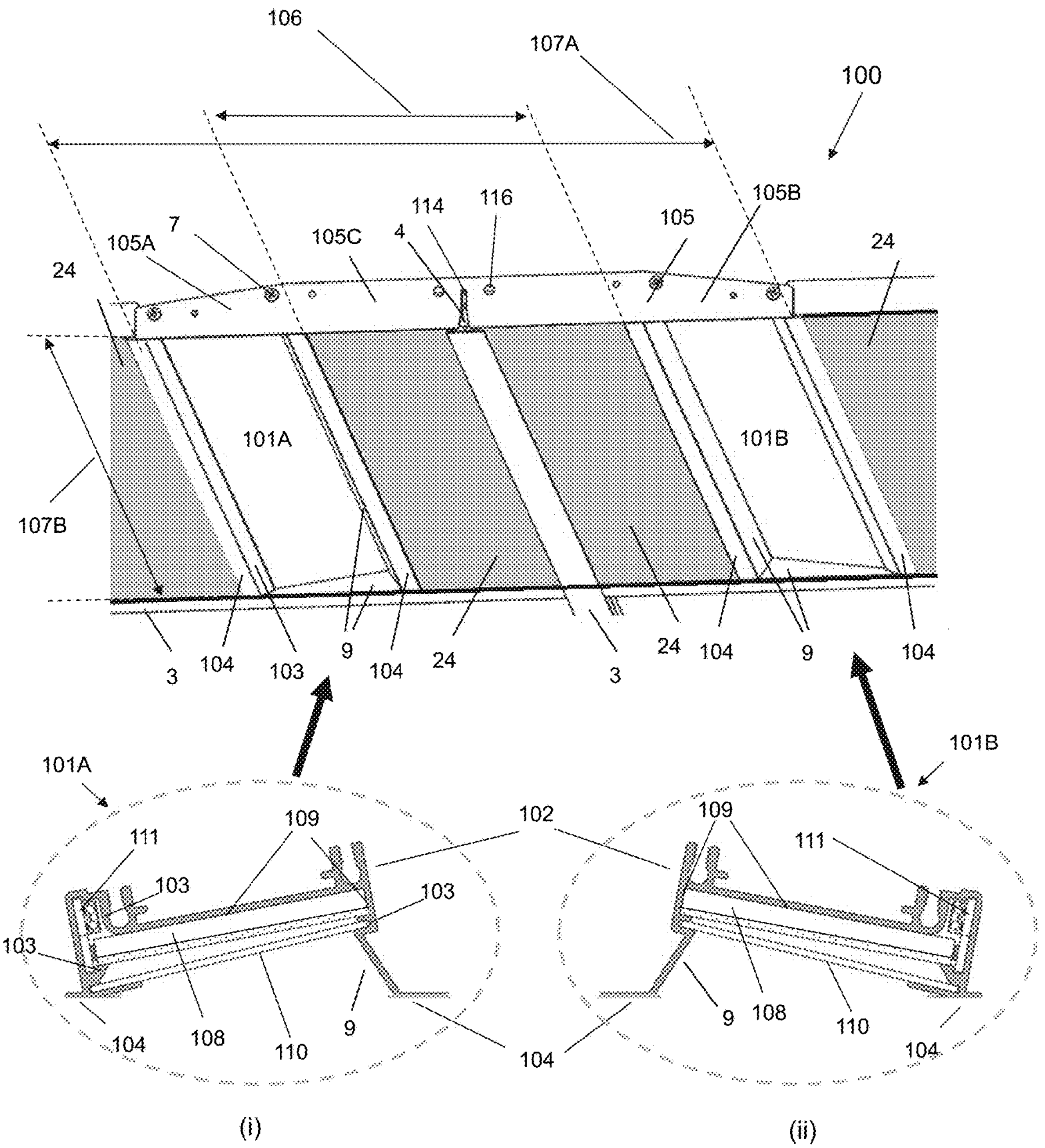
FIG. 1B is an isometric below view of the lighting assembly embodiment of FIG. 1A installed in a suspended ceiling arrangement and additionally shown are linear lighting module cross section enlargement views (i) and (ii)
Figure 1C:
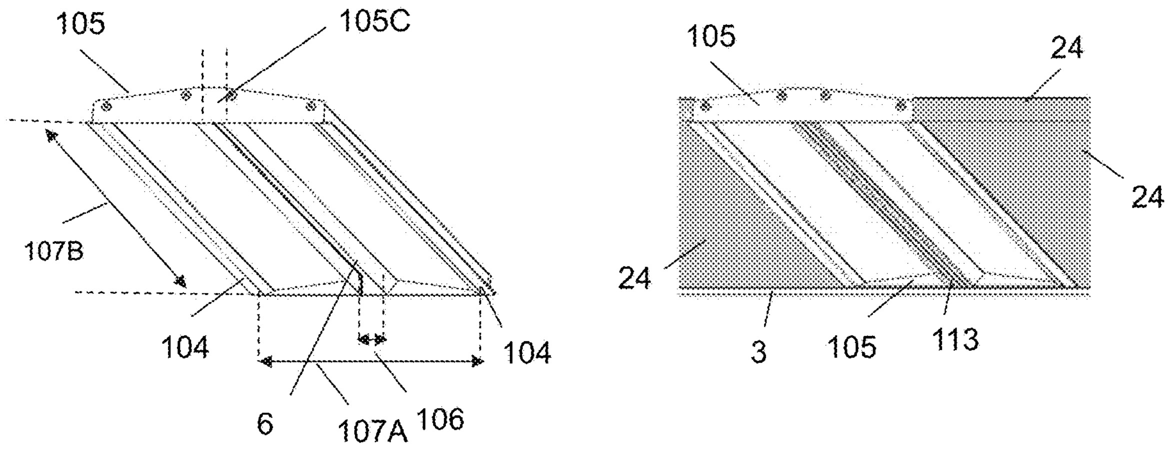
FIG. 1C is an isometric view of an embodiment lighting assembly outside of (i) and within (ii) a grid ceiling.
Figure 1D:
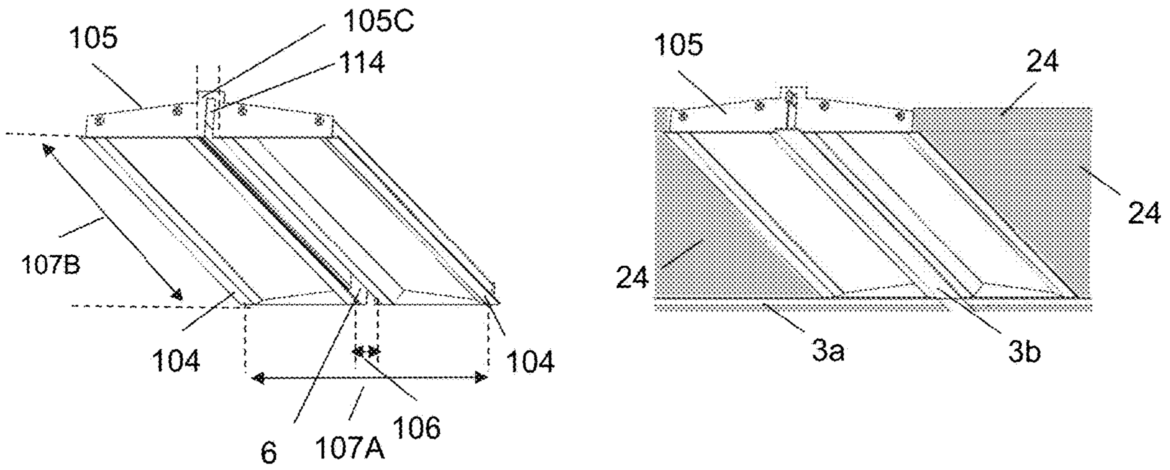
FIG. 1D is an isometric view of an embodiment lighting assembly outside of (i) and within (ii) a grid ceiling wherein the endplate further comprises a slot for alignment with a longitudinal T-bar.
Figure 1E:
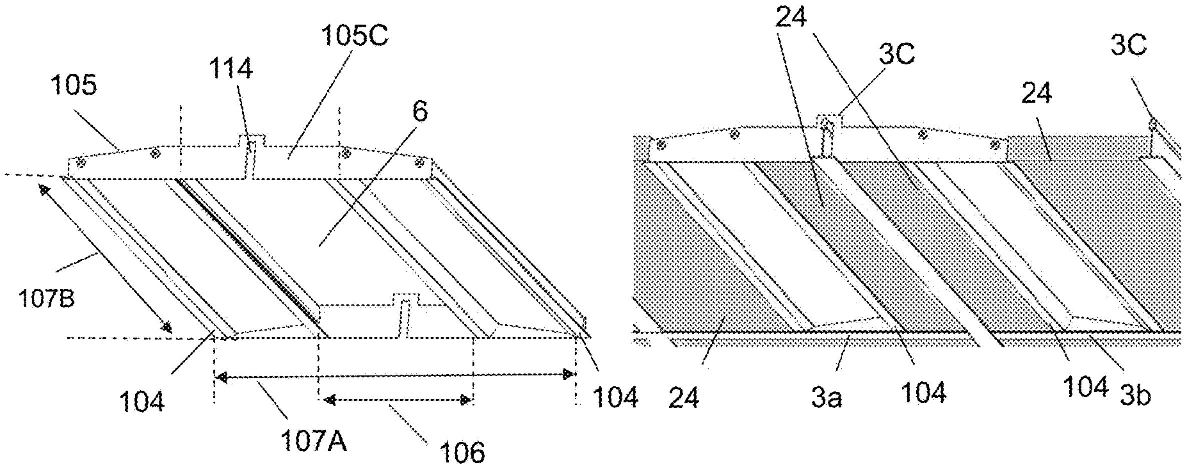
FIGS. 1E and 1F are illustrations of 2 lighting assembly embodiments of the ceiling grid lighting assembly with differing endplate slot configurations.
Figure 1F:
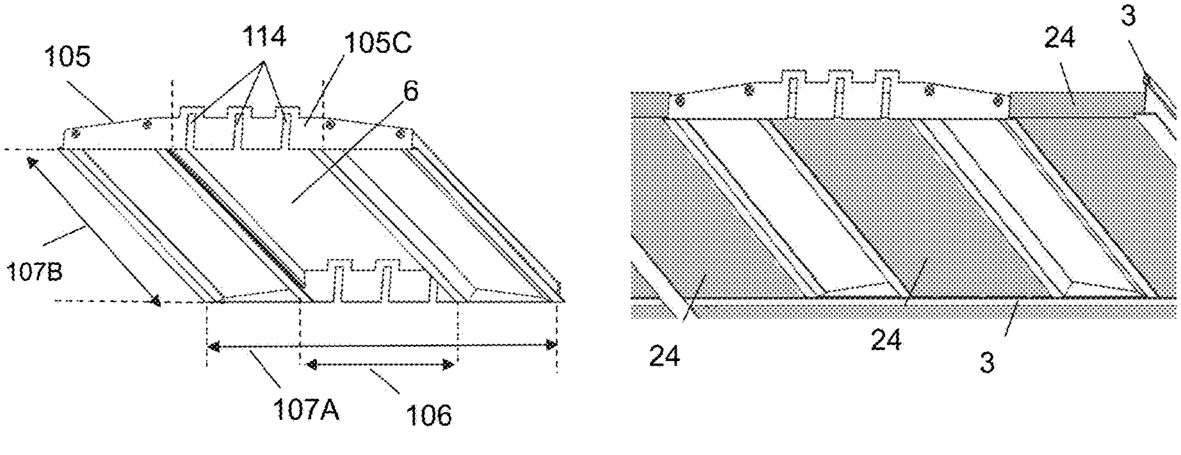
Figure 2A:
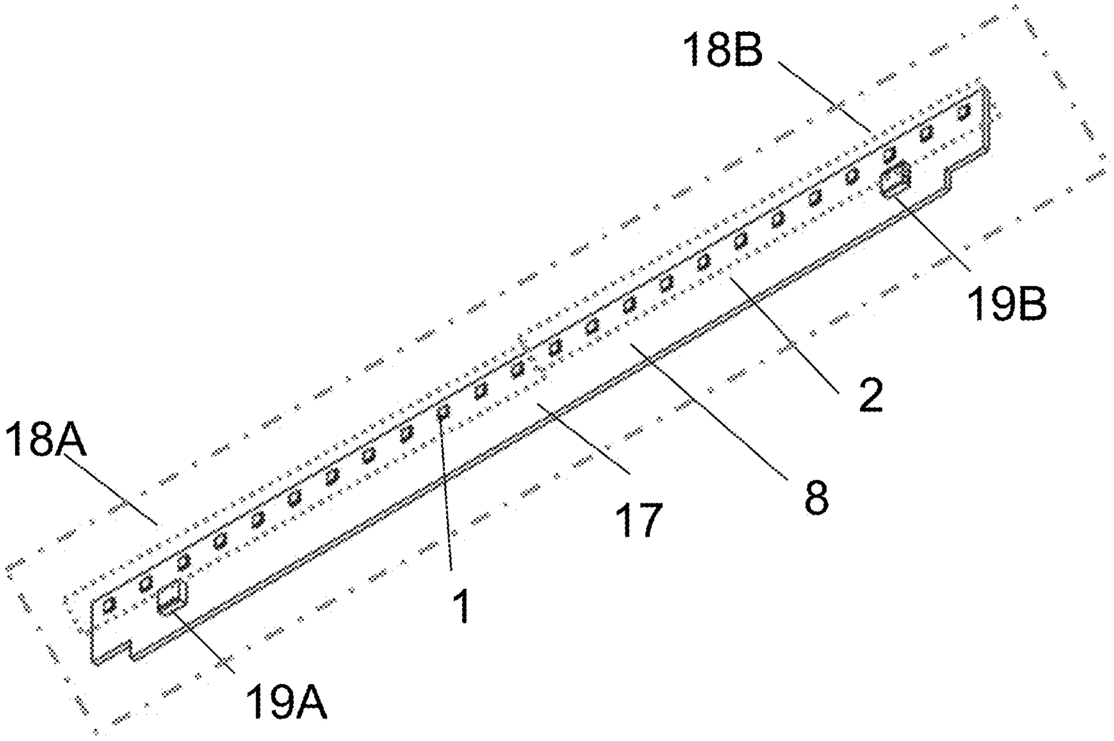
FIG. 2A is an isometric view of a 2 channel LED board embodiment.

FIG. 1B is a view from below of the embodiment ceiling grid lighting assembly 100 of FIG. 1A with configured width 107A and configured length 107B installed in a ceiling grid showing how the exterior support features 104 on the inner and outer edges of the two linear lighting modules 101A and 101B support ceiling panels 24 in the configured gap spacing 106 as well as on the outer sides of the ceiling grid lighting assembly. FIG. 1B also shows a T-Bar anchor 4 placed in the slot 114 feature of the central portion 105C and as a result a T-bar 3 positioned within the configured gap spacing 106. In this embodiment the outer surface of the lighting module is angled relative to the ceiling grid plane and part of the outer surface is recessed and as such the internal face of the end plate creates a visible external reflective surface 9 that is triangular in shape. There is also a reflective surface defined by the internal surface of the linear lighting module. When combined these create the boundaries for an optical cavity which can be configured as per design requirements. For instance if the outer surface was supported in recessed position and horizontal and parallel to the ceiling grid plane the reflective surface of the end plate would be rectangular in shape. Similarly, the internal features of the linear light module can be configured to achieve different degrees of recess, as well as different angular and decorative effects and reflect light in different ways. Included in FIG. 1B are details concerning the construction of the linear lighting module embodiments 101A and 101B based on similar designs that are held in a parallel "mirroring" arrangement by the end plate 105. The diagrams illustrate exterior support features on either side of the linear support element body 104 that are designed to replicate the design and function of the horizontal portion of a 9/16" T-Bar. These features could also be of a different design, such as a 9/16" slot style. Also shown are opposing first and second interior support features 103 of the linear support element 102 that retain the LED board 111, the transmissive optical element, which in this embodiment is a low clarity edgelit diffuser 108, reflectors 109 and outer lens 110 in a tilted alignment relative to the ceiling grid plane. Also shown is an internal reflective surface of the linear support element 9 that provides part of an external optical cavity when viewed from below and a semi recessed appearance to the ceiling grid lighting assembly;

FIGS. 1C, 1D, 1E and 1F are illustrations of 4 different embodiments of the ceiling grid lighting assembly with the same linear lighting modules supported by end plates 105 in parallel and horizontal alignment with different configurations of the end plate central portions 105C and therein different configured widths 107A and different configured gap spacings 106. The configured length 107B for these assemblies is shown as matched to the configured width 107A to fit within a standard square ceiling grid T-bar cell, for example, a 2'×2' T-bar cell. The end plate 105 is attached to the ends of the linear support elements by screws 7. In each illustration the ceiling grid lighting assembly only is denoted by (i) and the same lighting assembly in a ceiling grid is denoted as (ii). FIG. 1C illustrates one embodiment of the ceiling grid lighting assembly with a configured end plate central portion 105C, assembly width 107A and gap spacing 106 that is designed to accommodate a driver that is attached to a cover plate 113 that is positioned in the configured gap spacing from below or above and holds the driver in place. The typical width of an LED driver in the power range of 20 W to 90 W used in the embodiments is between 1 inch and 1½ inches. This would therefore typically be the width of the configured gap spacing plus approximately ⅛" to ¼" for clearance. Ceiling panels are further supported on either of the outer edges of the lighting assembly FIG. 1D illustrates an embodiment where the end plate central portion 105C, assembly width 107A and gap spacing 106 are configured to allow the vertical portion of a T-Bar to be positioned within in it. In this embodiment, which typically requires a narrower configured gap spacing of approximately ½" there is also a "U" shaped slot 114 in the end plate central portion 105C to allow the end plate to be positioned over the T-Bar anchor or the vertical portion of the T-Bar. FIG. 1E has a wider configured end plate central portion 105C, wider width 107A and a configured gap space of 6" to 12" 106 that is designed to accommodate a T-Bar and two narrow sections of a ceiling panel or decorative element on either side of its vertical portion. The ceiling panel or decorative element is supported by the exterior support features 104 on the two linear support element of the lighting assembly that are positioned in the configured gap spacing 106. In this embodiment the end plate sits on two different T-Bars 3*a* and 3*b* with a further T-Bar 3C positioned in the configured gap. FIG. 1F illustrates an embodiment with a wider configured end plate central portion 105C, wider assembly width 107A and a wider configured gap spacing of between 12" and 20" 106 with 3 different positions of the "U" shaped slots 114 in the end plate that enable the lighting assembly to be positioned in 3 different ways when placed over a T-Bar. This embodiment is of a type that could be fitted in a full 1×2, 1×4, 1×8, 2×2 or 2×4 ceiling grid assembly. Typically in such applications the configured width 107A and length 107B of the lighting assembly would be slightly less than 11.75" or 23.75" which is the measured gap between two vertical portions of T-Bars on either side of a typical ceiling grid assembly cell. It should be noted that in all the above embodiments the linear light modules are identical although this does not have to be the case and assemblies with two different linear lighting modules widths or other dimensions could be utilized. The only distinction between the embodiments is the configuration of the end plate. Furthermore, it would be obvious that the end plate could be configured so it was removable and interchangeable with other end plates of a different configuration or that the end plate could be designed so as to enable more than one configuration from a single end plate for instance by introducing features that enabled one side of the end plate to slide or pivot over the other side of the end plate;

FIG. 2A illustrates design principles of an LED board embodiment 111 used in the ceiling grid lighting assembly embodiment 100. The LED board comprises a configured electrical arrangement of LED light sources into channels with electrical connectors for power coupling. is a view of an LED board 2 comprising printed circuit board 17, with adjacent rows 18A and 18B of LEDs 1 and surface mounted electrical connectors 19A and 19B as used in the various lighting module embodiments. Alternatively the electrical connectors could be replaced with pads onto which electrical wires are soldered. In this case there are two collinear rows of LEDs each containing 12 LEDs in series. Electrical power is supplied to each row 18A and 18B via a surface mounted electrical connector 19A and 19B respectively. For optimum performance and increased efficiency it is desirable to have a highly reflective white solder mask on the LED board surface 8 which helps to redirect and recycle any reflected or backscattered light from the input face back into the transmissive optical element for improved efficiency. Various embodiments also provide means for adjusting light distributions dynamically to control light output characteristics by controlling the input signals to the LED board included in the assembly. The number of LEDs in each row is determined by the chosen driver and controller. Typical commercially available drivers are classed as either constant current or constant voltage. Typical constant current drivers deliver a DC input voltage in the range of 30V to 48V. The forward voltage of LEDs is approximately 2.7V-2.8V. This means that rows of LEDs in series typically contain 10 to 16 LEDs. Fewer LEDs per row may also be used such as with a typical 12V or 24V constant voltage drivers which is a common configuration for LED tape lights. Adjacent rows can be arranged in a continuous line on the PCB or in parallel, or in an interleaving arrangement where LEDs of one row alternate with LEDs of another. Typically rows of LEDs are a few inches long and LED boards range in length from a few inches to 4 feet. The PCB is typically either FR4, a composite material, or metal core (MCPCB), and in most cases the electrical circuit is produced in copper or a similar highly conductive material. In the case of long lengths of linear lighting modules multiple LED boards are typically connected together in. It is also possible through simple modifications to the printed circuit board design to apply electrical power to one or more adjacent rows at the same time or control adjacent rows independently. When connecting multiple LED boards together it's useful to offset the positioning of connectors on the PCB such that they are not in line with the LED sources but rather offset and as such they are above or below the light scattering optical element and reflector when the PCB is mounted in the lighting module housing. This enables adjacent rows of LEDs to not be interrupted by connectors and avoids the problem of "connector shadow", a dark area visible on the light fixture or lighting module output face.

Figure 2B:
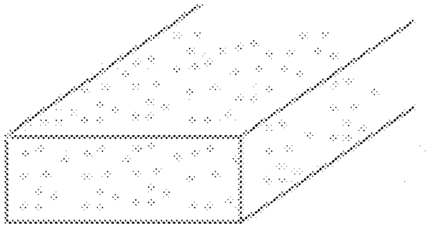
FIG. 2B shows isometric views of an assortment of edgelit transmissive optical element embodiments.
Figure 2B:
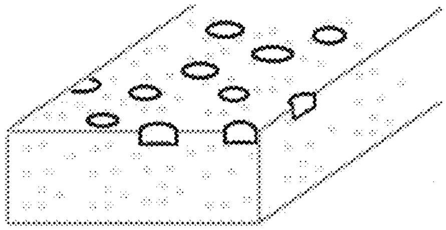
Figure 2B:
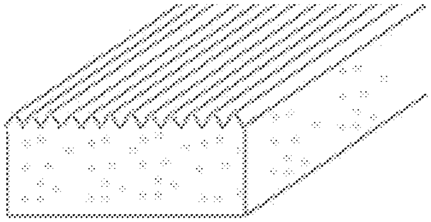
Figure 2B:
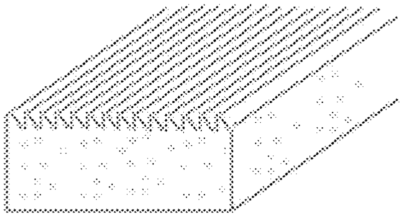
Figure 2B:
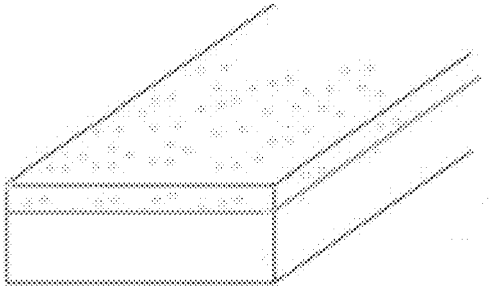
Figure 2B:
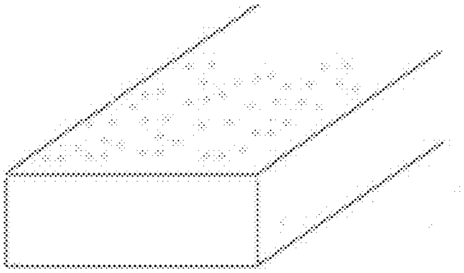
Figure 2B:
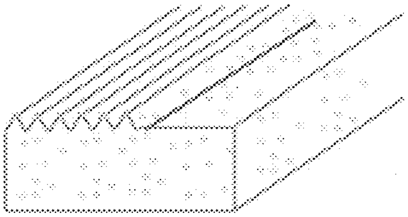

FIG. 2B details isometric views of various edgelit transmissive optical elements as used in ceiling grid lighting assembly embodiment 100. These are all based upon the key elements detailed in FIG. 2A. Transmissive optical elements produced and tested included light guides and low clarity planar light scattering optical elements (edgelit diffusers) with no surface features and planar light scattering optical elements with surface features, such as linear lenticular lens and prismatic patterns. Planar light scattering optical elements with surface features also had different feature shapes and varying patterns. Diffuse planar light scattering optical elements are categorically defined as light scattering optical elements without surface features but it should be clarified that at a small scale it there are dispersed patterns of small surface protrusions and indentations corresponding to light scattering particles within the light scattering optical element that are at or near the surface. In some embodiments this can be noticeably apparent by a matte finish of reduced gloss and can be quantitatively measured with a gloss meter. It is within the scope of the invention to add matting agents to the light scattering optical element formulation to reduce the smoothness or gloss of a light scattering optical element face to increase light extraction. Light scattering optical elements were produced in PMMA using profile extrusion, lamination and coating techniques. Surface patterns were produced using in-line tooling or using a secondary process step using a laser engraving equipment. Light scattering optical elements or optically transmissive bulk materials used to support layers or coatings can be produced using continuous extrusion and casting techniques either at the correct width and dimensions and subsequently cut to length or they can be processed in larger area sheet form and cut to size using typical processes suitable for cutting plastics such as a CNC router, laser cutter or table saw. In the case of coating being used to manufacture the light scattering optical element the sheet might be as large, or larger than, 96"×48" and the light scattering optical element can be cut into thin strips of 96" length for use in linear light fixtures or into shapes such as circles, rings or squares. It is obvious to those skilled in the art that alternative production methods would yield similar results. For instance, if the light scattering optical elements were made to the same optical properties, dimensions and design and using similar materials in a film or sheet extrusion process or a continuous or cell cast polymer casting process or using an injection molding techniques the optical performance of the light scattering optical elements would be operationally similar. Furthermore, as a general rule; height of transmissive optical element is typically 30%-100% taller than LED height, with the optimum for alignment in slim designs being about 50%. This is to ensure that the majority of light from the LED emitting surface is directing towards the input face. For example if the LED height is 3.0 mm the chosen height of the light scattering optical element is 3.9 mm-6.0 mm with an optimum choice of 4.5 mm and vice versa.

Another critical element of the assembly performance is the use of reflectors or reflective surfaces in proximity to the transmissive optical element. Broad spectrum specular reflectance plastic white reflective films (WRF) with thickness between 50 um and 500 um and thin gauge coated reflective aluminum sheets (specular Al) with thickness between 100 um and 1 mm were found to work best. White powder coated surfaces could also be used but with lower efficiency levels and potentially less desirable uniformity of light emitting surfaces. Significant losses were observed when using non-white powder coated paints. Powder coated paints also tend to be generally matte or diffuse and do not possess a comparable level of specular component to the reflector films and sheet used and as such resulted in undesirably lower efficiency levels and significantly less control of the light distributions. It would be obvious to those skilled in the art that the reflector films and sheet could be replace by a surface coating if that surface coating or surface treatment were a closer match to the properties of the reflector films and sheets. Such coatings or surface treatment might be produced using high reflective inks or by sputter coating internal surfaces of the lighting module housing.

FIG. 2C provides a table of the optical properties of various embodiments of edgelit transmissive optical elements. Included in the table for comparison is data representative of typical light guides used in display and signage applications. Light guides typically have zero or very low light scattering, high optical transmission, high clarity and low haze. Light guides also typically have surfaces that are high gloss in order to help with the total internal reflection (TIR) process. In comparison, all the embodiments of the light scattering optical elements (edgelit diffusers) are shown to have significantly different optical properties, namely high levels of light scattering, low clarity, high haze and low gloss. Light scattering measurements of full width half maximum (FWHM) were done on test equipment using a green 532 nm laser projected normally into a sample face with the scattered light from the opposing side measured. Clarity is a measurement of narrow angle scattering and is a standardized characterization of the translucence or "see-through" property of an optically transmissive component. It is a standard measurement on BYK Haze-gard Plus equipment as an added measurement to the ASTM D1003 test method configuration established for transmittance and haze.

Figure 3A:
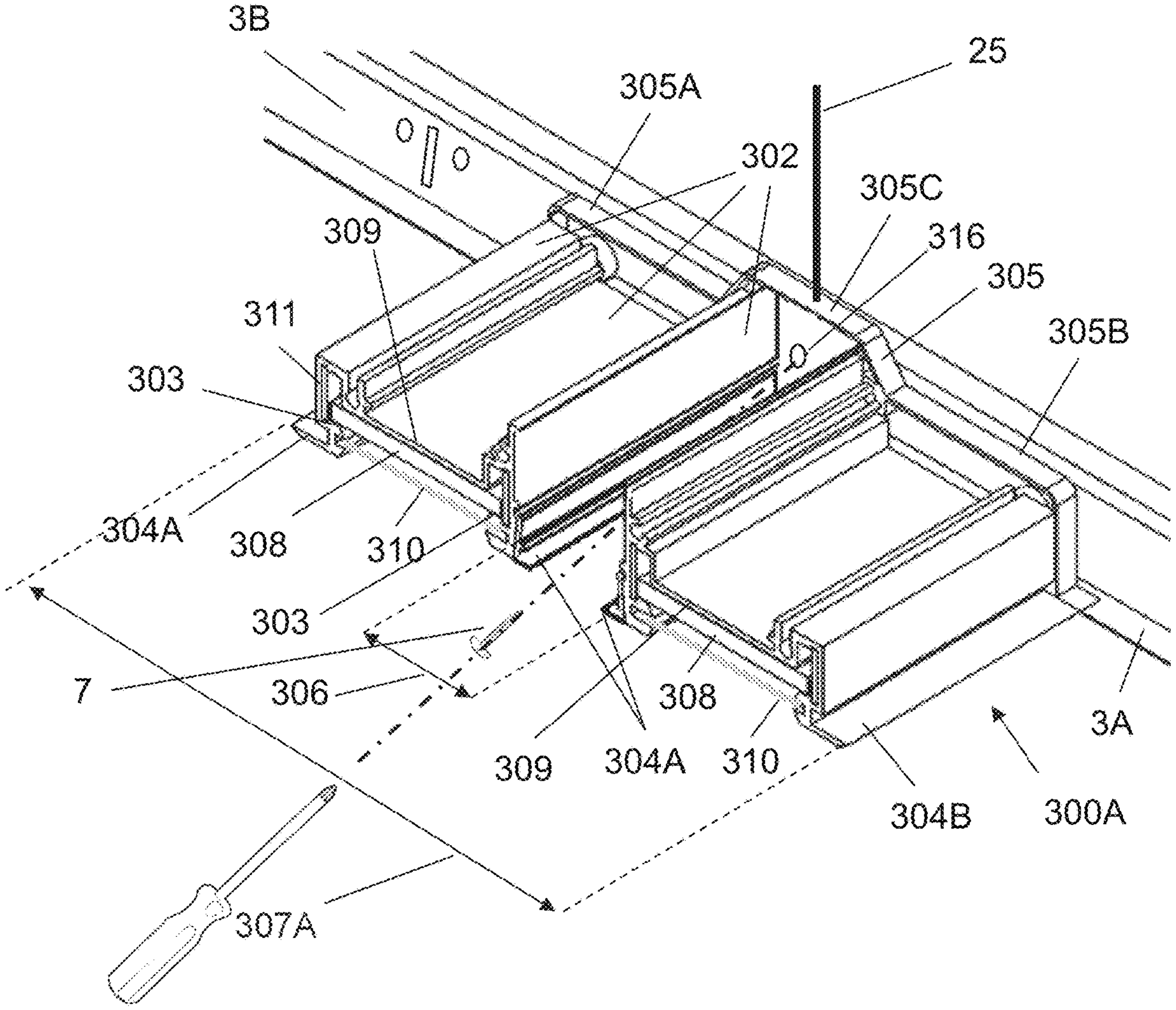
FIG. 3A is an isometric view of an embodiment lighting assembly mounted in a perpendicular manner to a T-Bar with a cross-section plane showing linear module components including linear support elements, end plate, LED board and transmissive optical element.

FIG. 3A is an isometric view of one embodiment of ceiling grid lighting assembly 300A of configured width 307A mounting in a perpendicular manner to a T-Bar with configured gap spacing 306. The illustration highlights critical components such as the linear support elements 302, end plate 305, LED board 311, transmissive optical element 308, and the linear support elements 302 either side of the configured gap spacing 306 and supported from each elongate end by an end plate 305. The end plate further comprising two side support portions 305A and 305B and a central portion 305C. Each linear support element 302 comprises both interior and exterior support features and connects to the side support portion 305A or 305B of the end plate. The interior support features 303 of each linear support element support and align the internal components such as LED board 311 in vertical alignment, edgelit transmissive optical element 308 in horizontal alignment, which may be a light guide or low clarity edgelit diffuser, a reflector 309 behind the transmissive optical element, an outer lens or cover lens 310 in horizontal alignment which also acts as the outer surface of the linear lighting module. The linear support element also provides a means for attaching or mating to the end plate 305. The exterior support features 304 maybe placed anywhere on the external surface of the linear support element and may provide various functions. For example exterior support features 304A extending from a side of the linear support element elongate body into the configured gap spacing can be configured to support ceiling panels or gear trays in the configured gap spacing. In addition, exterior support features 304B extending from a side of the linear support element elongate body opposite to the configured gap spacing side can support ceiling panels on the outer sides of the ceiling grid lighting assembly. Either inner or outer exterior support features of the linear support elements can be shaped like a TBar such as a 15⁄16" or 9⁄16" flat or a 9⁄16" slot style. The embodiment end plate 305 is a 3-dimensional (3D) printed part configured to have its thickness approximately the same dimension as the width of the top of the T-Bar horizontal portion or ledge 3A such that the elongate body of the linear support element is supported adjacent and perpendicular to the mounting T-Bar 3 and does not rest on T-Bar horizontal portion. The end plate could also be made using any manner of alternative techniques such as injection molding, vacuum forming, metal machining or metal stamping.

Figure 3B:
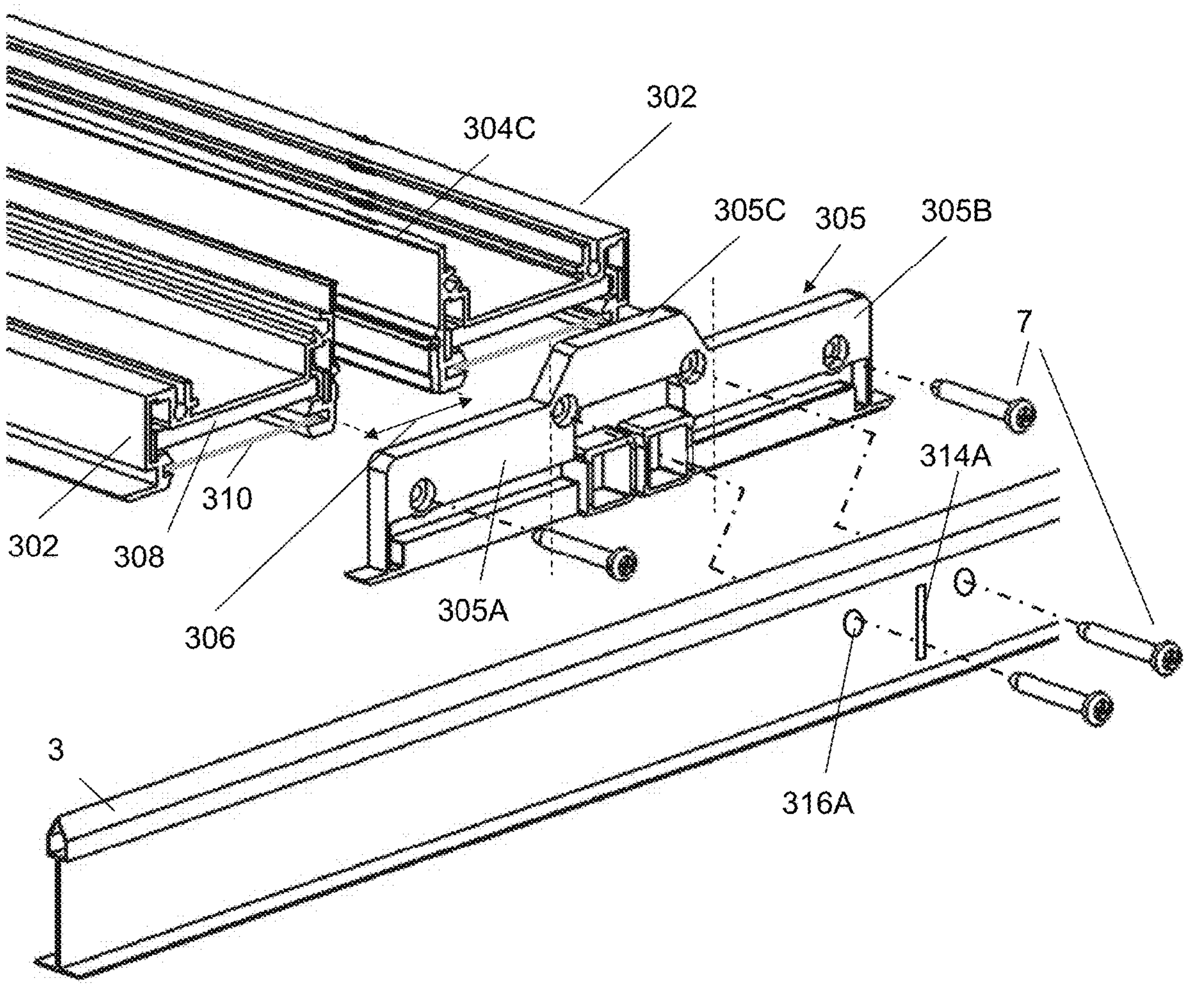
FIG. 3B is a isometric partially exploded view of a lighting assembly embodiment with suspension cable and in-line end cap mounting onto a T-bar.
Figure 3C:
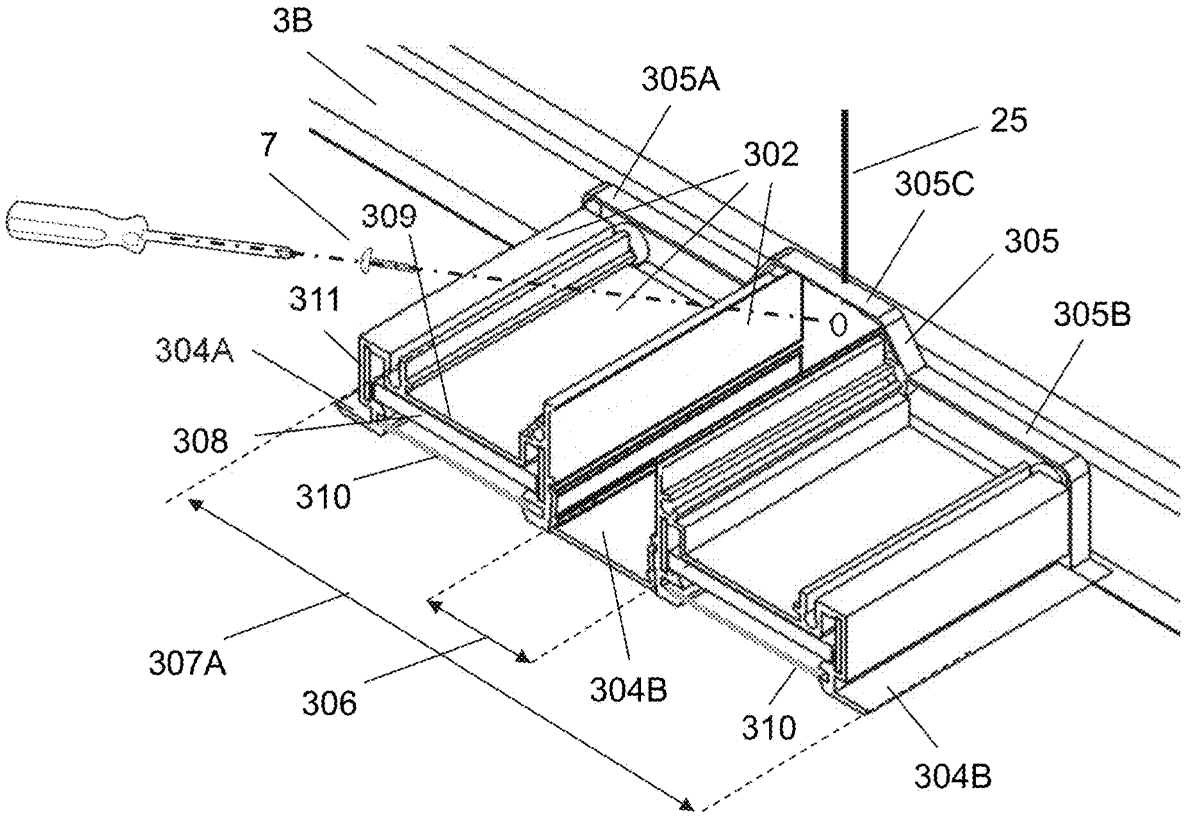
FIG. 3C and FIG. 3D are lighting assembly embodiments having support ledges extending into the configured gap spacing.

In FIG. 3A and FIG. 3C there is are holes 316 in the central portion of the end plate 305C which can be used in attaching the lighting assembly to a T-bar vertical portion, for example by means of a screw 7 or other fastener such as bolt nut, rivet, anchor, tie wrap, clip, clamp, bracket, adhesive. In this way, the lighting assembly with open configured gap can be installed by positioning onto T-bar horizontal flanges within a ceiling grid arrangement and then additionally and more solidly anchored from within a room below by attaching through the easily accessible central cavity. Subsequently, a gear tray, cover lens, lighting module, or other component or sub assembly can be raised and locked into position within the configured gap to complete the installation. In FIG. 3A the fastener attachment is accessible from below the lighting assembly while in FIG. 3C the fastener attachment is accessible from above the lighting assembly. In some embodiments the use of a hole, slot or other type of opening in the end plate is used in an attachment configuration between end plate and T-bar vertical portion but in other embodiments, such as with a clip, clamp, or adhesive fastening, openings in the end plate are not needed.

As illustrated further in FIG. 3B, the ceiling grid lighting assembly is approximately 6.5" wide with two linear lighting modules separated by a configured gap spacing 306. In this embodiment the LED driver can be retained in the configured gap spacing by features incorporated into the upper positioned extended exterior support feature 304C which is connected on either side to both linear support elements 302. In this embodiment the central portion of the end plate 305C also comprises a recessed cavity and features on its outer surface that accommodate the anchor of a T-bar when the anchor is used to connect a T-Bar to the mounting T-bar using slot 314A or holes 316A as shown. This is an important design feature for ceiling grid layouts that require the lighting assembly to be mounted in line with a row of T-bars. Without this feature the anchor would be blocked by the end plate and it would not be possible to mount in line.

Figure 3D:
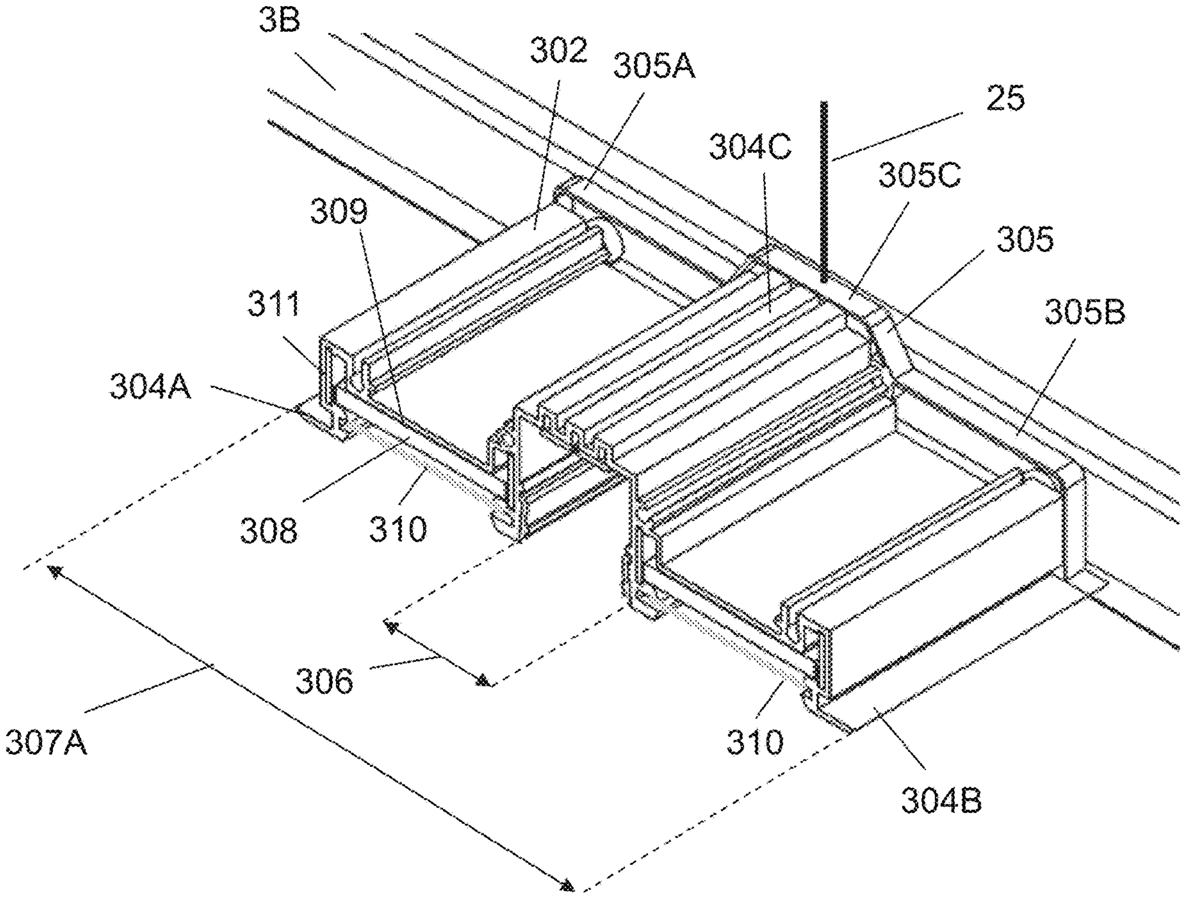

FIG. 3C and FIG. 3D are further embodiments 300C and 300D of the ceiling grid lighting assembly of the same configured width 307A and the same configured gap spacing 306. In both embodiments exterior support features 304A as described in FIG. 3A of one or both of the linear support elements are extending into the configured gap spacing 306 to create a "support ledge" that is either positioned at a level similar to the ceiling grid plane illustrated as 304B as in FIG. 3C or is at a higher level above the ceiling grid plane illustrated as 304C as in FIG. 3D. A benefit of the support ledge is that it is permanently in place and can easily be fashioned to support electrical devices. For instance in the FIG. 3C embodiment the lower support ledge configuration can have a hole through which a sensor, such as an infra-red occupancy sensor, can be positioned. The lower support ledge also makes it easy to drop in a driver or controller from above the lighting assembly and which would then be fully supported by the extended lower support ledge 304B. In the case of FIG. 3D the extended support feature or ledge 304C has been further configured with screw bosses and channels into which a driver or sensor can be screwed or otherwise fastened.

It is important to note that in the cases of the embodiments of the type shown in FIG. 3C and FIG. 3D that depending on the required overall width of the ceiling grid lighting assembly this type of embodiment can be extruded as a single extrusion. Modern aluminum extrusion techniques typically use dies in the maximum range of 8" or 9" in diameter. For instance; if the desired width of the lighting assembly is approximately 9" or less then it is possible to extruded the linear support elements joined together in one extrusion die. However; if the ceiling grid lighting assembly is desired to be wider then it is potentially not possible to extrude as one die and rather it would be produced as two separate linear support elements that are pushed together with a minimal configured spacing gap.

Figure 3E:
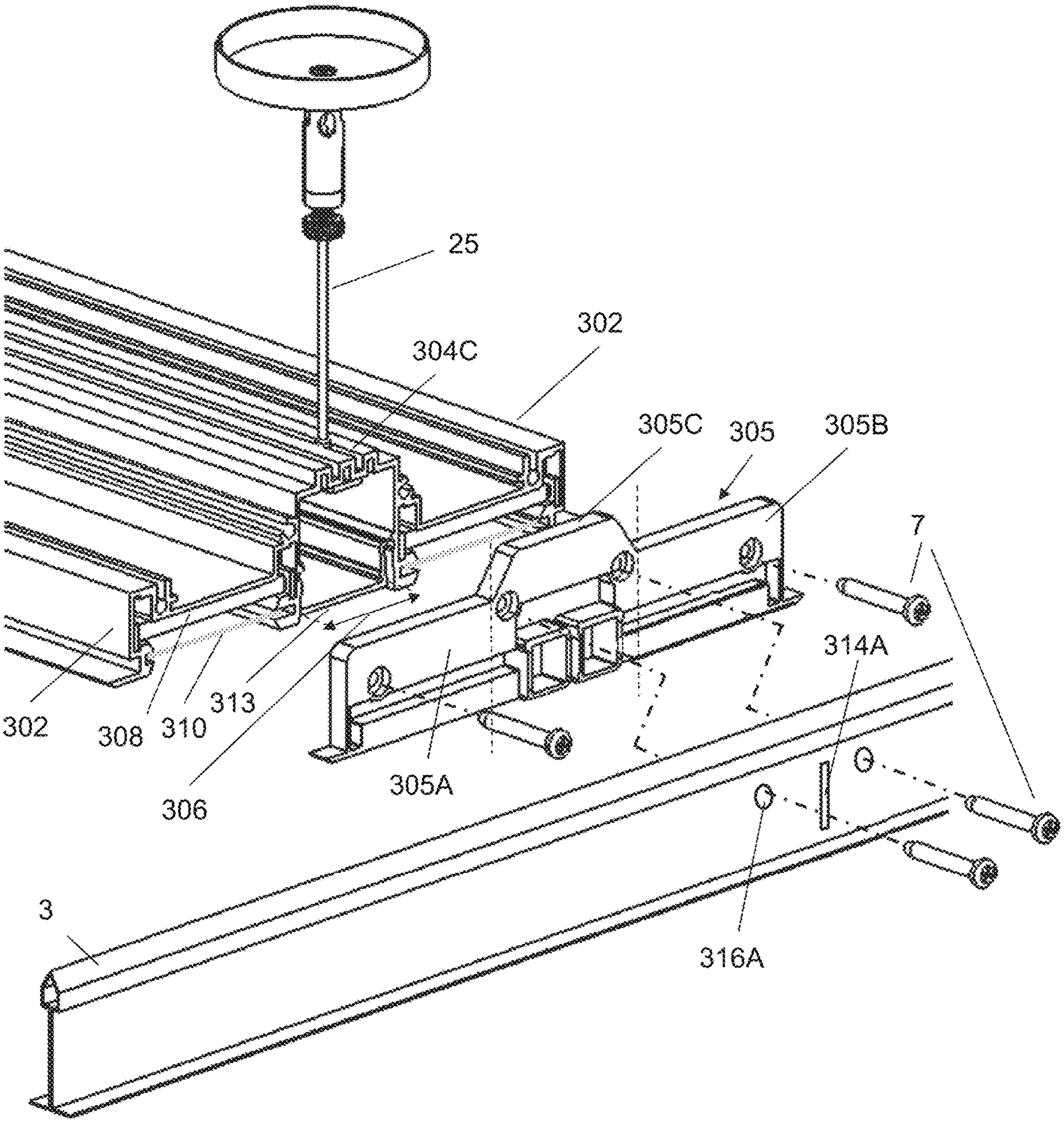
FIG. 3E is a isometric partially exploded view of a lighting assembly embodiment with suspension cable and in-line end cap mounting onto a T-bar.

As illustrated further in FIG. 3E, the ceiling grid lighting assembly is approximately 6.5" wide and is produced as a single extrusion. In this embodiment the LED driver can be retained in the configured gap spacing by features incorporated into the upper positioned extended exterior support feature 304C which is connected on either side to both linear support elements 302. A secondary cover plate 313 can then be push fitted into the configured gap spacing 306 from below. Furthermore, the upper extended support feature 304C can be used to attach a suspension cable to secure the lighting assembly to the structural ceiling above the plenum space of the ceiling grid assembly. In this embodiment the central portion of the end plate 305C also comprises a recessed cavity and features on its outer surface that accommodate the anchor of a T-bar when the anchor is used to connect a T-Bar to the mounting T-bar using slot 314A or holes 316A as shown. This is an important design feature for ceiling grid layouts that require the lighting assembly to be mounted in line with a row of T-bars. Without this feature the anchor would be blocked by the end plate and it would not be possible to mount in line.

Figure 3F:
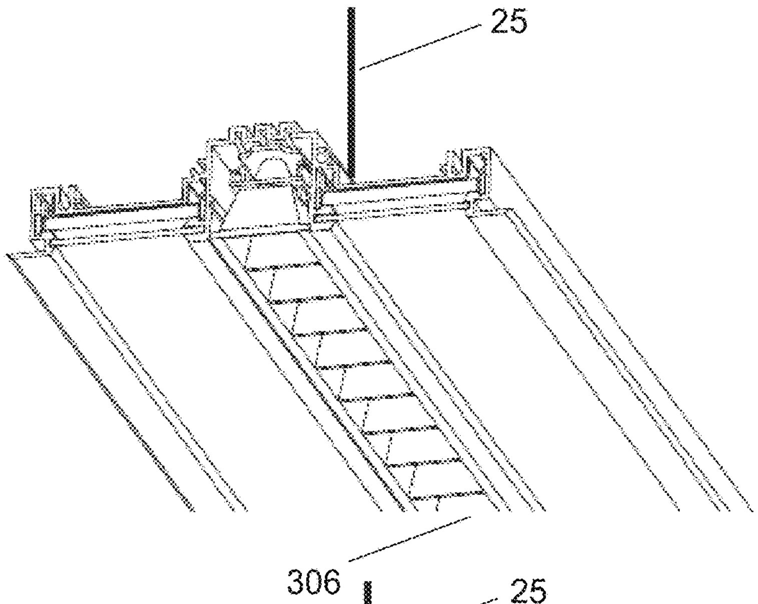
FIGS. 3F, 3G and 3H illustrate embodiments of lighting assemblies with electronic devices and cover plates being positioned within the configured gap spacing.
Figure 3G:
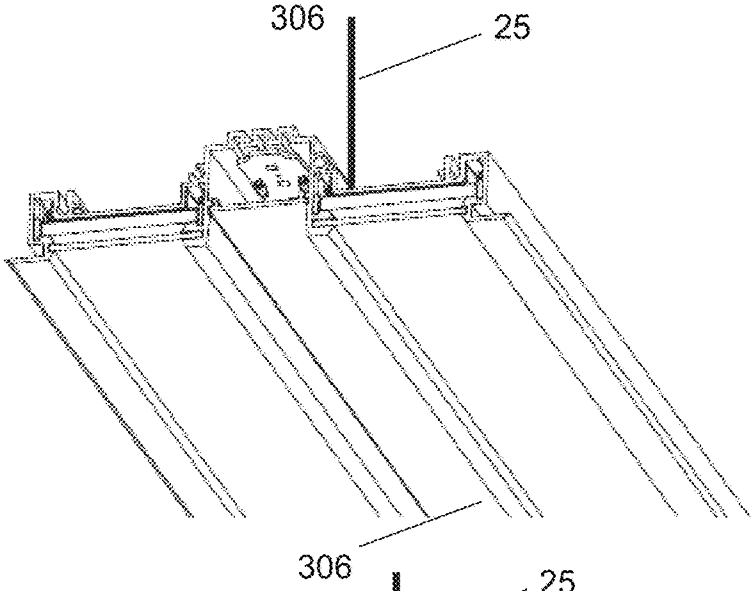
Figure 3H:
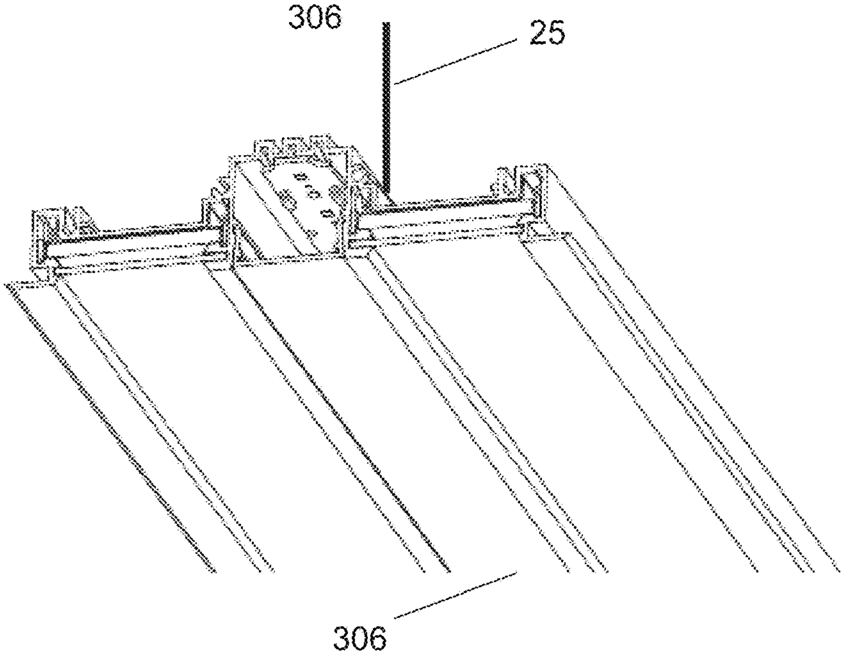

FIG. 3F illustrates an embodiment with one or more micro-cavity optics positioned in the configured gap spacing. FIG. 3G illustrates an embodiment with a lighting assembly comprising an LED board back lighting a recessed diffusion lens positioned in the configured gap spacing. FIG. 3H illustrates an embodiment with a lighting assembly comprising an LED board back lighting a flush mounted diffusion lens positioned in the configured gap spacing.

Figure 3I:
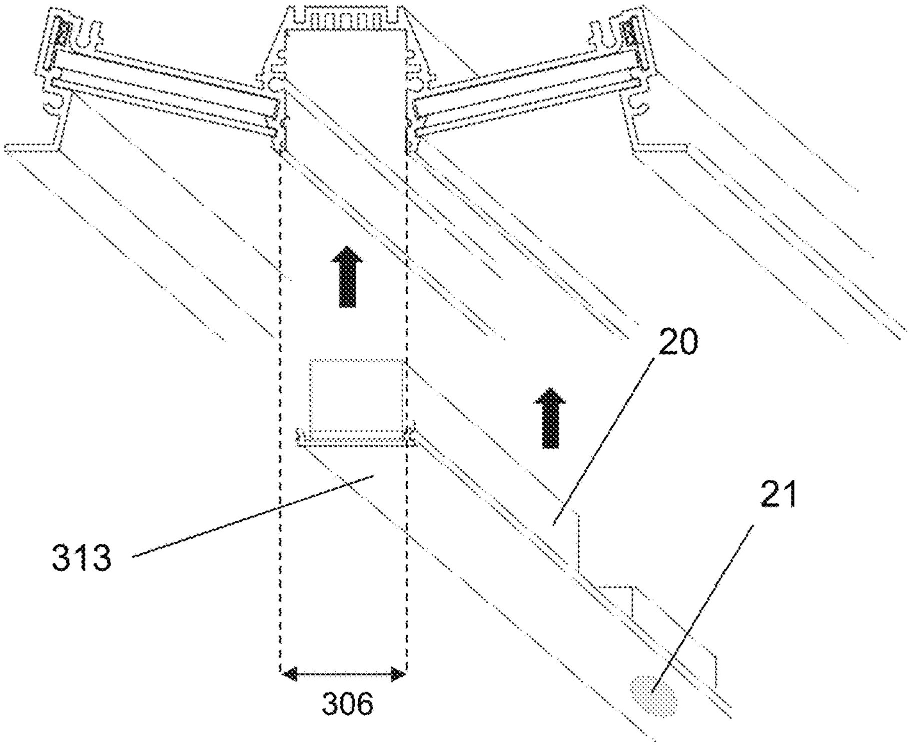
FIG. 3I shows a lighting assembly embodiment with removable gear tray mountable from below the ceiling grid plane.
Figure 3J:
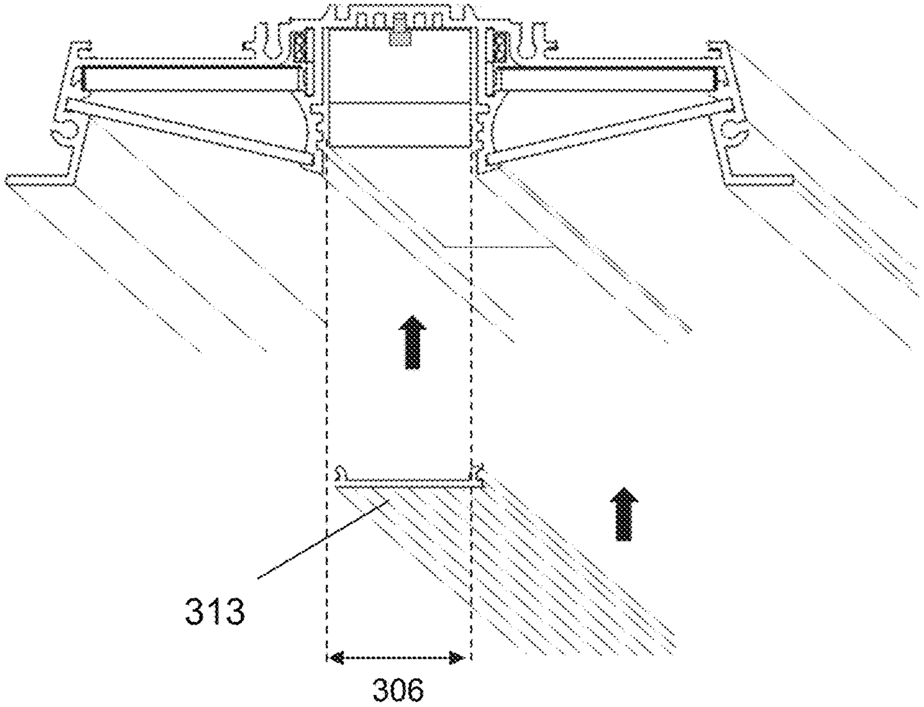
FIG. 3J shows a lighting assembly embodiment with cover plate mountable from below the ceiling grid plane.
Figure 4A:
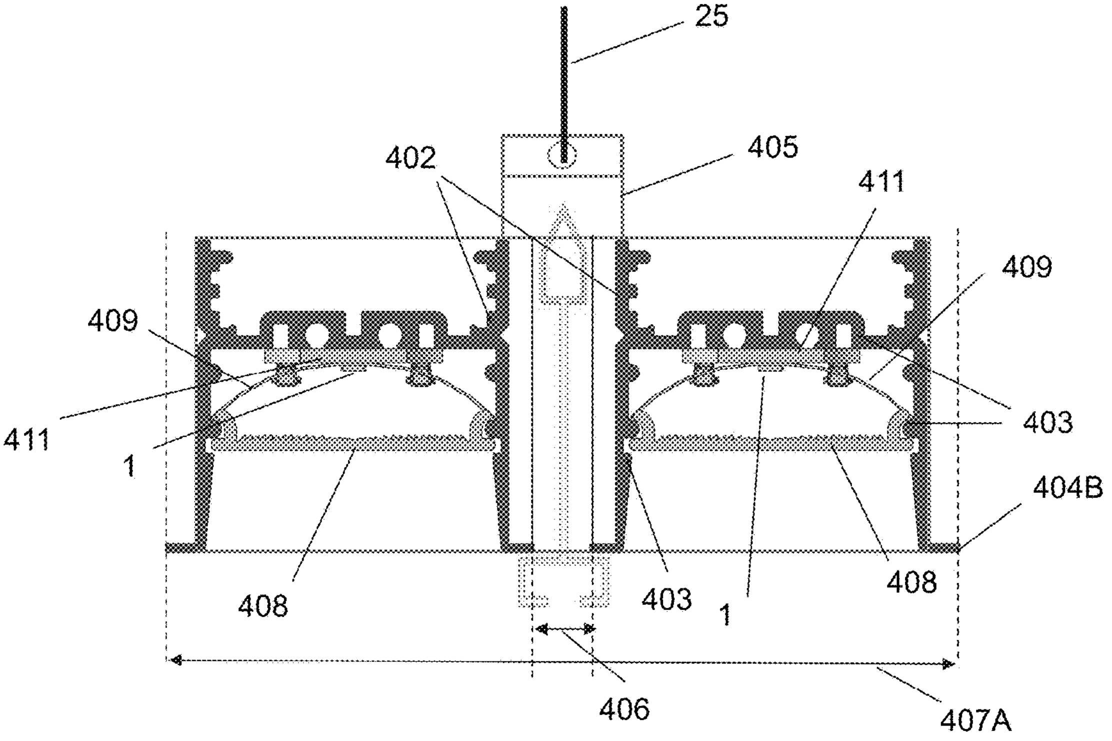
FIG. 4A and FIG. 4B are lighting assembly embodiments having backlit light directing optical elements proximate to the LED light sources.
Figure 4B:
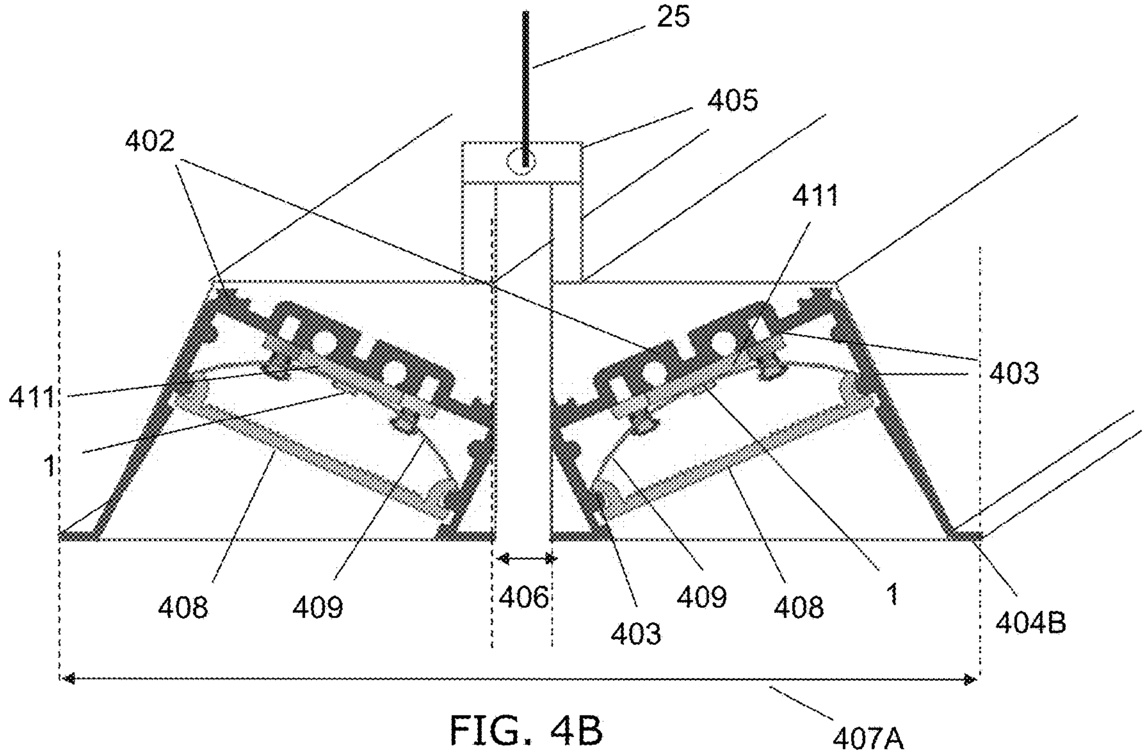

FIGS. 3I and 3J are further embodiments of ceiling grid lighting assemblies with single edgelit transmissive optical elements, for example a light guide or edgelit low clarity diffuser, as examples of configured gap spacing 306 being used to house a power supply and sensor and a cover plate 313 in a "removable gear tray" configuration. In these embodiments electronic devices and cover plates may be positioned within the configured gap spacing 306 from both above and below the ceiling grid lighting assembly. In FIG. 3I the edgelit transmissive optical element is supported in an oblique or tilted orientation relative to the ceiling grid plane and the outer lens is supported parallel alignment whereas in FIG. 3J the transmissive optical element is held in a horizontal position and the lens is tilted such that as a result the outer lens also appears "semi-recessed" when viewed from below;

FIG. 4A and FIG. 4B are embodiments of ceiling grid lighting assemblies with two different configured widths 407A and using a backlit transmissive optical element 408 with light redirecting features and internal light scattering to control and diffuse the light from the LED board 411. To improve efficiency and control of light the light a parabolic formed reflector 409 is positioned proximate to the LED board 411 and the one or more LED light sources 1 and the transmissive optical element 408. The reflector helps direct light from the LED light sources out from the linear lighting module towards the input face of the transmissive optical element 408. In both backlit embodiment the transmissive optical element 408, reflector 409 and LED board 411 are retain in position and optical alignment by interior support features 403 of the linear supporting element 402. Of particular note is that the interior support features enable the LED board to be screwed into place and supported in either a horizontal or obliquely angled tilted orientation. Also shown are opposing first and second interior support features 403 of the linear support element 402 that retain the transmissive optical element in either a horizontal or obliquely angled tilted orientation.

Figure 4C:
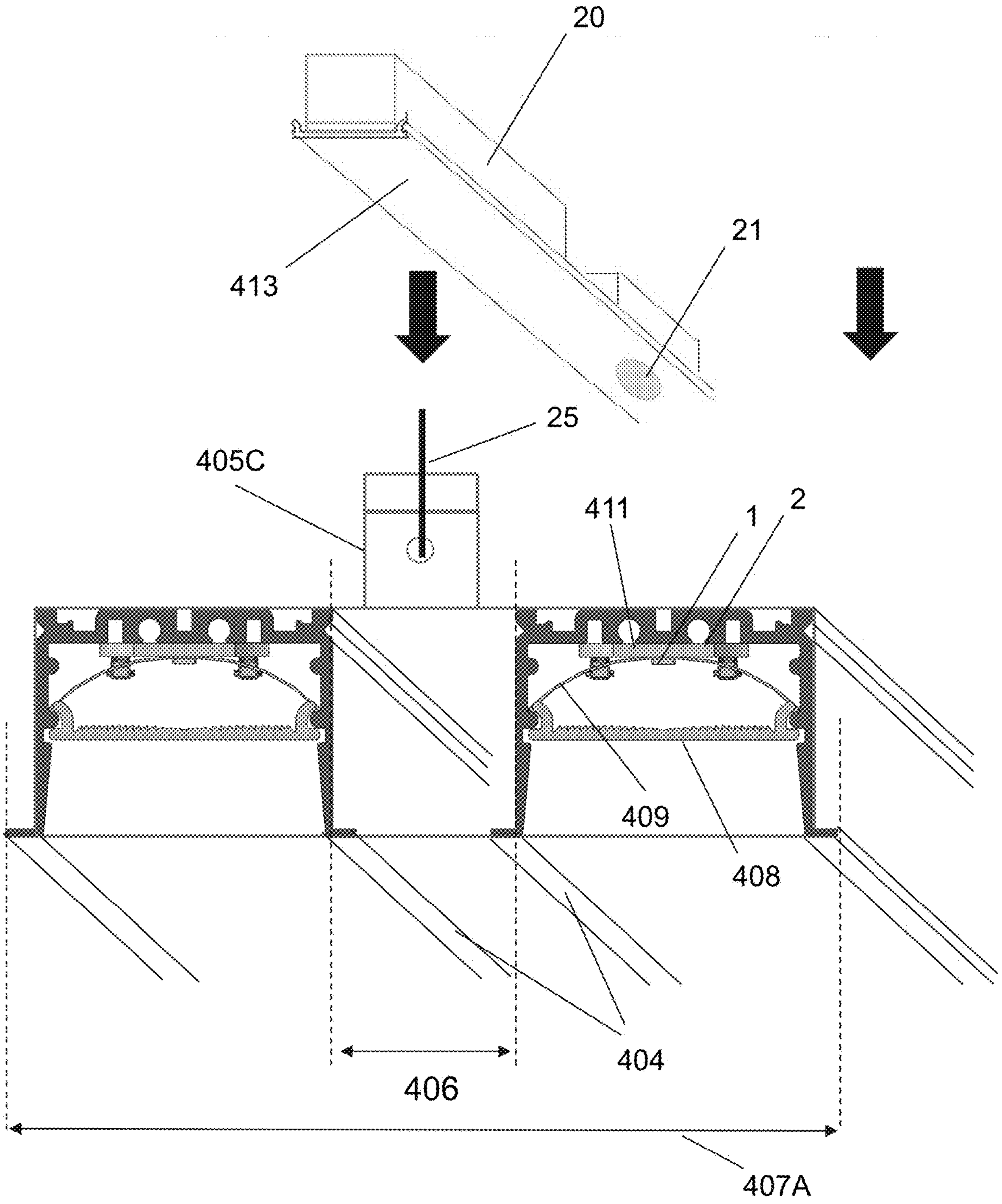
FIG. 4C is an embodiment of a direct or backlit lighting assembly with removable gear tray fitted from above.

FIG. 4C is an isometric view of a further embodiment of the ceiling grid lighting assembly with a configured width 407A and a configured gap spacing 406. This embodiment is similar to FIG. 4A but extra space for a removable gear tray is provided by widening the end plate central portion 405C. Exterior support features 404 on each linear support element are further configured and designed to accommodate and further support a cover plate functioning 413 as a "removable gear tray" inserted from above that in turn supports an LED driver 20 and sensor 21. The gear tray is positioned in the configured gap spacing from above the lighting assembly and is supported by the exterior support features of the linear support elements. In FIG. 4C the driver is screwed into a cover plate is used to enclose the driver and cover the view of the configured gap spacing from below. In alternative embodiments the gear tray can be inserted from below using the exterior support features in the configured gap, if so configured, as a means to screw in the gear tray. In such a manner the entire ceiling grid lighting assembly driver, sensor and/or controls can be serviceable from below the ceiling grid plane without the need for removing the lighting assembly.

Figure 4D:
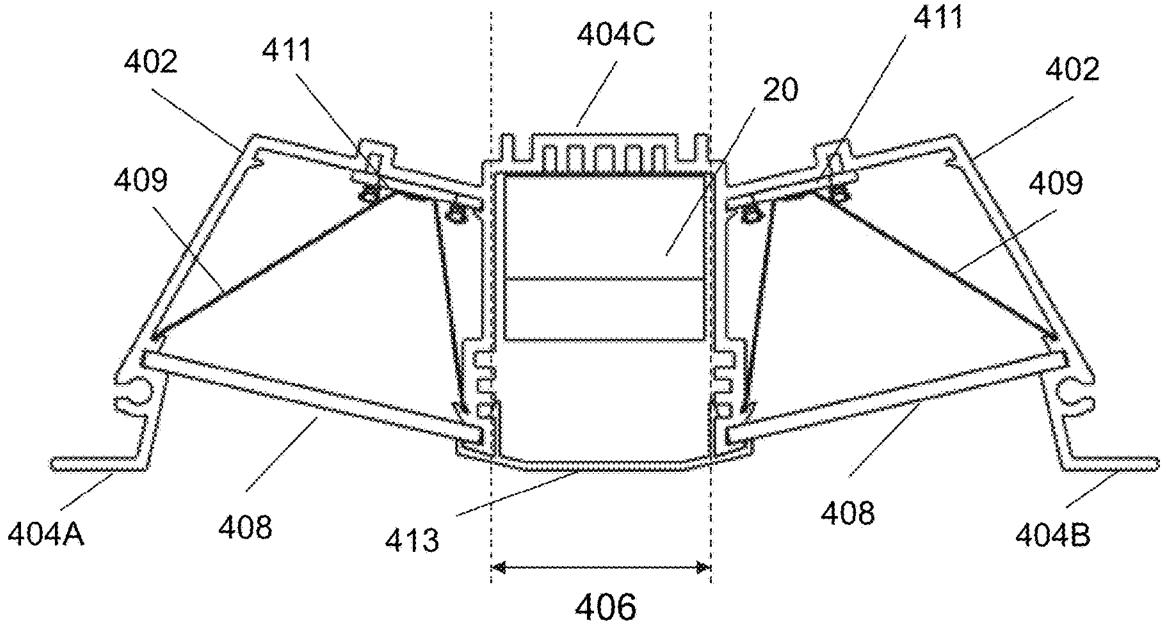
FIGS. 4D and 4E are embodiments of direct or backlit lighting assembly with extended exterior support features to enable driver and T-bar mounting.
Figure 4E:
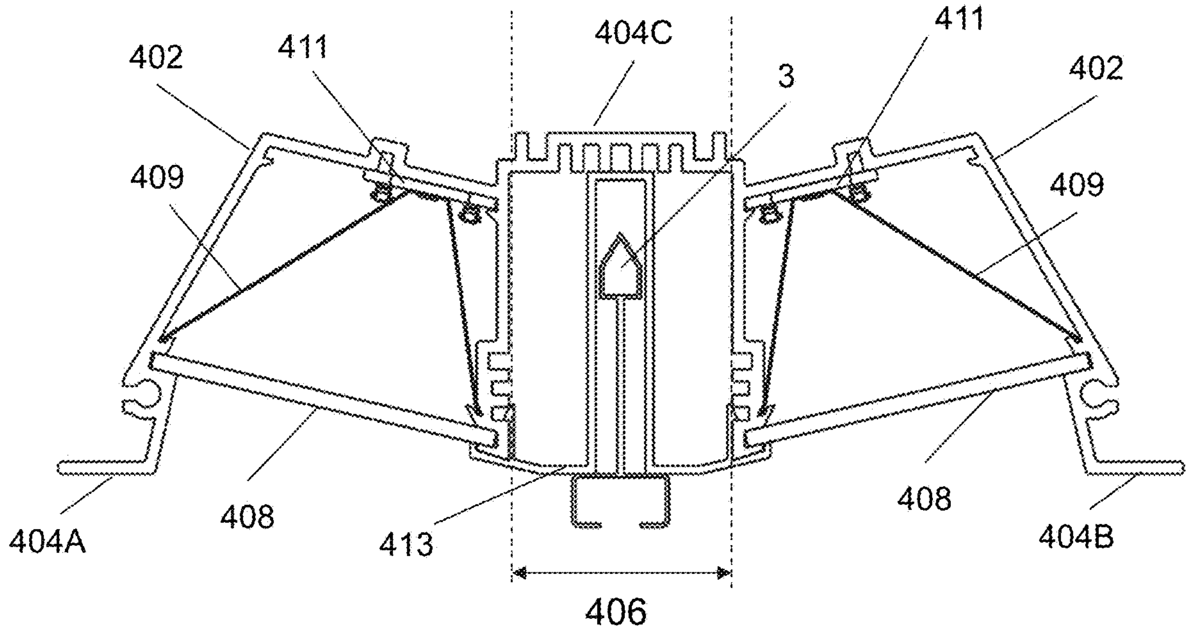
Figure 5A:
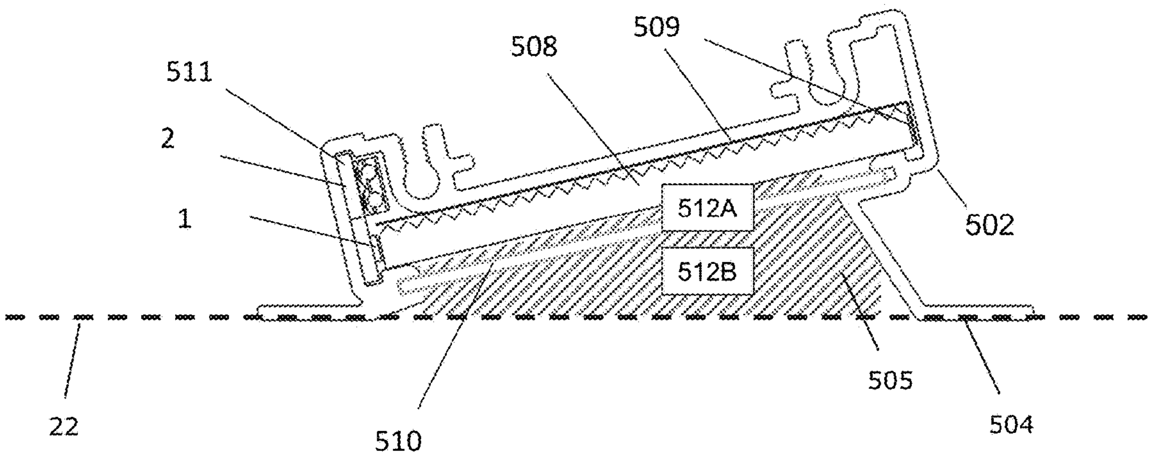
FIG. 5A and FIG. 5B are cross sectional drawings of two linear support element embodiments with edgelit optical elements illustrating how internal and external optical cavities are formed with the elongate body of the linear support element and the internal face of the end plate.
Figure 5B:
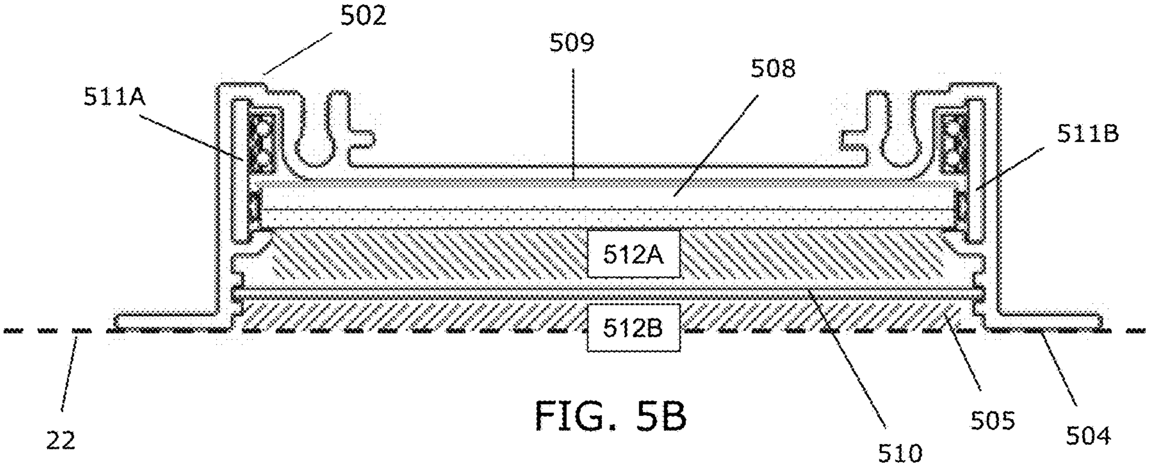
Figure 5C:
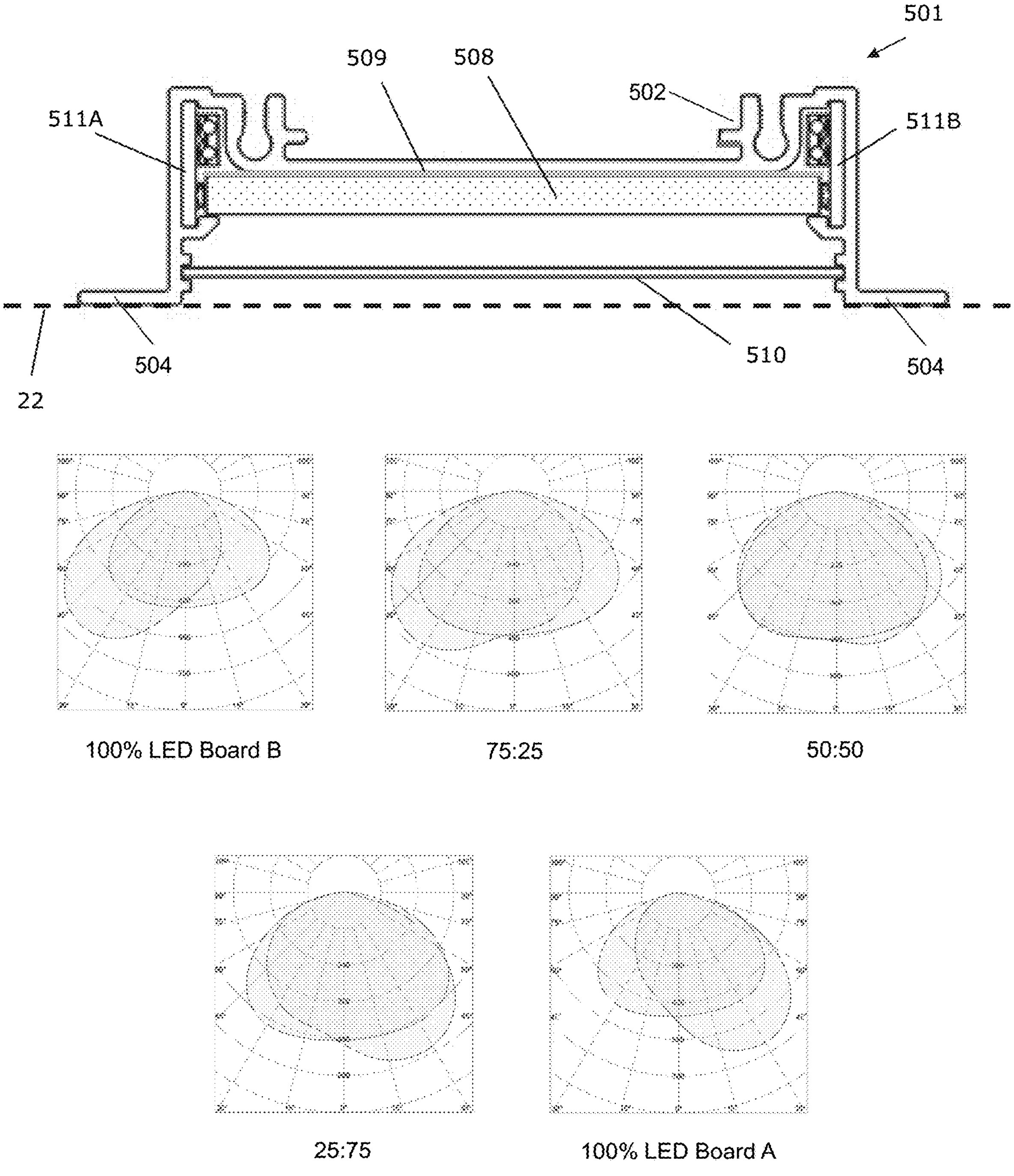
FIG. 5C provides photometric plots for a double edgelit linear lighting module embodiment with varying electrical power applied to the LED light sources on either side.
Figure 5D:
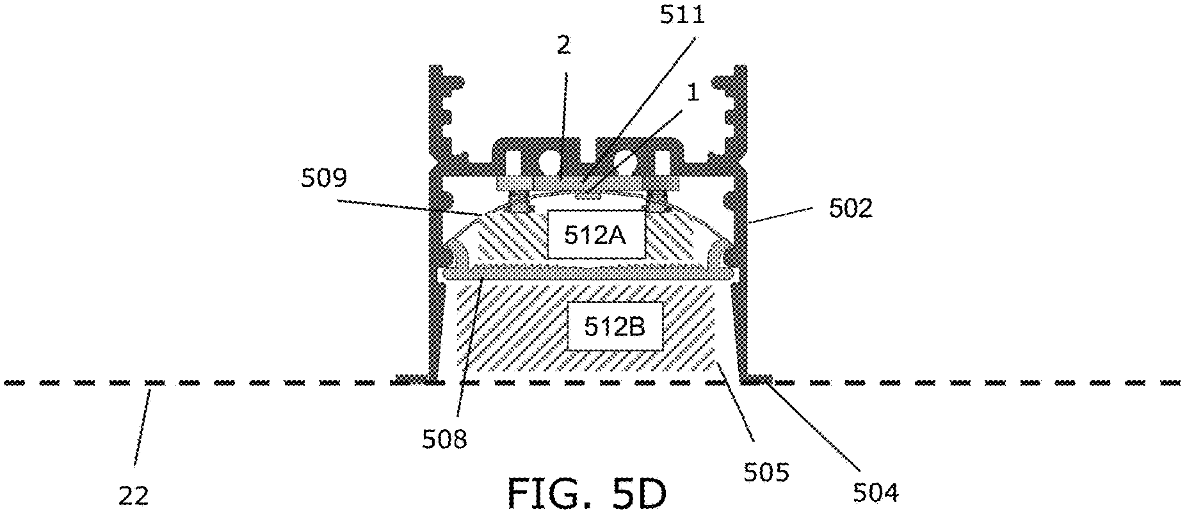
FIG. 5D and FIG. 5E are cross sectional drawings of two linear support element embodiments with direct or backlit optical elements illustrating how internal and external optical cavities are formed with the elongate body of the linear support element and the internal face of the end plate.
Figure 5E:
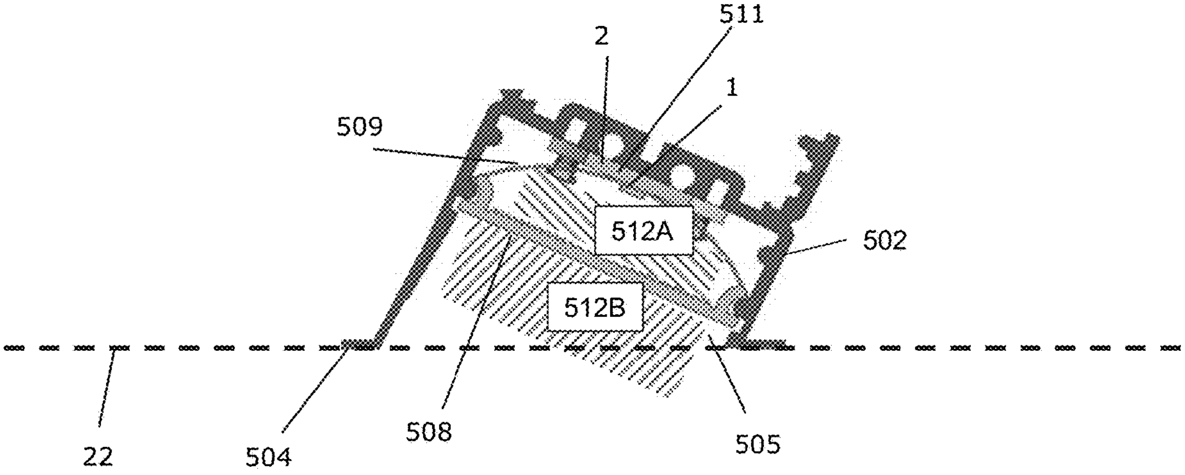
Figure 5F:
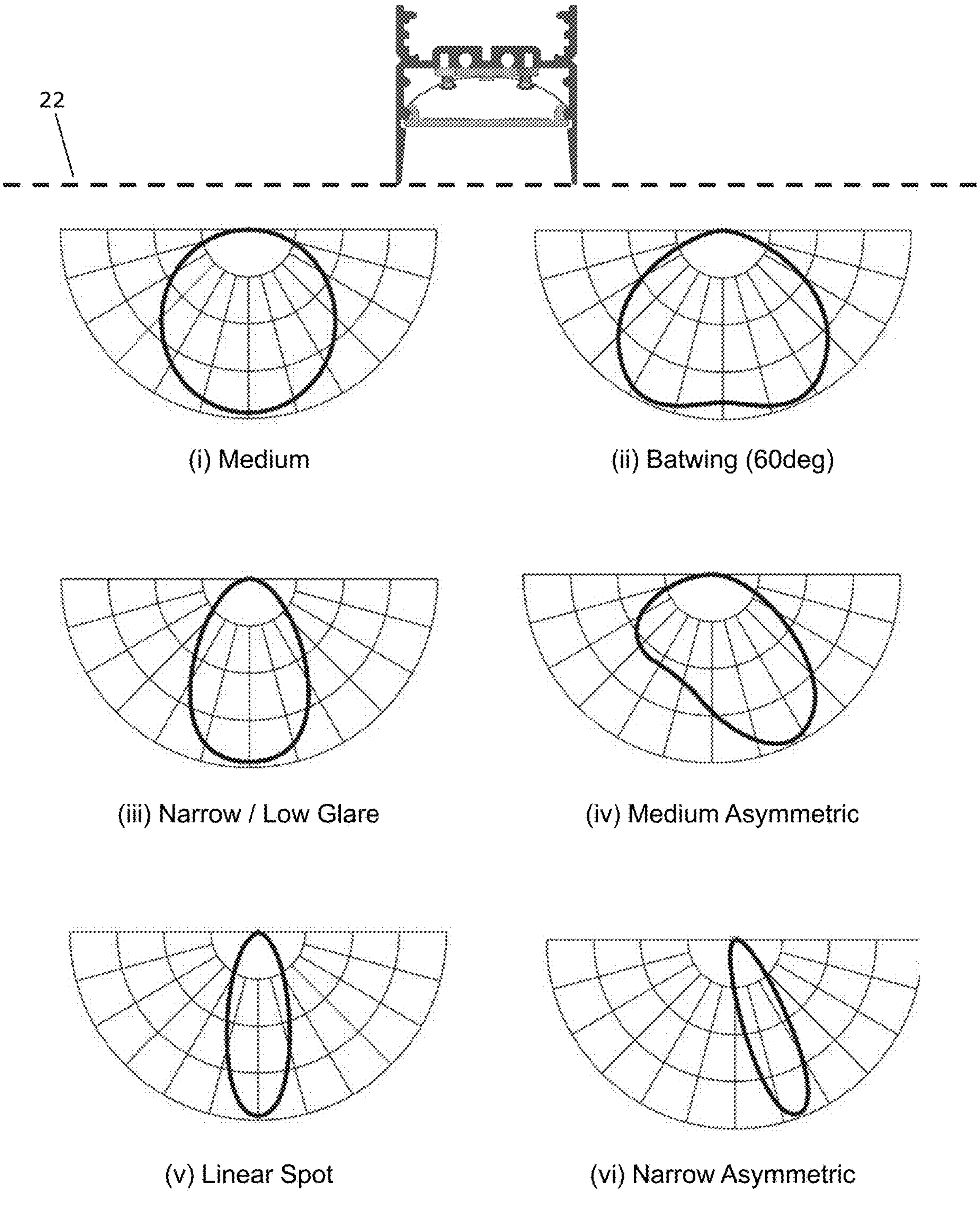
FIG. 5F provides photometric plots for a single linear lighting module embodiment with backlit optical element illustrating a range of non-lambertian lighting distributions.
Figure 6A:
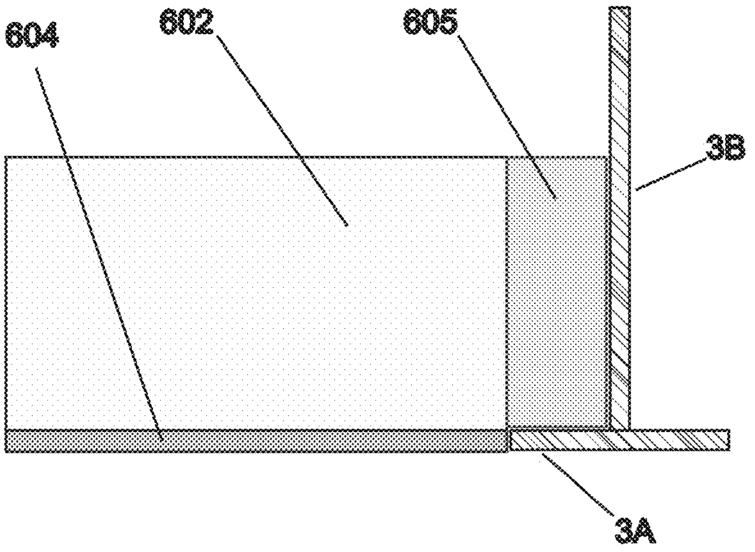
FIG. 6A and FIG. 6B show alternative end plate embodiments for ceiling grid lighting assemblies.
Figure 6B:
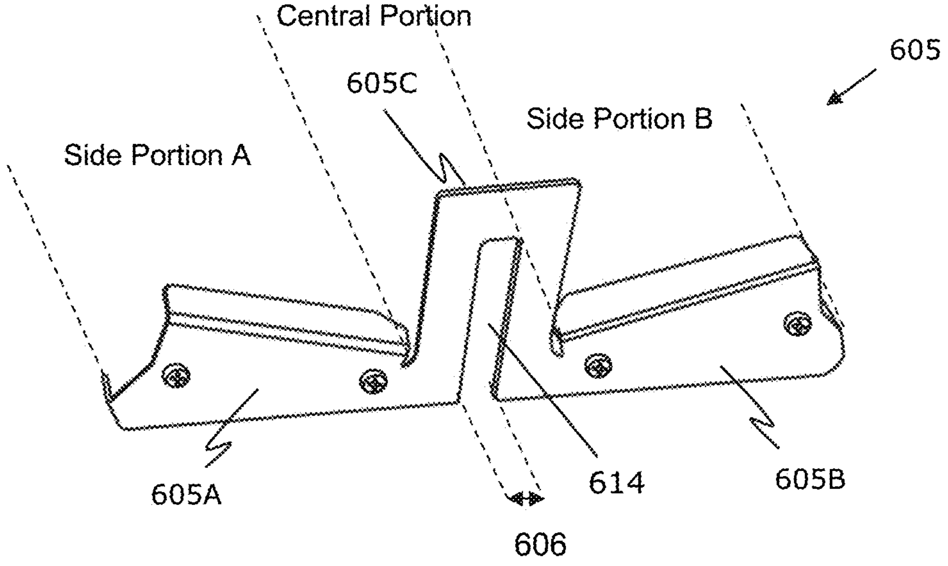

FIGS. 4D and 4E further show embodiments of ceiling grid lighting assemblies with backlit transmissive optical elements 408 and straight reflectors 409 that are retained by the linear support elements in oblique arrangement. In both embodiments the outermost exterior support features 404A and 404B are configured to be similar in appearance and use to a 9/16" flat T-bar. The exterior support features 404C in the configured gap spacing 406 are joined at an elevation relative to the configured gap opening and further configured to support a driver 20 which is crewed in place. In FIG. 4E the cover plate 413 is further configured with a slot or groove that conforms to the vertical portion of a T-Bar 3 and the internal height of the configured gap space is further configured to exceed the height of the T-Bar vertical portion. FIG. 4D and FIG. 4E therein demonstrate the principle of an interchangeable cover plate design that can be used for different functional purposes. FIG. 4E also demonstrates that the configured gap spacing and the exterior support feature 404C can be thus configured to enable in line "over-the-T" mounting of the ceiling grid lighting assembly to the elongate body of a T-Bar as an alternative to the perpendicular mounting using end plates described in other embodiments;

FIG. 5A and FIG. 5B are cross sectional drawings of two linear lighting module embodiments with edgelit transmissive optical elements 508 illustrating how internal 512A and external 512B optical cavities are formed with boundary is defined by the ceiling grid plane 22, the internal dimensions of the elongate body of the linear support element 502 and the internal face of the end plate 505, shown by the hashed line shading in the diagrams. The boundary between internal and external optical cavities is determined by the use and position of an outer lens 510. In FIG. 5A the transmissive optical element 508 is a high clarity (clarity=100), low haze acrylic light guide with linear prismatic features on the surface closest to the reflector 509 for light extraction and redirection. The transmissive optical element 508 is supported by the linear support element at an oblique angle to the ceiling grid plane 22 and it is lit from one edge by an LED board 511 positioned proximate to its input face and the reflector 509 extends to cover both the inner adjacent face to the input face and the non-adjacent opposing face. In FIG. 5B the transmissive optical element 508 is a low clarity (clarity=3.5), high haze edgelit diffuser also comprising acrylic as the bulk material with dispersed regions of volumetric light scattering material. In this embodiment the transmissive optical element is supported horizontally and parallel to the ceiling grid plane 22 is lit from two edges by LED boards 511 and the reflector 509 extends to cover only the inner adjacent face to the input face;

FIG. 5C provides photometric plots for the double edgelit linear lighting module embodiment 501 previously shown in FIG. 5B with varying electrical power applied to the LED boars 511A and 511B on either side of the transmissive optical element 508, which in this case is an edgelit acrylic volumetric diffuser with clarity of 3.5 and diffusion angles of approximately 20 degrees full width half maximum (FWHM). In addition a reflector sheet 509 is positioned behind the transmissive optical element and a high clarity diffuse outer lens 510 is positioned in front of it as the outer surface for the linear lighting module 501. Also shown is the exterior support feature 504 configured to replicate the appearance of a 9⁄16" T-bar. FIG. 5C illustrates the principles of control of the directionality of the light from the linear lighting module through electrical power only. When power is applied only to the LED board B 511B the lighting distribution below the ceiling grid plane 22 is heavily biased towards the direction opposing the LED board B and as the power to LED board A 511A is applied the degree of bias diminishes. When equal power is applied to LED boards A and B the resultant lighting distribution from the lighting module is symmetric, and when the power to LED board A is increased and exceed the power to LED board B the lighting distribution becomes biased in the opposite direction. Ceiling grid lighting assemblies based upon linear light modules with a similar optical system to the embodiment in FIG. 5C will have attractive control options. For instance the two different LED boards could represent options to illuminate walls on either side of a corridor or hallway, or they could be useful for retail applications where aisle lighting is applied;

FIG. 5D and FIG. 5E are cross sectional drawings of two linear support element embodiments with LED boards 511 emitting light into the input face of a direct or backlit transmissive optical element 508 used in combination with reflectors 509. In both embodiments the internal components are supported by the linear support element in both horizontal alignment and at an oblique angle or tilted with respect to the ceiling grid plane. Both embodiments further illustrate how 4-sided internal 512A and external optical cavities 512B are formed with boundaries defined by the internal features of the elongate body of the linear support element 502 and the internal reflective face of the end plate 505;

FIG. 5F provides photometric plots for the single linear lighting module embodiment of FIG. 5D comprising illustrating a range of non-lambertian lighting distributions provided for illumination below the ceiling gird plane 22. The transmissive optical element 508 is configured as a type of Fresnel lens and comprises some volumetric scattering and light redirecting surface features. By configuring the degree of internal light scattering it is possible to change the width and roundness of the lighting distribution and the light redirecting features further focus and direct the light from the linear lighting module;

FIG. 6A and FIG. 6B show alternative end plate embodiments for ceiling grid lighting assemblies. FIG. 6B shows a longitudinal cross section view of a lighting assembly embodiment which illustrates a specific mechanical relation between linear support element 602, its exterior support element 604, end plate 605, and T-bar 3. The end plate is configured to have a thickness such that when installed upon the T-bar horizontal portion 3A, extends from the T-bar vertical portion 3B to the end of the T-bar horizontal portion 3A such that the support element 602 does not rest upon the T-bar horizontal portion 3A but rather allows the linear support element exterior portion 604 to mount flush with the T-bar horizontal portion 3A and not rest upon it. For example, for a standard 15/16" width of T-bar horizontal portion, the optimal thickness of and end plate to match the T-bar horizontal portion would be ~7⁄16". In this illustrated embodiment the end plate is laying upon and supported by the T-bar so the T-bar would typically be a main beam T-bar within the ceiling grid system. In other embodiments the linear lighting module can be configured with attachment to suspension hangars connected to a structural ceiling with an end plate mechanically connected to one or more T-bars and providing structural support to a suspended ceiling grid arrangement.

Figure 7A:
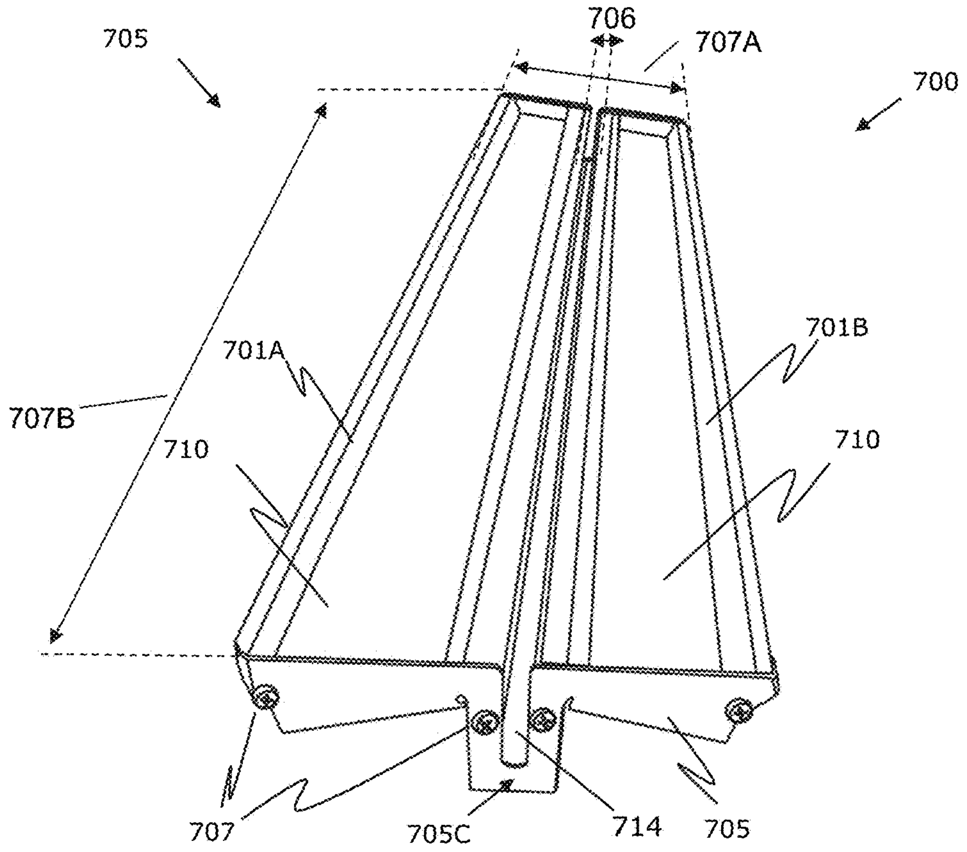
FIGS. 7A-7B are illustrations of an exemplary implementation of supporting element of FIG. 6A in a modular ceiling system to support a mounting member therewith, wherein the supporting element employs end plates for engaging over a T-bar of a suspended ceiling arrangement, in accordance with various embodiments of the present disclosure.
Figure 7B:
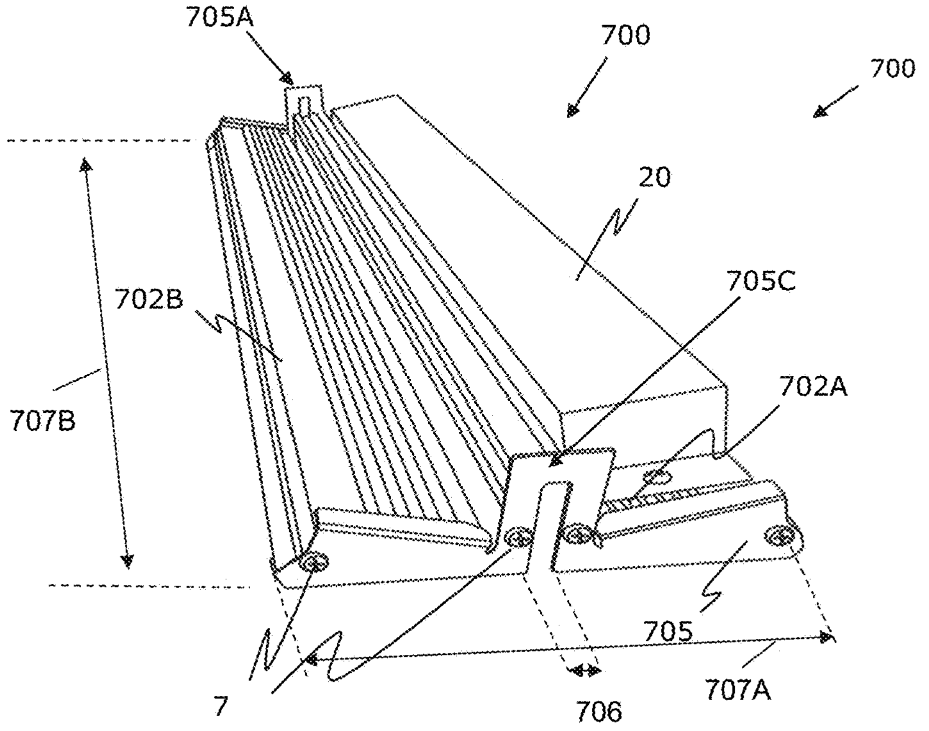

In FIG. 6B is a perspective view of an end plate 605 in accordance with the lighting assembly embodiment of FIG. 7 and is beneficially manufactured from a sheet metal, for example an Aluminium (Aluminum) metal sheet, a steel sheet, a Titanium sheet or similar, although not limited thereto. Optionally, the end plate has a thickness in a range of 2 mm to 10 mm, and more optionally has a thickness in a range of 3 mm to 6 mm. The end plate is optionally manufactured using metal-sheet stamping, metal-sheet laser cutting or metal-sheet machining. As shown, the end plate 605 comprises three distinct sections or portions, namely a central portion and two side support portions. In the embodiment shown there is a "U"-shaped channel slot 614 on the central portion 605C that is detachably mountable in operation on a given "T"-bar, and two side supporting portions 605A and 605B that are integral with the central portion 605C. Herein, the base of the "U"-shaped slot 614 in the central portion 605C also defines the configured gap spacing 606 of approximately ½". As shown, each of the side supporting portions 605A and 605B includes a groove formed at an inner surface of the supporting portions 605A and 605B. The groove is generally "C"-shaped configured to accommodate at least one mounting member (as shown clearly in FIGS. 7A-7B) therein. Beneficially, the "U"- shaped portion contained with the central portion 605C has a height that is less than the flat vertical portion of the “T”-bar when installed, so that the support element 605 is a snug fit onto the “T”-bar; “snug fit” is, for example, defined in the foregoing. Optionally, as aforementioned, the material for manufacturing the support element 605 includes metals, extruded metals, metal alloys, hardened polyvinyl materials, plastics materials, glass-filled plastics materials, ceramic materials and the like.

Referring to FIGS. 7A and 7B, there is shown an exemplary implementation of a ceiling grid lighting assembly embodiment of configured width 107A based upon the end plate in FIG. 6A. This embodiment has a configured assembly width 707A of approximately have a 1 ft ceiling grid cell, e.g. 6" and a configured gap spacing 706 of ¾", a width chosen to accommodate the vertical portion of a T-bar. In this embodiment two identical linear lighting modules 701A and 701B are connected and held in parallel and horizontal alignment by end plate 705. When in use, the two opposing linear support elements 702A and 702B are mounted longitudinally on a given “T”-bar at held in alignment by end plates 705 on two respective longitudinal ends thereof. Beneficially, the two end plates 705 are functional when used over a T-bar or T-bar anchor of a suspended ceiling arrangement. Moreover, the end plates are beneficially manufactured from sheet metal, for example an Aluminium (Aluminum) metal sheet, a steel sheet, a Titanium sheet or similar, although not limited thereto. Optionally, each end plate has a thickness in a range of 2 mm to 10 mm, and more optionally has a thickness in a range of 3 mm to 6 mm. The end plates are optionally manufactured using metal-sheet stamping, metal-sheet laser cutting or metal sheet machining. Furthermore, the end plate 705 includes a “U”-shaped slot 714 feature in its central portion 705C which enables a T-bar to be placed in the configured gap spacing provided the height of the groove under the “U” shaped portion is greater than the height of the vertical portion of a “T”-bar or alternatively the height of the top of the T-bar anchor.

Furthermore, the linear lighting modules 701A and 701B, when supported between the two opposing end plates 705, are extending and arranged parallel to the longitudinal length of the “T”-bar to which the two linear support elements 702A and 702B are mounted. Notably, the linear lighting modules 701A and 701B can be further secured in position using a fastening arrangement such as screws, nuts, bolts, adhesives, rivets, tie-wraps and the like.

Optionally, the linear support element of the linear lighting module when in operation, supports a weight of an edge of the given ceiling panel; the recess structure is configured in a manner that the edge of the given ceiling panel securely fits onto exterior support features of the linear support elements 702A and 702B. Furthermore, as shown in FIG. 7B, at least one of the linear support elements (herein, 702B), when in operation supports a weight of other modules, such as a power module 20 on the T-bar, securely coupled to the rear surface of the linear support element 702B. Moreover, the LED driver power module 20 is supported via the at least one linear support element 702A in a manner that the power module 20 is capable of providing power to the linear lighting modules, 701A and 701B.

Figure 8A:
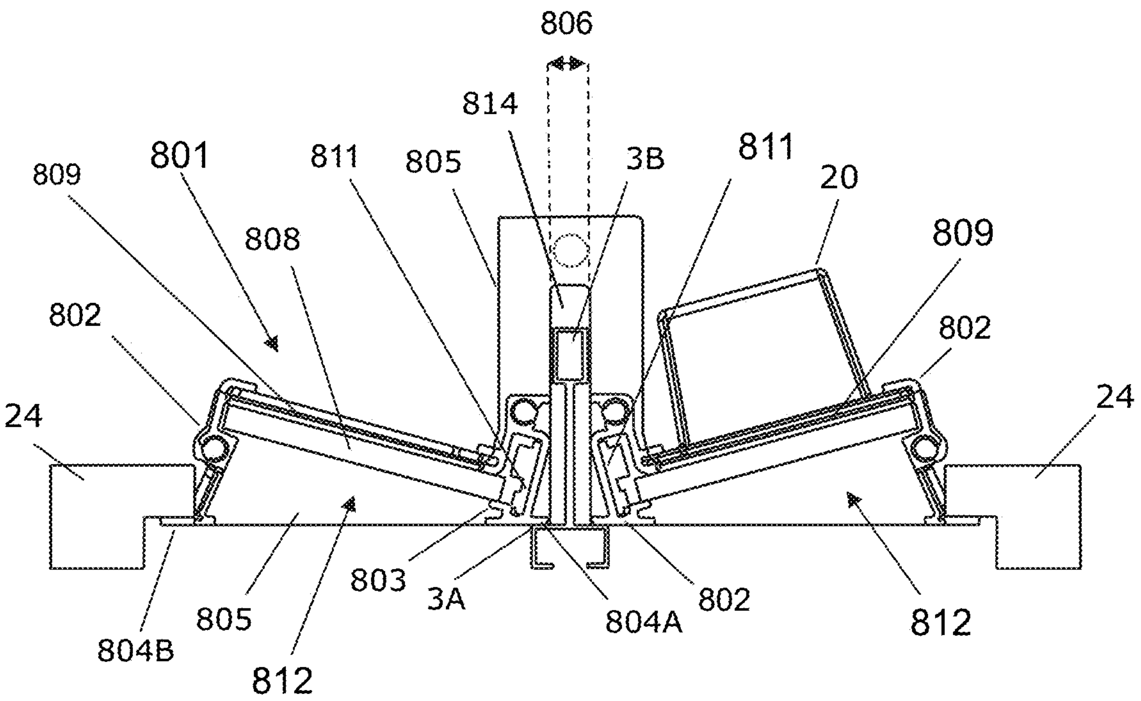
FIGS. 8A-8B are cross section views of lighting assembly embodiments with tilted orientation of transmissive optical elements.
Figure 8B:
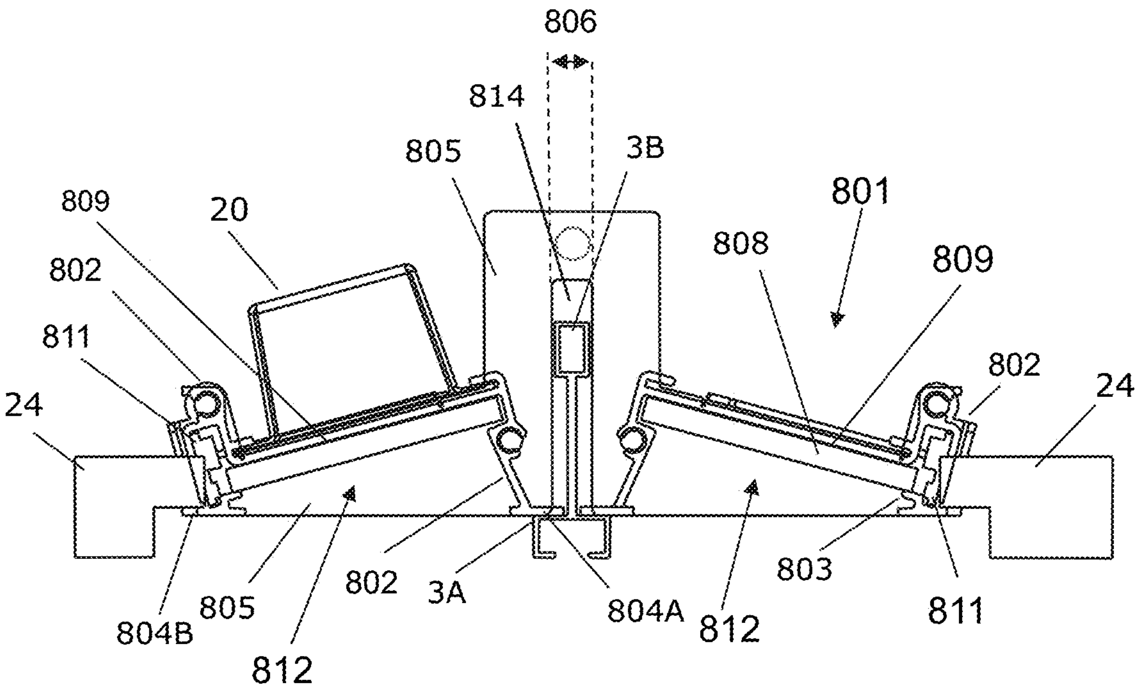

FIGS. 8A and 8B are a cross section views of lighting assembly embodiments with tilted orientation of transmissive optical elements. In each figure two linear lighting modules 801 each have a linear support element 802 which positions and retains in optical alignment the LED board 811, transmissive optical element 808, and reflector 809 by means of interior support features 803 of the linear support element 802. The linear lighting modules are positioned in parallel alignment by an endplate 805, the side portion of which functions as a reflective surface of an optical cavity 812 formed contained within the assembled lighting assembly. A configured gap 806 in the lighting assembly is formed and retained by connection of end plate 805 to linear lighting modules 802. As shown in these particular embodiments, the external support feature 804B of each linear support element 802 supports a surrounding ceiling tile 24 and the external support feature 804A of the linear support element 802 is supported by the T-bar horizontal portion 3A. The T-bar vertical portion 3B is positioned within a slot 814 of the end plate 805. A LED driver 20 is attached onto the top side of the linear support element 802.

Figure 8C:
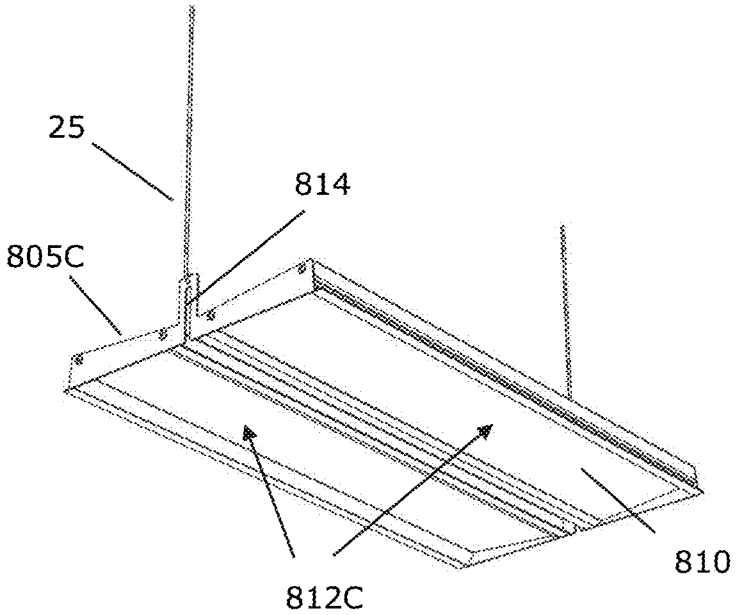
FIGS. 8C-8F are isometric illustrations of exemplary lighting assembly embodiments in accordance with the FIGS. 8A-8B.
Figure 8D:
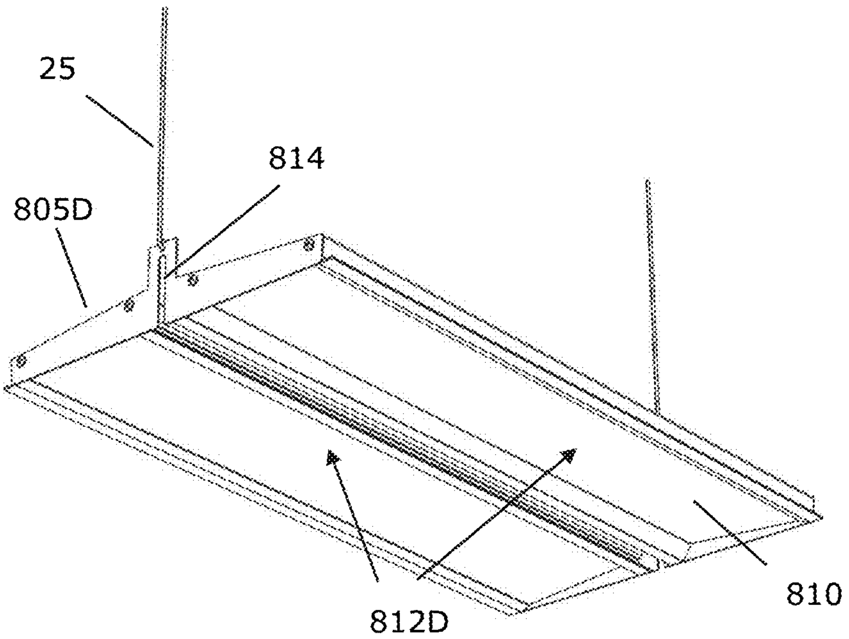
Figure 8E:
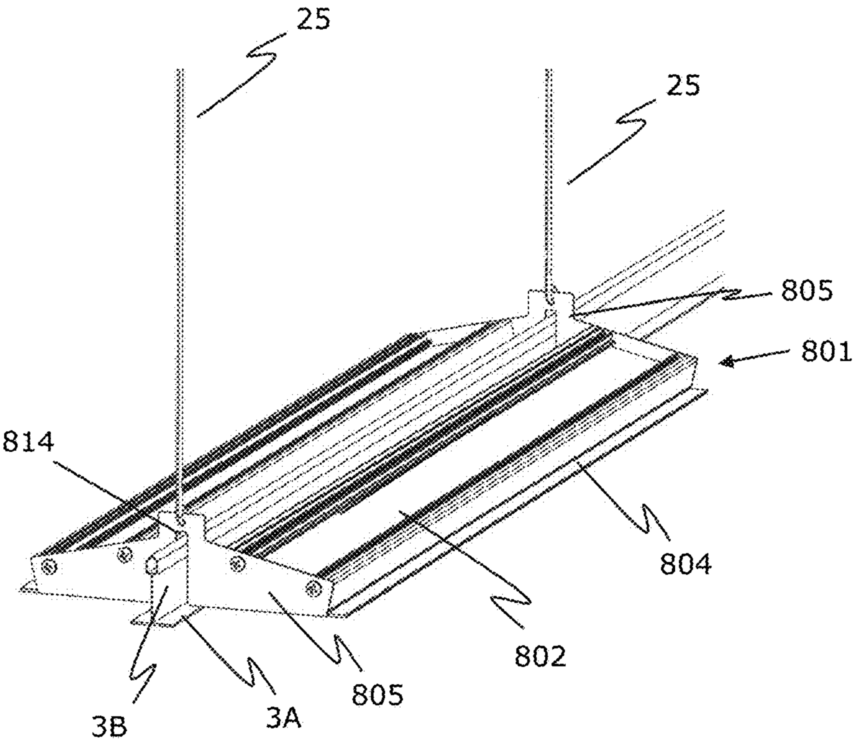
Figure 8F:
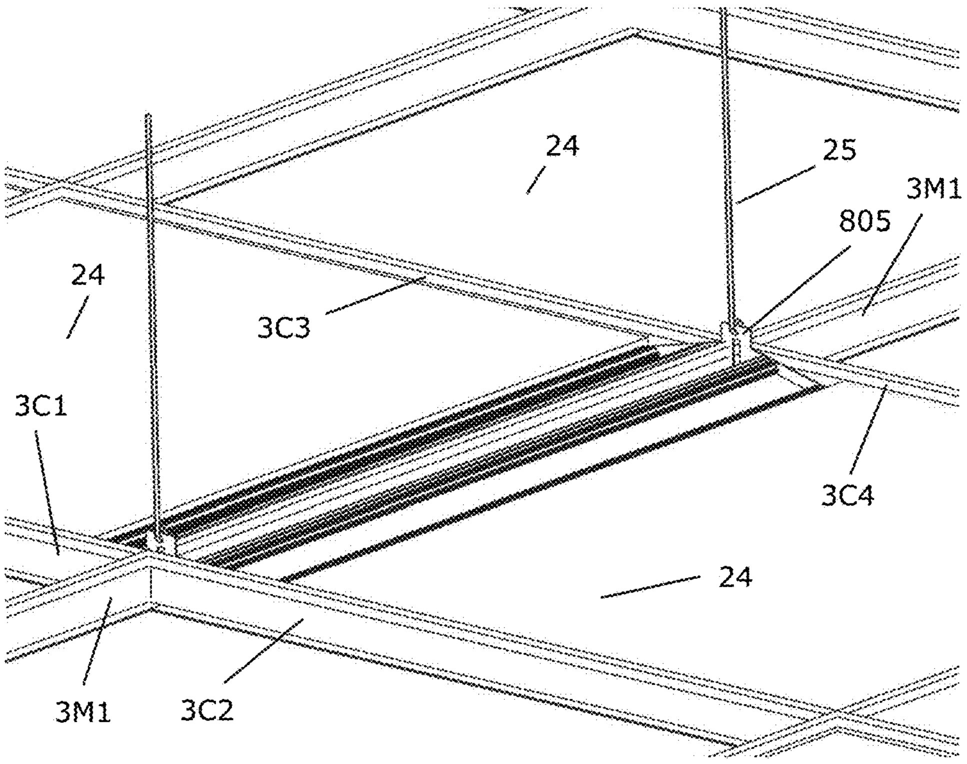

FIGS. 8C-8E are the corresponding isometric views of ceiling grid lighting assemblies of FIGS. 8A-8B with the further addition of suspension wire 25 to support the lighting assemblies by use of the end plates 805. FIG. 8C illustrates a design with end plate 805C and linear lighting modules comprising edgelit optical elements, such as light guides or edgelit diffusers, the outer face of the linear lighting module 810 is angled downward towards the center and creates two distinct optical cavities 812C with a triangular cross section when viewed from the end. FIG. 8D illustrates a design with end plate 805D and linear lighting modules comprising edgelit optical elements, such as light guides or edgelit diffusers, and the outer face of the linear lighting module 810 angled up towards the center creates two distinct optical cavities 812D with a triangular cross section when viewed from the end. FIG. 8E further shows mounting of an embodiment light fixture mounted onto a T-bar 3 wherein the end plate 805 has a slot 814 which straddles over the T-bar vertical portion 3B rests on the T-bar horizontal 3A. FIG. 8F illustrates a view from above the T-bar grid of an installed lighting assembly including T-bars 3 ceiling panels 24 and a suspension cable 25 attached to the end plate 805. It this embodiment it can be seen that by straddling a longitudinal T-bar the lighting assembly extends into two T-bar cells of the ceiling grid array arrangement. The longitudinal T-bar in this embodiment would typically be a main beam T-bar 3M1 which can be seen extending through multiple T-bar cells within the ceiling grid array. In addition to resting upon the T-bar horizontal portion of the main beam T-Bar 3M1 the lighting assembly can also be optionally configured such that end plates 805 additionally connect with up to four connecting T-bar cross tees; 3C1, 3C2, 3C3, 3C4.

Figure 9A:
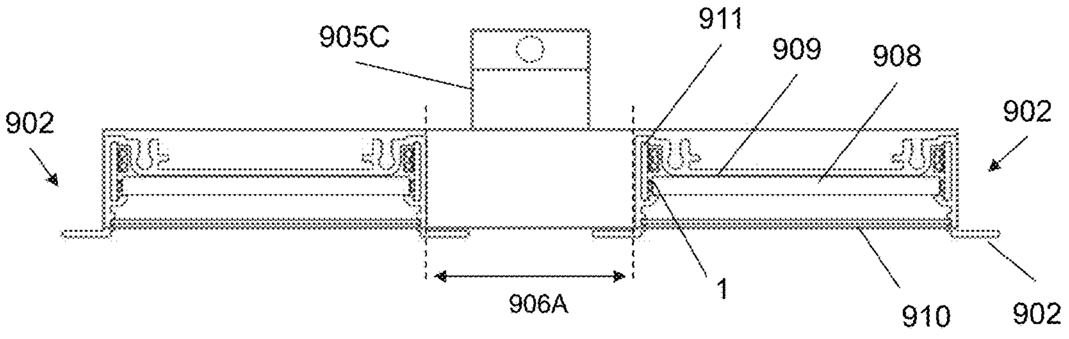
FIGS. 9A-9C are lighting assembly embodiments based on two linear lighting modules with horizontally supported edgelit optical elements and having differing configured gap spacings.
Figure 9B:
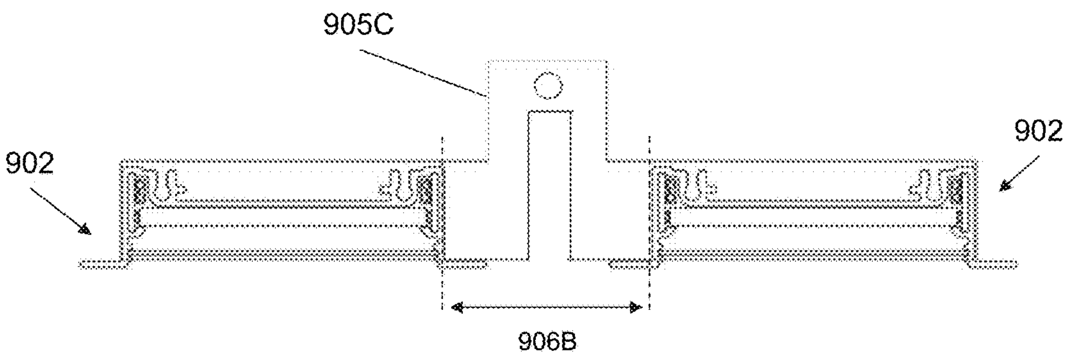

FIGS. 9A and 9B are embodiments of the ceiling grid lighting assembly based upon two linear lighting modules 901 with different end plate central portions 905C and as a result different configured gap spacings 906. Each linear lighting module is comprising a linear support element 902 that horizontally supports edgelit transmissive optical elements 908 lit from two sides by LED boards 911 supported in vertical alignment by the linear support element 902. In addition the linear support elements maintain positioning and optical alignment of a reflector 909 positioned behind the transmissive optical element and an outer lens placed in front of the transmissive optical element 910 that acts as the light emitting outer surface for the linear lighting module, and therein the ceiling grid lighting assembly.

Figure 9C:
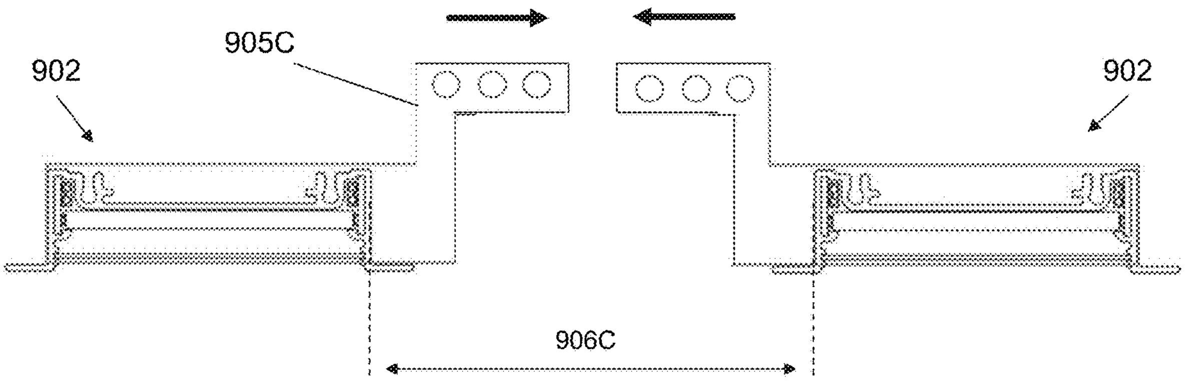

FIG. 9C illustrates an embodiment of an end plate central portion 905C that is configured in two parts designed to slide over each other and provide a means for adjusting the configured gap spacing. The 3 holes in the upper part of each central portion are configured to be linked together by a nut and bolt when lined up. In such a manner there are at least 3 different settings for the configured gap spacing that can be achieved.

Figure 9D:
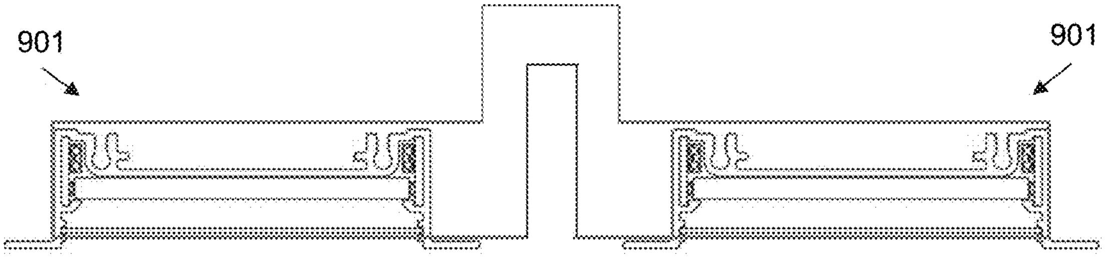
FIG. 9D provides photometric plots for a ceiling grid lighting assembly with two double edgelit linear lighting module embodiments with varying electrical power.
Figure 9D:
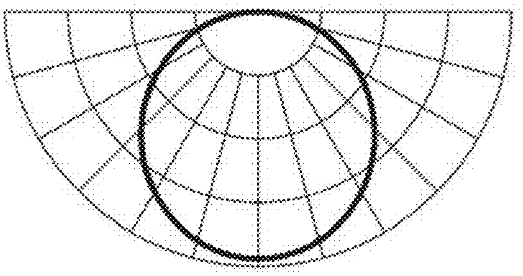
Figure 9D:
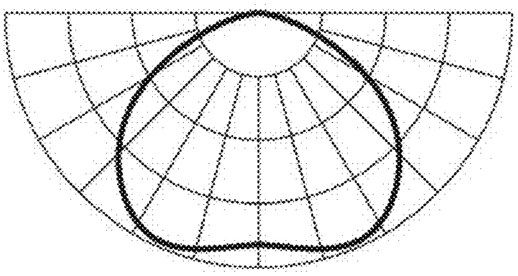
Figure 9D:
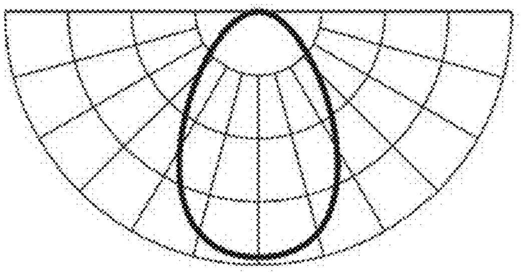
Figure 9D:
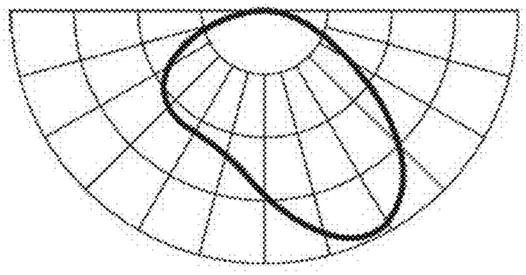
Figure 9D:
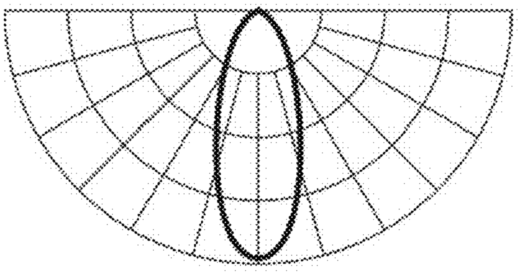
Figure 9D:
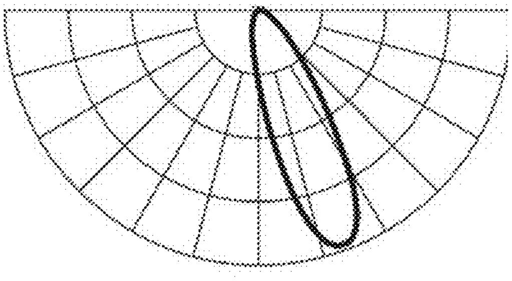

FIG. 9D illustrates a range of non-lambertian lighting distributions achieved with the ceiling grid lighting assembly embodiment of FIG. 9A. The distributions shown can be either set in the factory during the assembly process or alternatively the distributions can be electrically adjusted for once installed by selectively adjusting the electrical energy applied to the LED boards within each linear lighting module 901.

Figure 9E:
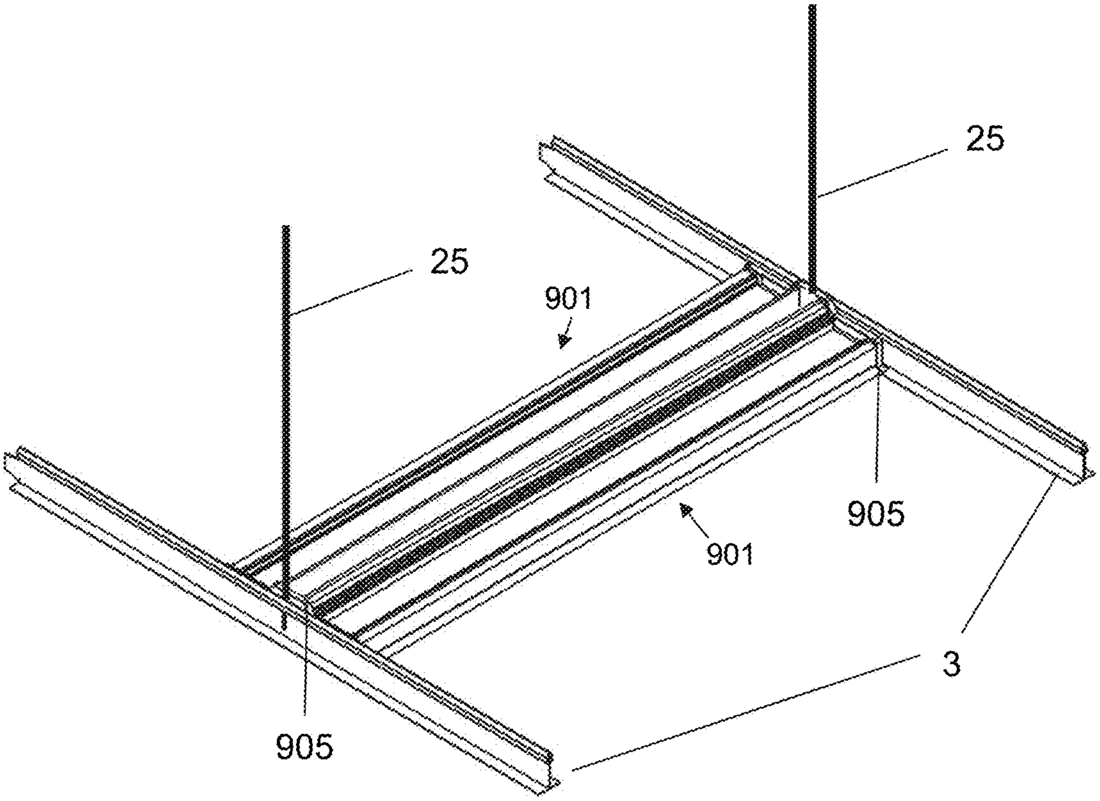
FIGS. 9E and 9F are isometric illustrations of the lighting assembly of FIG. 9D installed in a ceiling grid assembly.
Figure 9F:
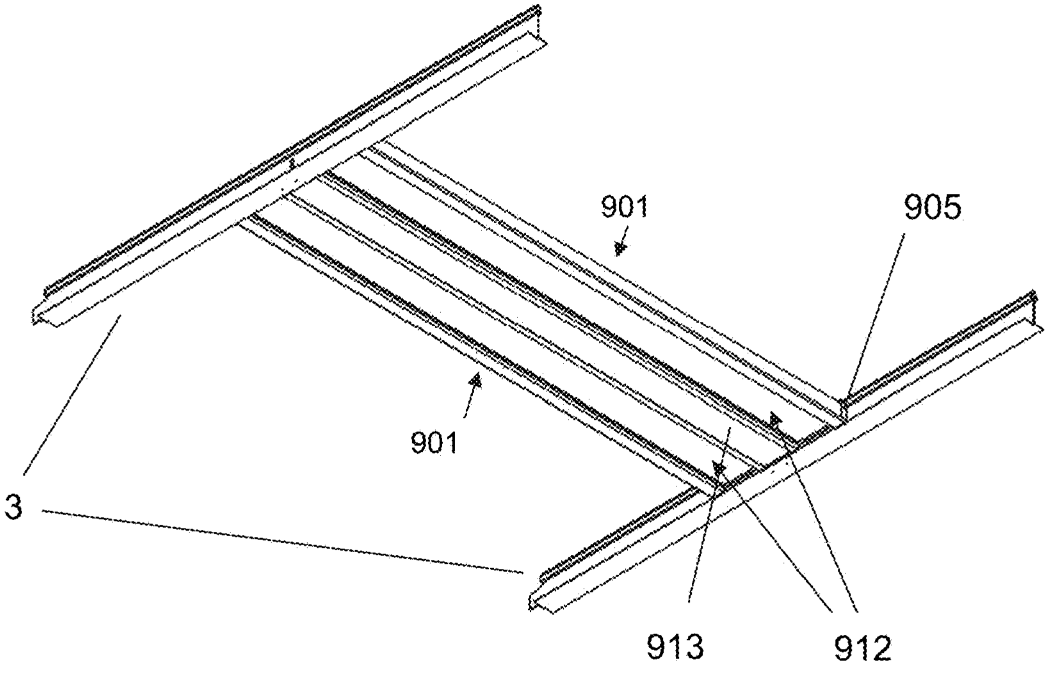
Figure 10A:
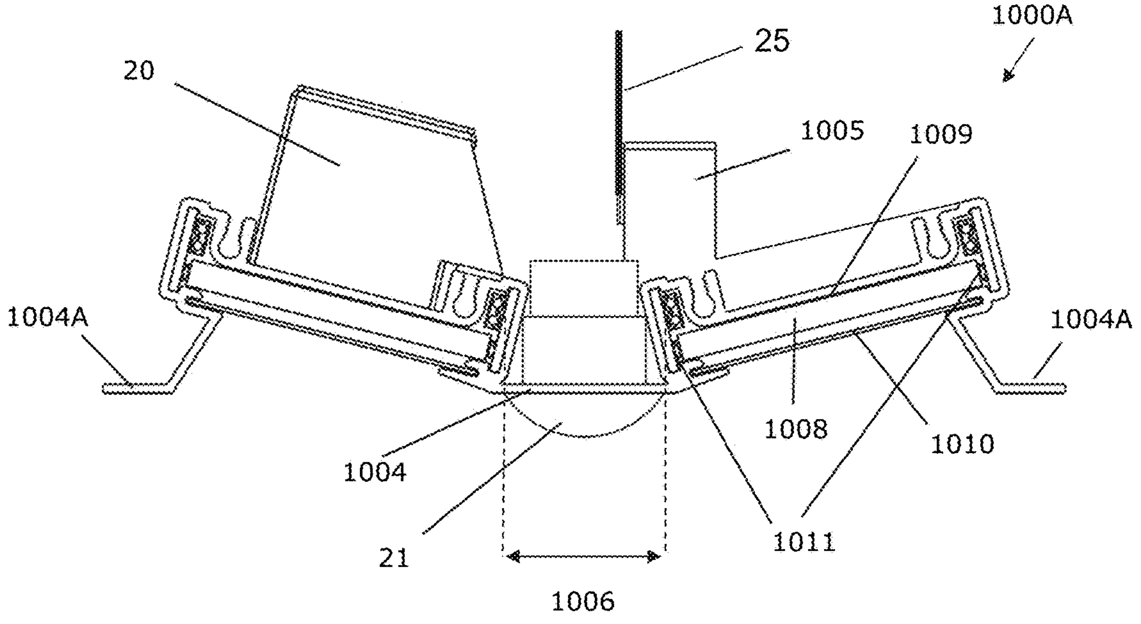
FIGS. 10A and 10B are lighting assembly embodiments comprising linear support elements with T-Bar like exterior support features.
Figure 10B:
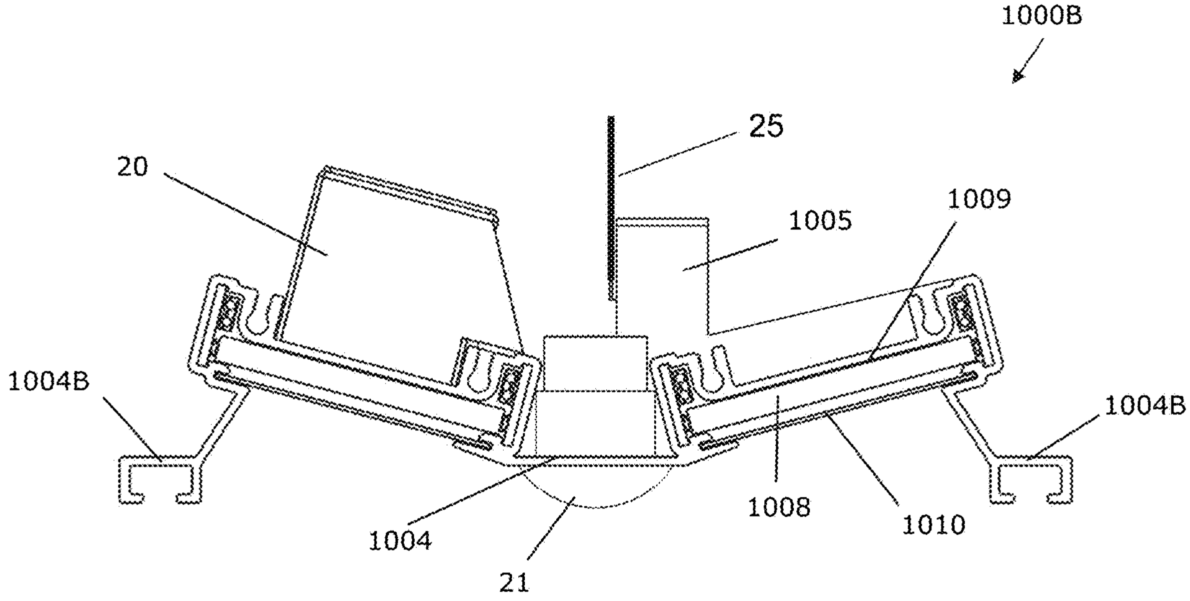

FIG. 9E and FIG. 9F are isometric views from above and below the ceiling grid plane showing the linear lighting modules 901 being supported on the T-bars by the end plates 905 with the outer lens being horizontal and recessed up from the ceiling grid plane. The illustrations show the lighting assembly mounted perpendicularly at the ends of its linear support elements by the end plates. The end plates 905 are configured with a height just below the height of the T-bar on which each is mounted and further provide a means for attaching suspension cables 25 to connect the lighting assembly to the structural ceiling above the plenum space above the ceiling grid. In FIG. 9F a removable gear tray 913 is positioned in the configured gap from below. The cover plate 913 can be removed and replaced with a replacement "gear tray" containing an LED driver and potentially additional sensors or electrical devices. Also shown is the function of the internal reflective surface of the end plates to create two distinct optical cavities 912 with a rectangular cross section when viewed from the end FIGS. 10A and 10B illustrate two embodiments of the ceiling grid lighting assembly 1000A and 1000B with a sensor 21 positioned in the configured gap spacing and supported by a common exterior support feature 1004 of the linear support elements that connects the two linear support elements together and provides support for the sensor placed in the configurable gap. The illustration further shows a light assembly of double edgelit optical element construction having an LED board 1011 and edgelit transmissive optical element 1008 that are both tilted relative to the ceiling grid plane, a reflector 1009 is positioned proximate to the edgelit optical element inner face and an outer lens in the form of a light redirecting diffuser 1010 proximate to the outer face of the edgelit optical element is supported by the linear support element. The purpose of the light redirecting diffuser is as an outer lens to further shape and diffuse the light output 1010. The end plate 1005 is configured with a latching feature to "hook" over the top of a T-bar when mounted perpendicularly, and LED driver and electronic controller 20. The exterior support features of the linear support element 1004A are in the shape of a standard T-bar flange in FIG. 10A and the support features 1004B are in the shape of a standard slotted T-bar in FIG. 10B.

Figure 10C:
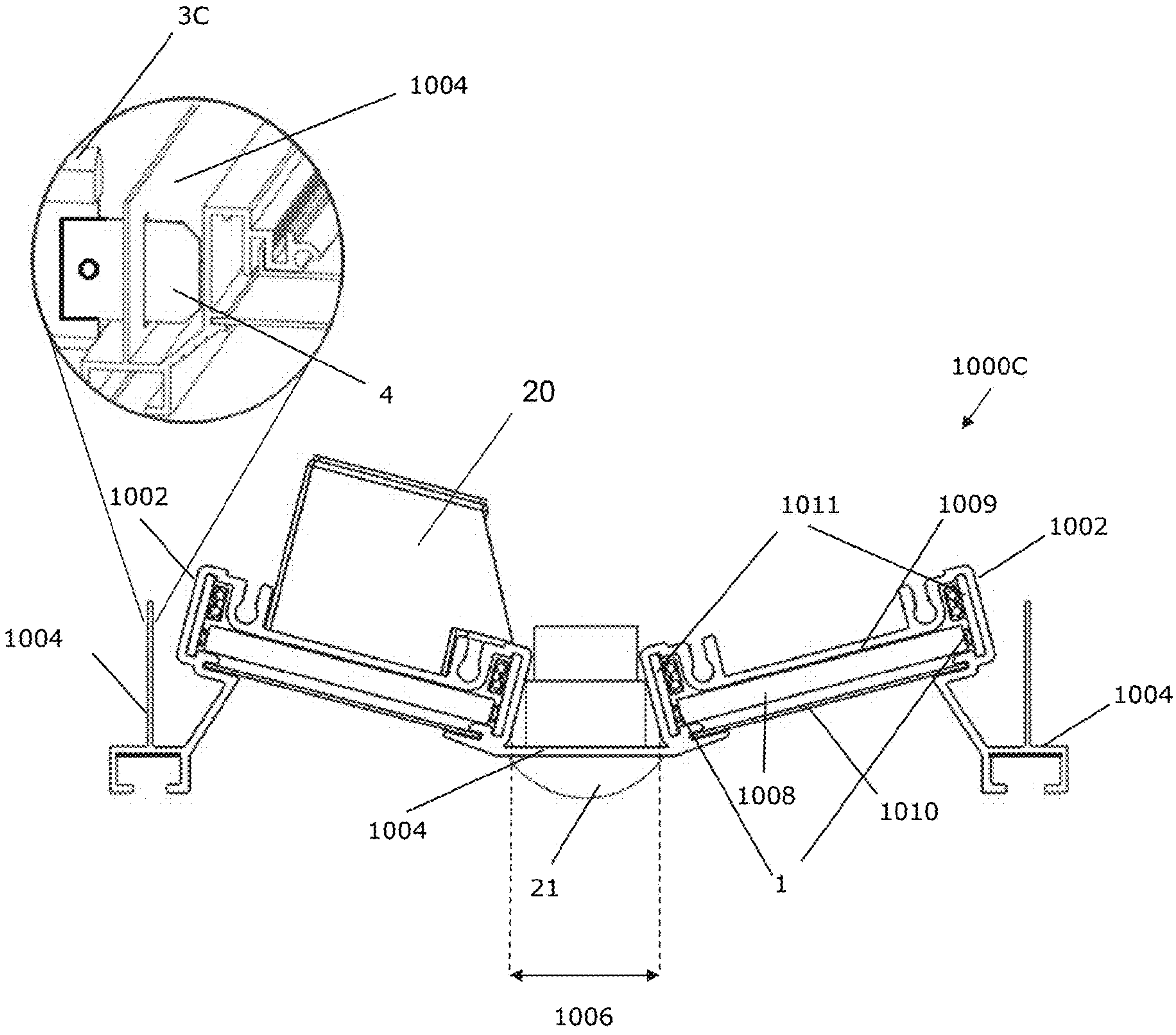
FIG. 10C is a lighting assembly embodiment with additional vertical sections and mounting slots on the T-Bar like exterior support features.

FIG. 10C is another embodiment of the lighting assembly 1000C with configured gap spacing 1006 in which is positioned a sensor 21 which is supported by the exterior support features 1004 extending into the configured gap spacing. In this embodiment the exterior support feature 1004 on the linear support element 1002 is further configured to include a vertical elongate section which comprises slots or apertures designed to accommodate the T-Bar anchor 4 of a transversely oriented cross tee T-bar 3C that is connecting orthogonal to the longitudinal axis of the linear support element 1002. The use of such features enables the lighting assembly to be structurally connected with cross-tee T-bars 3C and installed as a "continuous run" of light that may extend across several cells of a ceiling grid assembly and wherein the outer lens surface is uninterrupted by cross mounting T-bars but rather the T-bars are terminated and connected along the length of the linear support element body. The linear support element 1002 is further configured to support an LED driver 20 mounted onto the back surface.

Figure 10D:
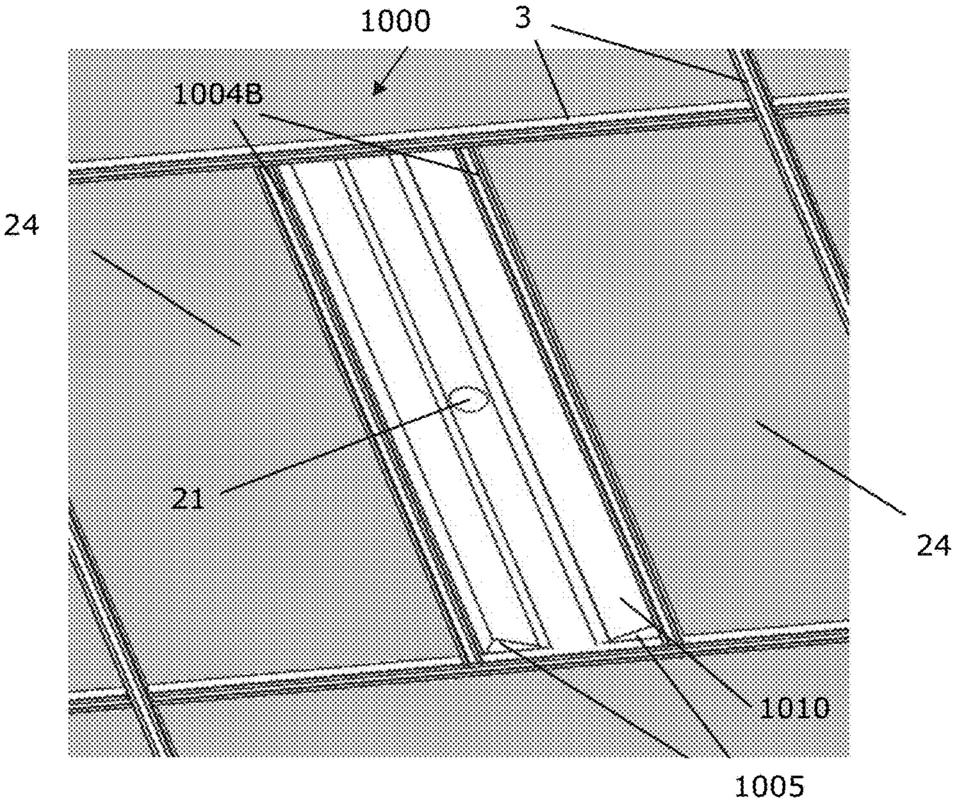
FIG. 10D and FIG. 10E are below ceiling plane perspective views of the lighting assembly embodiment of FIG. 10C installed within a suspended ceiling grid system.
Figure 10E:
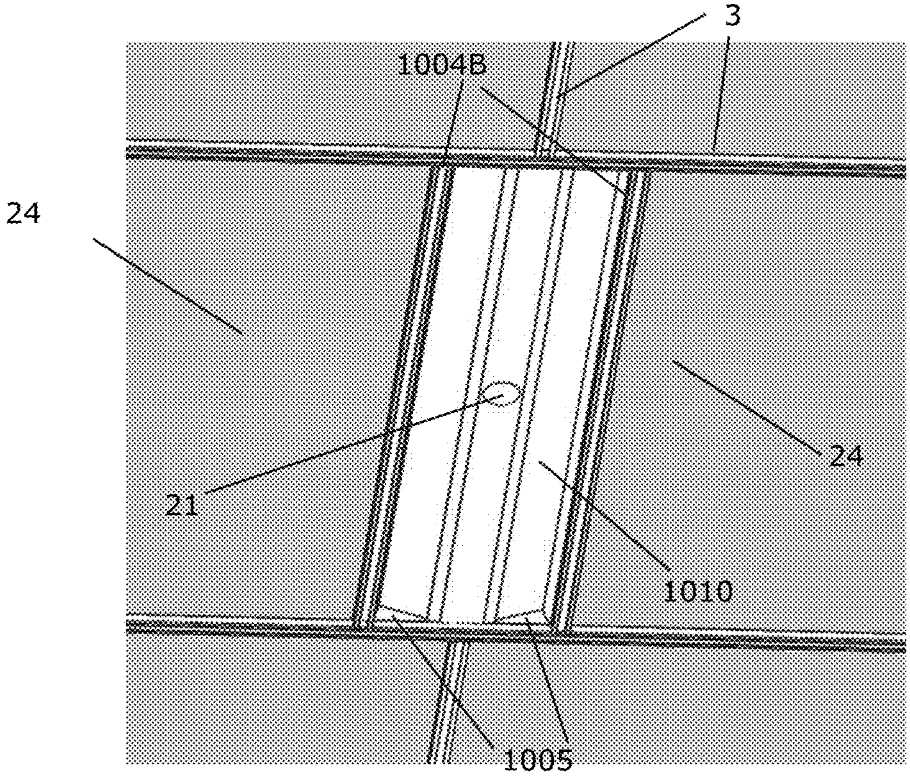

FIGS. 10D and 10E show the embodiments of FIGS. 10B and 10C mounted in a suspended ceiling arrangement as viewed from below. The T-bar shaped exterior support features 1004B of the linear support element match the visual appearance of the T-bars 3 used in the suspended ceiling arrangement and similarly hold the edge of ceiling panels 24. The sensor 21 is visible and has an unobstructed view of the room below and the outer lens 1010 is angled such that part of the internal reflective surface of the endplate 1005 is visible from below. The lighting assembly can be mounted in line with T-Bar and configured such that the configured gap compliments the design aesthetic of the T-Bar when viewed from underneath the ceiling grid plane. The configurable gap can also be filled with a continuous support ledge that can be configured to mount a sensor and to support the driver from above. In FIG. 10D the lighting assembly is mounted with a T-Bar cell of an existing ceiling grid arrangement. In FIG. 10E the lighting assembly replaces a longitudinal T-bar and reduces the width of two T-bar cells and creates a new interstitial area where the lighting assembly is located between them.

Figure 11A:
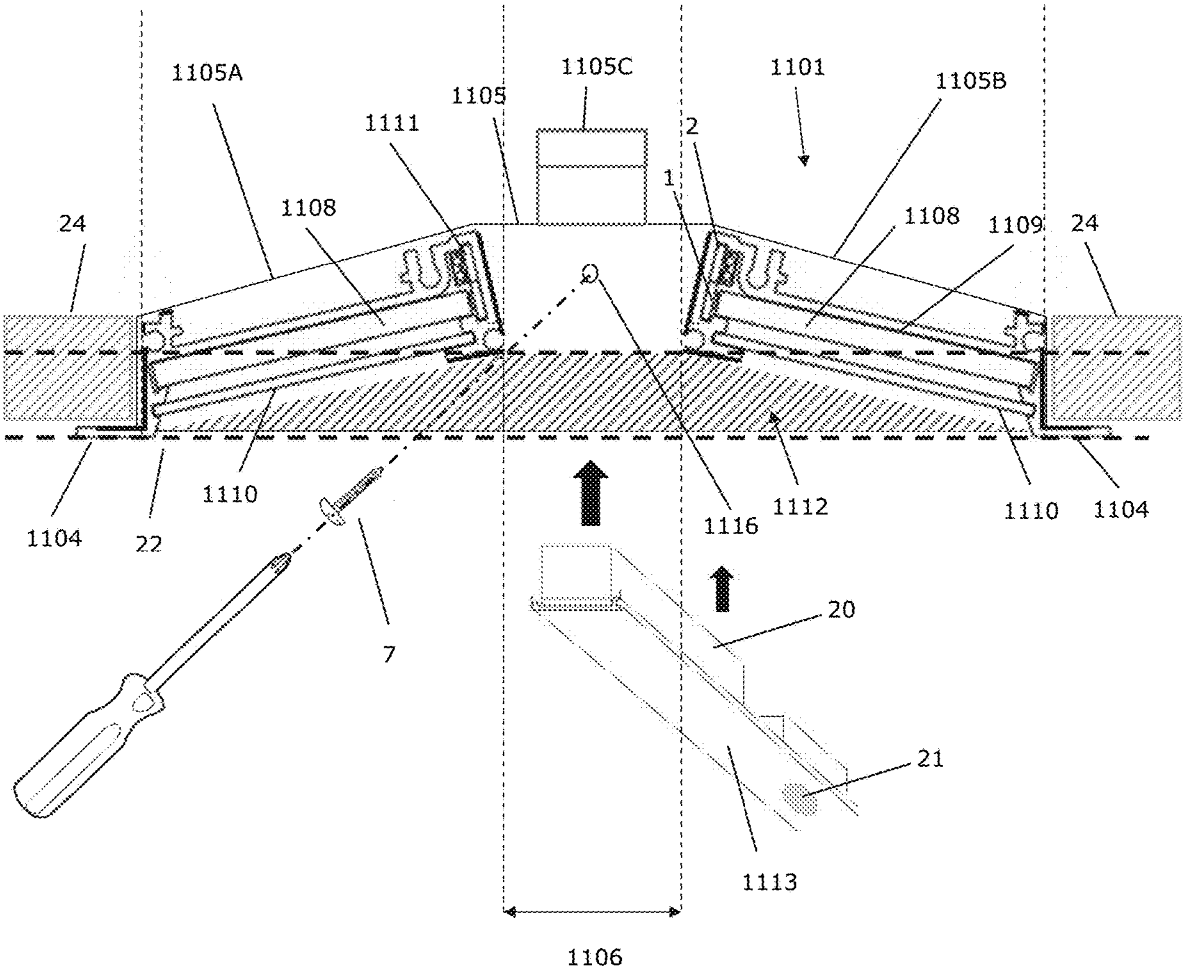
FIG. 11A illustrates a lighting assembly embodiment with the access to the configured gap spacing at a height above the ceiling grid plane.

FIG. 11A illustrates an embodiment of the ceiling grid lighting assembly 1100 with the access to the configured gap spacing 1106 at a height above the ceiling grid plane. The lighting assembly has configured gap 1106 at a raised elevation relative to the outer edges of the lighting modules. The opening to the configurable gap could be at a higher or lower elevation to the ceiling grid plane. A LED driver 20 and a sensor 21 are mounted onto a gear tray 1113 which also functions as a decorative cover. The reflector 1109 extends behind the transmissive optical element and wraps around to the opposing face from the input face proximate to the one or more LEDs 1 which are mounted on the LED board 1111. The light redirecting diffusion lens 1110 on the outer surface is further configured to assist in controlling the lighting distributions. The exterior support features 1104 are configured to replicate the appearance of 9/16" flat style T-bars when viewed from below a ceiling grid assembly. Equally these features could be configured as a 9/16" slot style T-bar or any other design that may be required. Furthermore, in this embodiment the central portion of the end plate 1105C is configured to clip or hook onto a T-bar when mounted perpendicularly and the end plate 1105 is further configured to rest on the horizontal portion of the T-bar and is at a thickness equivalent to that horizontal portion. Furthermore in FIG. 11A the external optical cavity 1112 is singular and extended such that it extends continuously from the outermost support features 1104 of the two linear lighting modules and includes an area bounded by the central portion 1105C of the end plate. There is a hole 1116 in the central portion of the end plate 1105C which can be used in attaching the lighting assembly to a T-bar vertical portion, for example by means of a screw 7 or other fastener. In this way, the lighting assembly without gear tray can be installed by positioning onto T-bar horizontal flanges within a ceiling grid arrangement and then additionally and more solidly anchored from within a room below by attaching through the easily accessible central cavity. Subsequently, the gear tray can be raised and locked into position to complete the installation.

Figure 11B:
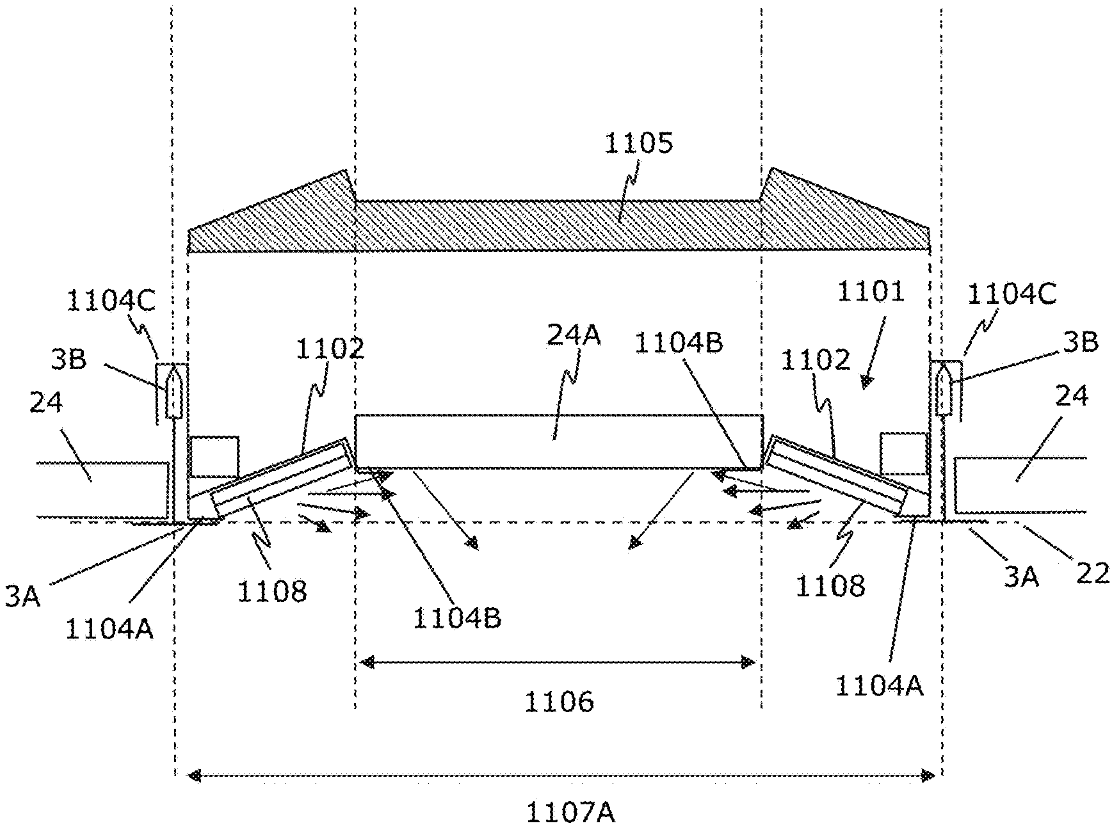
FIG. 11B (with end plate removed) and 11C (with end plate in place) illustrate a lighting assembly embodiment wherein the configured assembly width is chosen such that the entire assembly can be fitted into a ceiling grid assembly cell.
Figure 11C:
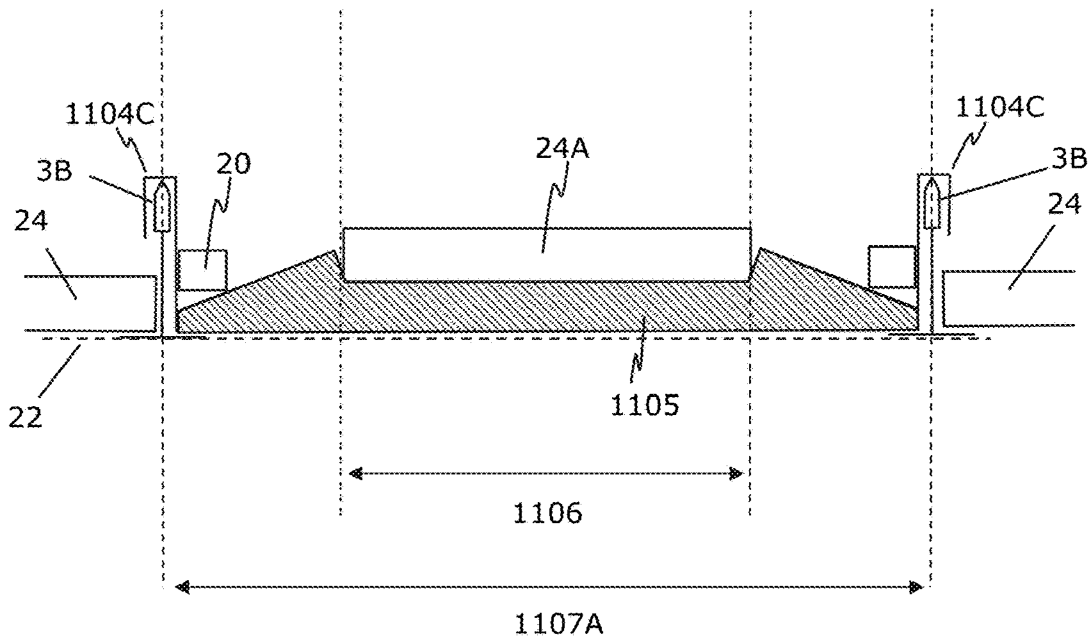
FIG. 11D (with end plate removed) and FIG. 11E (with end plate in place) are cross section views of an embodiment lighting assembly configured with a raised horizontally mounted central ceiling panel.

FIGS. 11B and 11C illustrate a lighting assembly embodiment wherein the configured assembly width 1107A is chosen such that the entire assembly can be fitted into a ceiling grid assembly cell. This embodiment is of a type that could be fitted in a full 1×2, 1×4, 1×8, 2×2 or 2×4 ceiling grid assembly. Typically in such applications the configured width 1107A of the lighting assembly would be slightly less than 11.75" or 23.75" which is the measured gap between two vertical portions of T-Bars on either side of a typical ceiling grid assembly cell. FIG. 11B is an isometric view of the assembly with the end plate 1105 removed. FIG. 11C is the same assembly with the end plate in place. Further shown is the lighting assembly supporting a ceiling panel 24 within the configured gap spacing 1106 at an elevation relative to the ceiling grid plane. The linear linear support element 1102 has external support features 1104A, 1104B, and 1104C which serve different specific functions in connecting with the ceiling grid system. External support feature 1104A supports the linear support element 1102 in resting upon T-bar horizontal portion 3A. External support feature 1104B supports a central ceiling panel 24A. External support feature 1104C latches over T-bar vertical portion 3B.

Figure 11D:
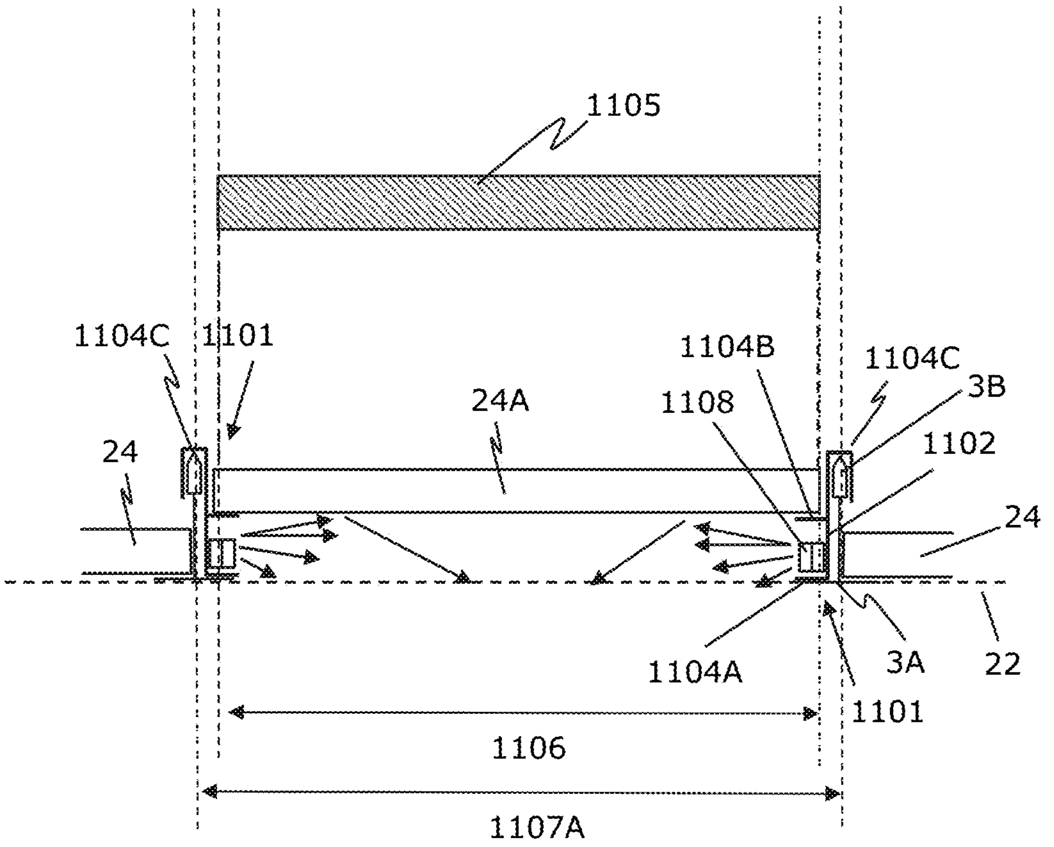
Figure 11E:
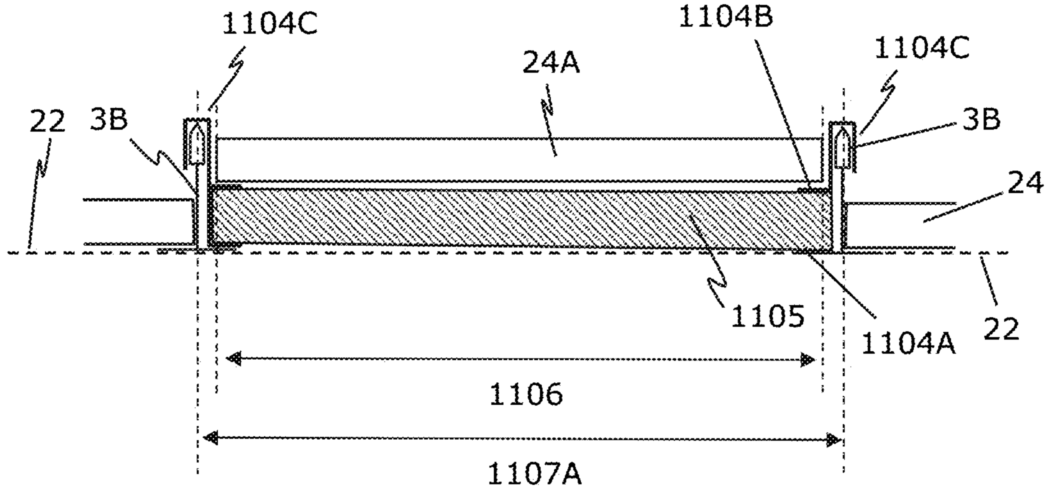

FIG. 11D and FIG. 11E are further embodiments of lighting assembly configured width 1107A to fit between two T-Bars in a typical ceiling grid assembly cell. In this embodiment a central ceiling panel 24A is held in a horizontal position within the configured gap spacing 1106 and is partially directly above the light source.

Figure 12:
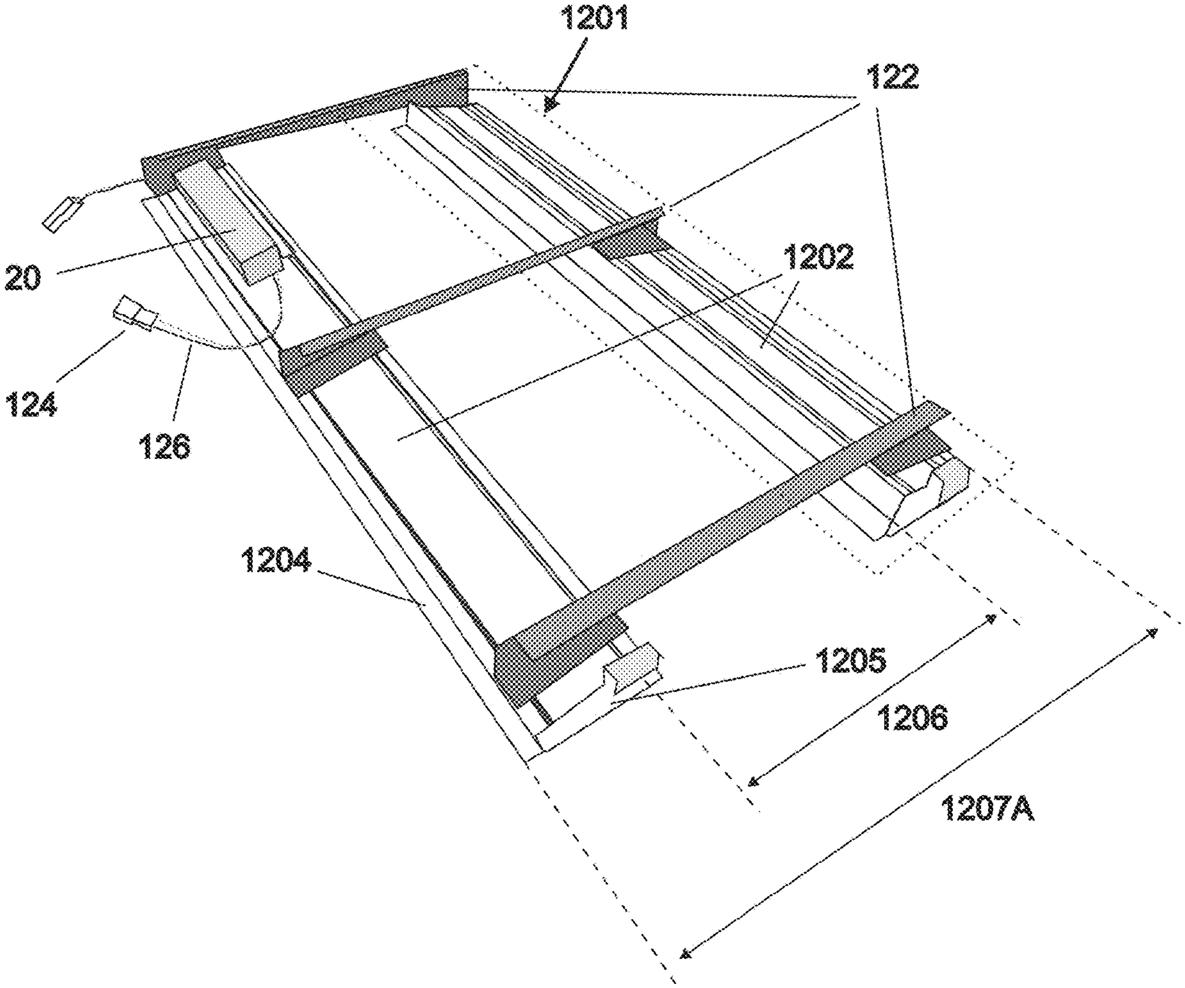
FIG. 12 is an isometric top view of an alternative embodiment of a ceiling grid lighting assembly wherein the linear support elements have individual end plates and one or more brackets are used to hold the linear support elements in parallel.

FIG. 12 is an isometric top view of an alternative embodiment lighting assembly wherein the linear support elements 1202 have individual end plates 1205 and one or more alignment brackets 122 are used as an alternative to the central portion of an end plate to hold the linear support elements 1202 in parallel arrangement. An LED Driver 20 is mounted on the top of one of the linear support elements with electrical connectors 124 and electrical wiring 126 that deliver power to LED boards within the linear lighting module 1201. In this embodiment the alignment brackets may or may not be positioned close to the end of the elongate bodies of the linear lighting modules. The brackets may also be configured such that they remain below the height of the T-bars in the ceiling grid or may be configured such that a portion of the alignment bracket is above and over the T-bar vertical portion or the T-bar anchor. For instance the alignment bracket might have slots or grooves.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A lighting assembly of configured width and length for use with a suspended ceiling arrangement wherein the suspended ceiling arrangement includes a grid arrangement of T-bars suspended from a structural ceiling and the top surfaces of the T-bar horizontal portions collectively define a general ceiling plane, wherein said lighting assembly comprises;

a) two linear lighting modules each comprising;

i. one or more LED boards comprising one or more LED light sources mounted onto a printed circuit board (PCB) additionally with electrical connectors or pads as a means for power coupling;

ii. at least one transmissive optical element wherein an input face of the transmissive optical element is positioned proximate to the light source and an output face is positioned towards the output face of the linear lighting module;

iii. at least one reflector or reflective surface proximate to the one or more LED boards and the at least one transmissive optical element;

iv. two linear support elements functioning as a structural component and housing, being rigid and having the three-dimensional form of a profile cross-sectional area extended linearly in a longitudinal direction; each comprising interior and exterior support features wherein the interior support features provide positioning, retention, and optical alignment with a longitudinal axis for the one or more LED boards, the at least one transmissive optical element, and the at least one reflector, and the exterior support features provide support and mounting options for ceiling panels or additional external components;

b) two supporting end plates which collectively retain the linear lighting modules in parallel alignment with a configured gap spacing, each end plate comprising two side portions and a contiguous central portion, the two side portions configured to connect, support, and enclose a longitudinal end of each of the two linear support elements and the central portion corresponding to the configured gap spacing.

2. The lighting assembly of claim 1 further comprising a T-bar, acoustic panel, decorative panel, cover plate or HVAC element positioned within the configured gap spacing.

3. The lighting assembly of claim 1 further comprising an electronic device positioned within the configured gap spacing.

4. The lighting assembly of claim 3 wherein the electronic device positioned within the configured gap spacing is one or more from the group containing a power supply, driver, sensor, power module, fan or loudspeaker.

5. The lighting assembly of claim 1 wherein at least one end plate further comprises an anchoring hole that serves as an attachment point for a suspension cable, wire or support from a structural ceiling.

6. The lighting assembly of claim 1 wherein at least one end plate is affixed to the end of a linear lighting module by the use of one or more of screws, nuts, bolts, adhesives, rivets, tie-wraps.

7. The lighting assembly of claim 1 wherein at least one end plate is removably affixed.

8. The lighting assembly of claim 1 wherein at least one end plate provides an internal reflective surface for at least one linear lighting module.

9. The lighting assembly of claim 1 further comprising an optical cavity bounded by an internal surface of one of the linear lighting modules and the reflective internal surface of at least one end plate side portion, the optical cavity extending above the ceiling plane of the suspended ceiling arrangement.

10. The lighting assembly of claim 9 wherein the reflective internal surface portion of the end plate side portion has a triangular or trapezoidal shape.

11. The lighting assembly of claim 1 wherein the end plate further comprises a slot within which a vertical portion of a T-bar is positioned.

12. The lighting assembly of claim 1 wherein at least one of the linear support elements further comprises an exterior support feature that extends to partially or fully span the configured gap spacing.

13. The lighting assembly of claim 12 wherein the linear support element exterior support feature is at or above the height of the ceiling grid plane.

14. The lighting assembly of claim 12 wherein the linear support element external support feature extends across the configured gap spacing from one linear support element to the other.

15. The lighting assembly of claim 1 wherein at least one of the linear support elements further comprises an exterior support feature which rests upon the horizontal flange of a T-bar, said T-bar being longitudinally aligned with the longitudinal axis of the linear lighting modules.

16. The lighting assembly of claim 1 wherein the end plate rests upon a horizontal flange of a T-bar in perpendicular alignment with the longitudinal axis of the two linear lighting modules.

17. The lighting assembly of claim 16 wherein the linear support element does not rest on the T-Bar.

18. The lighting assembly of claim 16 wherein a portion of the linear support element rests on the T-Bar.

19. The lighting assembly of claim 1 wherein a portion of the end plate rests upon a horizontal flange of a T-bar when the two linear lighting modules are positioned in longitudinal alignment with the longitudinal axis of the T-bar.

20. The lighting assembly of claim 1 wherein the transmissive optical element of each of the linear lighting modules is held in a longitudinally aligned position by opposing first and second interior support features of the linear support element of each respective linear lighting module.

21. The lighting assembly of claim 1 wherein the transmissive optical element is edgelit from one or two sides by one or more LED light sources.

22. The lighting assembly of claim 21 wherein one or more of the LED light sources is positioned at a height more than the height of one ceiling tile above the ceiling plane and less than the height of the vertical portion of a T-bar.

23. The lighting assembly of claim 21 wherein the input face of the transmissive optical element is positioned at a height more than the height of one ceiling tile above the ceiling plane and less than the height of the vertical portion of a T-bar.

24. The lighting assembly of claim 21 wherein one or more of the light sources is positioned at a height less than the height of one ceiling tile above the ceiling plane.

25. The lighting assembly of claim 21 wherein the input face of the transmissive optical element is positioned at a height less than the height of one ceiling tile above the ceiling plane.

26. The lighting assembly of claim 21 wherein the transmissive optical element is a light guide or low clarity edgelit diffuser.

27. The lighting assembly of claim 1 wherein an interior support feature of the linear support element supports the transmissive optical element in a tilted position with respect to the ceiling plane of the suspended ceiling arrangement.

28. The lighting assembly of claim 27 wherein the transmissive optical element of at least one linear lighting module is angled downward towards the center of the lighting assembly.

29. The lighting assembly of claim 27 wherein the transmissive optical element of at least one linear module is angled up towards the center of the lighting assembly.

30. The lighting assembly of claim 1 further comprising an outer lens supported by interior support features of the linear support element.

31. The lighting assembly of claim 1 wherein the outer lens is a light redirecting lens or a diffuser.

32. The lighting assembly of claim 1 further comprising an outer lens within the interior of the linear support element and positioned exterior to the transmissive optical element to accept light from the transmissive optical element.

33. The lighting assembly of claim 32 wherein the outer lens further shapes or diffuses light output from the transmissive optical element.

34. The lighting assembly of claim 1 wherein one or both linear support elements further comprises exterior support features designed to support the edge of a ceiling tile.

35. The lighting assembly of claim 34 wherein the exterior support features are in a geometric form similar to the horizontal portion of a T-bar.

36. The lighting assembly of claim 35 wherein the geometric form is similar to a slot style T-bar.

37. The lighting assembly of claim 1 wherein the assembly process comprises;

a. sliding the LED boards, transmissive optical elements and reflectors in a longitudinal direction into positions in the two linear support elements;

b. fastening an end plate to both cap the longitudinal ends of the two linear support elements and also join together in parallel longitudinal alignment the two linear support elements.

38. The lighting assembly of claim 1 wherein the end plate is an injection molded or machined 3-dimensional part.

39. The lighting assembly of claim 1 wherein the end plate has a thickness in a range of 2 mm to 10 mm.

40. The lighting assembly of claim 1 wherein the end plate is fabricated from a metal sheet.

41. The lighting assembly of claim 40 wherein the end plate is manufactured using a process of metal-sheet stamping, metal-sheet laser cutting or metal-sheet machining.

42. The lighting assembly of claim 1 wherein the end plate further comprises an additional portion that wraps around an edge of the end plate and extends in the longitudinal direction of a lighting assembly.

43. The lighting assembly of claim 1 wherein the total height of the lighting assembly is less than the height of a T-Bar.

44. The lighting assembly of claim 1 wherein the height of the linear support elements is less than the height of a T-bar of the suspended ceiling arrangement.

45. The lighting assembly of claim 1 wherein the configured gap spacing is configured to be aligned with the ceiling plane of a suspended ceiling arrangement when the lighting assembly is installed within the suspended ceiling arrangement.

46. The lighting assembly of claim 1 wherein the configured length, width, or gap spacing are adjustably reconfigurable.

47. The lighting assembly of claim 1 wherein at least one lighting module is configured to provide a non-lambertian lighting distribution.

* * * * *